US012743579B2

(12) United States Patent
Subramaniam et al.

(10) Patent No.: US 12,743,579 B2
(45) Date of Patent: Sep. 22, 2026

(54) METHOD AND SYSTEM FOR EVALUATING INTEGRATION OF RESPONSIBLE AI WITH LLM OPERATIONS

(71) Applicant: Accenture Global Solutions Limited, Dublin (IE)

(72) Inventors: Kamakshi Subramaniam, Rochester, MN (US); Atish Shankar Ray, Herndon, VA (US)

(73) Assignee: Accenture Global Solutions Limited, Dublin (IE)

( * ) Notice: Subject to any disclaimer, the term of this patent is extended or adjusted under 35 U.S.C. 154(b) by 164 days.

(21) Appl. No.: 18/817,899

(22) Filed: Aug. 28, 2024

(65) Prior Publication Data

US 2026/0064964 A1 Mar. 5, 2026

(51) Int. Cl.
*G06F 40/247* (2020.01)
*G06N 3/0475* (2023.01)

(52) U.S. Cl.
CPC ......... *G06F 40/247* (2020.01); *G06N 3/0475* (2023.01)

(58) Field of Classification Search
CPC ...... G06F 40/247; G06F 40/30; G06N 3/0475
USPC .............................................................. 704/9
See application file for complete search history.

(56) References Cited

U.S. PATENT DOCUMENTS 6,587,928 B1 7/2003 Periyannan et al.
12,236,202 B1 * 2/2025 DeWeese ............ G06F 21/6218
12,387,106 B1 * 8/2025 DeWeese ............ G06F 11/3672
12,423,388 B2 * 9/2025 Horton .................. G06F 16/632
12,487,875 B1 * 12/2025 Côrte-real ........... G06F 11/0769
12,556,533 B1 * 2/2026 Gu ........................ H04L 63/083
2006/0015570 A1 1/2006 Khemani et al.
2009/0094200 A1 4/2009 Baeza-Yates et al.
2010/0100604 A1 4/2010 Fujiwara et al.
2017/0052976 A1 2/2017 Verma et al.
(Continued)

OTHER PUBLICATIONS

Stafford, Gary, "Quantitative Evaluation of LLM Responses with RAG-based Question-answering Chatbots," Principal Solutions Architect @AWS/Data Analytics and Generative AI Specialist/ Experienced Technology, Aug. 29, 2023, 22 pages.
(Continued)

*Primary Examiner* — Thuykhanh Le
(74) *Attorney, Agent, or Firm* — Seed Intellectual Property Law Group LLP

(57) ABSTRACT

A computer-implemented method for evaluating integration of Responsible Artificial Intelligence Operations (RAIOPS) and Large Language Model Operations (LLMOPS) is disclosed. A response respective to each of prompts is generated using an LLM, in response to receiving data associated with each of the prompts. The data associated with each of the prompts and data associated with the response respective to each of the prompts is stored as an association. Further, based on user-specified criteria and using the data associated with the prompts or the data associated with the responses respective to the prompts, one or more evaluation metrics are generated for evaluating the responses respective to each of the prompts for one or more aspects. In accordance with the at least one evaluation metric, a knowledge graph visualization or a numerical score is generated to display performance of the LLM and determine whether the LLM needs optimization or tuning.

20 Claims, 24 Drawing Sheets

(56) References Cited

U.S. PATENT DOCUMENTS

| | | | | |
|---|---|---|---|---|
| 2020/0007380 | A1* | 1/2020 | Chen | G06N 3/09 |
| 2020/0327170 | A1* | 10/2020 | Boxwell | G06F 16/90332 |
| 2021/0397792 | A1* | 12/2021 | Atallah | G06F 40/247 |
| 2023/0047665 | A1* | 2/2023 | Li | G06F 40/289 |
| 2024/0062019 | A1* | 2/2024 | Aberle | G06F 40/169 |
| 2024/0330345 | A1* | 10/2024 | Kohli | G06F 16/3334 |
| 2024/0412226 | A1* | 12/2024 | Mathur | G06F 9/453 |
| 2024/0428704 | A1* | 12/2024 | Cojocaru | G09B 5/06 |
| 2025/0005279 | A1* | 1/2025 | Lin | G06F 40/247 |
| 2025/0061307 | A1* | 2/2025 | Tran | G06N 3/045 |
| 2025/0094464 | A1* | 3/2025 | Zhong | G06F 16/316 |
| 2025/0094821 | A1* | 3/2025 | Hettige | G06N 3/0475 |
| 2025/0097171 | A1* | 3/2025 | Hu | G06F 40/226 |
| 2025/0110985 | A1* | 4/2025 | Wagle | G06N 3/08 |
| 2025/0117665 | A1* | 4/2025 | Shukla | G06N 3/0895 |
| 2025/0125060 | A1* | 4/2025 | Marks | G06F 40/205 |
| 2025/0148209 | A1* | 5/2025 | Jadhav | G06F 40/247 |
| 2025/0156413 | A1* | 5/2025 | Barkan | G06F 16/243 |
| 2025/0156453 | A1* | 5/2025 | Conway | G06F 16/3329 |
| 2025/0156460 | A1* | 5/2025 | Gibson | G06F 16/3344 |
| 2025/0190449 | A1* | 6/2025 | Zhang | G06F 16/288 |
| 2025/0190763 | A1* | 6/2025 | Banuelos | G06N 3/0455 |
| 2025/0265420 | A1* | 8/2025 | Kesarwani | G06F 16/3329 |
| 2025/0265421 | A1* | 8/2025 | Rodriguez | G06F 40/35 |
| 2025/0278578 | A1* | 9/2025 | Chawla | G06F 40/40 |
| 2025/0307228 | A1* | 10/2025 | Liebkowiz | G06F 16/243 |
| 2025/0328653 | A1* | 10/2025 | Chen | G06F 21/577 |
| 2025/0335775 | A1* | 10/2025 | Badjatiya | G06N 3/0455 |
| 2025/0342360 | A1* | 11/2025 | Varerkar | G06N 3/088 |
| 2025/0355921 | A1* | 11/2025 | Jamei | G06F 16/345 |
| 2025/0371307 | A1* | 12/2025 | Pressland | G06N 3/042 |
| 2025/0371433 | A1* | 12/2025 | Bhat | G06F 9/5011 |
| 2025/0384063 | A1* | 12/2025 | Fraser | G06F 16/3325 |
| 2025/0384083 | A1* | 12/2025 | Hong | G06F 16/683 |
| 2026/0004077 | A1* | 1/2026 | Levi-Raz | G06F 40/30 |
| 2026/0004086 | A1* | 1/2026 | Evans | G06F 40/30 |
| 2026/0017456 | A1* | 1/2026 | Uthaman | G06F 16/3329 |
| 2026/0023929 | A1* | 1/2026 | Gong | G06F 40/30 |
| 2026/0037506 | A1* | 2/2026 | Sengupta | G06F 16/24522 |
| 2026/0038035 | A1* | 2/2026 | Arora | G06Q 40/024 |
| 2026/0045012 | A1* | 2/2026 | Wu | G06T 11/60 |
| 2026/0049549 | A1* | 2/2026 | Srivastava | E21B 47/12 |
| 2026/0050743 | A1* | 2/2026 | Busany | G06F 40/30 |
| 2026/0050842 | A1* | 2/2026 | Brenner | G06F 16/24575 |
| 2026/0056986 | A1* | 2/2026 | Sachdeva | G06F 16/3326 |
| 2026/0064560 | A1* | 3/2026 | Cheng | G06F 8/41 |
| 2026/0080167 | A1* | 3/2026 | Jade | G06F 16/345 |
| 2026/0087030 | A1* | 3/2026 | Collins | G06F 16/258 |

OTHER PUBLICATIONS

Khatun, Aisha and Daniel G. Brown, "TruthEval: A Dataset to Evaluate LLM Truthfulness and Reliability," arXiv:2406.01855v1 [cs.CL], Jun. 4, 2024, 9 pages. [https://arxiv.org/pdf/2406.01855].

Shankar, et al., "Who Validates the Validators? Aligning LLM-Assisted Evaluation of LLM Outputs with Human Preferences," arXiv:2404.12272v1 [cs.HC], Apr. 18, 2024, 16 pages. [https://arxiv.org/pdf/2404.12272].

Fu Bang et al.,: "GPTCache: An Open-Source Semantic Cache for LLM Applications Enabling Faster Answers and Cost Savings", Proceedings of the 3rd Workshop for Natural Language Processing Open Source Software (NLP-OSS 2023), Association for Computational Linguistics, Dec. 6, 2023, pp. 212-218, XP093327887.

Zhu Banghua et al., "On Optimal Caching 1-15 and Model Multiplexing for Large Model Inference", Aug. 29, 2023 XP093327973. Retrieved from the Internet: <<https://arxiv.org/pdf/2306.02003>>.

Li Jiaxing et al., "SCALM: Towards 1-15 Semantic Caching for Automated Chat Services with Large Language Models", 2024 IEEE/ACM 32nd International Symposium on Quality of Service (IWQOS), IEEE, Jun. 19, 2024 (Jun. 19, 2024), pp. 1-10, XP034709004, DOI: 10.1109/IWQOS61813.2024.10682957.

Extended European search report, Application No. 25195355.0 mailed on Nov. 7, 2025.

Mohandoss, Ramaswami, "Context-based Semantic Caching for LLM Applications," IEEE Conference on Artificial Intelligence (CAI), 2024, 6 pages. [Retrieved from the interenet: https://ieeecai.org/2024/wp-content/pdfs/540900a361 /540900a361 . pdf].

Javeri, Prashun, "Caching Embeddings using Redis," Medium, Jun. 6, 2024, 7 pages.

Huang, Yan, and Wei Liu, "Evaluating the Translation Performance of Large Language Models Based on Euas-20," arXiv:2408.03119v1 [cs.CL], Aug. 6, 2024, 15 pages. [https://arxiv.org/pdf/2408.03119].

"Donthi, et al., "Improving LLM Abilities in Idiomatic Translation," arXiv preprint arXiv:2407.03518, 2024, 10 pages. [https://arxiv .org/pdf/2407.0 3518]".

Diandaru, et al., "Could We Have Had Better Multilingual LLMs if English was Not the Central Language?" arXiv:2402.13917v2 [cs.CL] Apr. 5, 202, 10 pages.

* cited by examiner

METHOD AND SYSTEM FOR EVALUATING INTEGRATION OF RESPONSIBLE AI WITH LLM OPERATIONS

TECHNICAL FIELD

Various examples described herein relate generally to computer-implemented method, computer system, and computer program product for evaluating integration of Responsible Artificial Intelligence Operations (RAIOPS) and Large Language Model Operations (LLMOPS).

BACKGROUND

Generative Artificial Intelligence (GAI) refers to advanced AI systems that emulate human cognitive abilities across various applications. The advanced AI systems use sophisticated methods to autonomously process complex data, make decisions, and solve problems. Further, GAI encompasses a broad category of AI systems, including specialized subsets like Large Language Models (LLMs) designed for Natural Language Processing (NLP) tasks. The LLMs are trained to understand and generate human-like responses based on input prompts. The LLMs excel in tasks such as language translation, text summarization, sentiment analysis, contextual understanding, and the like.

On the other hand, Responsible Artificial Intelligence (RAI) ensures ethical AI development, while focusing on fairness, transparency, and accountability, addressing biased data, and protecting privacy.

SUMMARY

Implementations of the present disclosure are generally directed to evaluating integration of Responsible Artificial Intelligence Operations (RAIOPS) and Large Language Model Operations (LLMOPS). More particularly, implementations of the present disclosure are directed to enabling generation of evaluation metrics for evaluating responses generated by a Large Language Model (LLM) and respective prompts across different aspects, which allows for comprehensive determination of performance of the LLM and determination whether the LLM needs optimization or tuning.

In at least one example, the present disclosure provides a method for evaluating integration of RAIOPS and LLMOPS. The method may include generating, in response to receiving data associated with each prompt of a plurality of prompts, a response respective to each prompt of the plurality of prompts using at least one LLM. The method may further include storing, in at least one memory, the data associated with each prompt of the plurality of prompts and data associated with the response respective to each prompt as an association. The method may further include generating, based at least in part upon a user-specified criteria and using the data associated with a subset of the plurality of prompts or the data associated with the response respective to the subset of the plurality of prompts, at least one evaluation metric for evaluating the response respective to each prompt of the plurality of prompts for at least one aspect of a plurality of aspects. The method may include generating, in accordance with the at least one evaluation metric, a knowledge graph visualization or a numerical score to display performance of the LLM and determine whether the LLM needs optimization or tuning.

The present disclosure further describes a system for implementing the method provided herein. The present disclosure also describes computer-readable media coupled to one or more processors and having instructions stored thereon which, when executed by the one or more processors, cause the one or more processors to perform operations in accordance with the method described herein.

It is appreciated that methods in accordance with the present disclosure may include any combination of the aspects and features described herein. That is, the method in accordance with the present disclosure is not limited to the combinations of aspects and features specifically described herein, but may also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

Various embodiments in accordance with the present disclosure will be described with reference to the drawings, in which.

Like reference numbers and designations in the various drawings indicate like elements.

DETAILED DESCRIPTION

Figure 1:
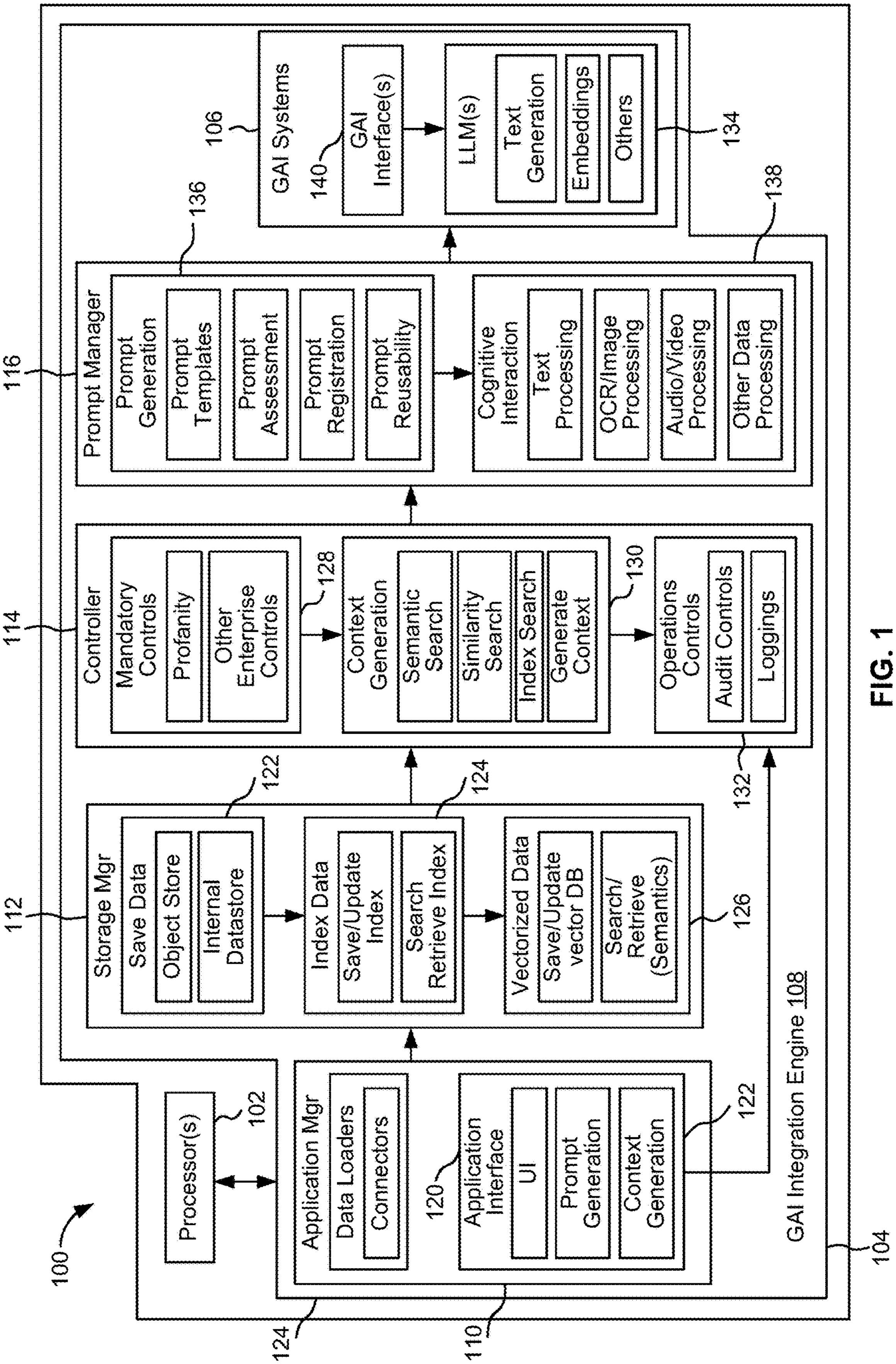
FIG. 1 illustrates an example architecture of an integration system, in accordance with implementations of the present disclosure.

In the following description, various examples will be illustrated by way of example and not by way of limitation in the figures of the accompanying drawings. References to various examples in this disclosure are not necessarily to the same example, and such references mean at least one. While specific implementations and other details are discussed, it is to be understood that this is done for illustrative purposes only. A person skilled in the relevant art will recognize that other components and configurations may be used without departing from the scope of the claimed subject matter.

Reference to any "example" herein (e.g., "for example", "an example of", by way of example" or the like) are to be considered non-limiting examples regardless of whether expressly stated or not.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various examples given in this specification.

Without intent to limit the scope of the disclosure, examples of instruments, apparatus, methods, and their related results according to the examples of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

The term "comprising" when utilized means "including, but not necessarily limited to"; it specifically indicates open-ended inclusion or membership in the so-described combination, group, series, and the like.

The term "a" means "one or more" unless the context clearly indicates a single element.

"First," "second," etc., are labels to distinguish components or blocks of otherwise similar names but does not imply any sequence or numerical limitation.

"And/or" for two possibilities means either or both of the stated possibilities ("A and/or B" covers A alone, B alone, or both A and B take together), and when present with three or more stated possibilities means any individual possibility alone, all possibilities taken together, or some combination of possibilities that is less than all of the possibilities. The language in the format "at least one of A . . . and N" where A through N are possibilities means "and/or" for the stated possibilities (e.g., at least one A, at least one N, at least one A and at least one N, etc.).

It should also be noted that in some alternative implementations, the functions/acts noted may occur out of the order noted in the figures. For example, two steps disclosed or shown in succession may in fact be executed substantially concurrently or may sometimes be executed in the reverse order, depending upon the functionality/acts involved.

Specific details are provided in the following description to provide a thorough understanding of examples. However, it will be understood by one of ordinary skill in the art that examples may be practiced without these specific details. For example, systems may be shown in block diagrams so as not to obscure the examples in unnecessary detail. In other instances, well-known processes, structures, and techniques may be shown without unnecessary detail in order to avoid obscuring example examples.

The specification and drawings are to be regarded in an illustrative rather than a restrictive sense. It will, however, be evident that various modifications and changes may be made thereunto without departing from the broader spirit and scope of the invention as set forth in the claims.

With the advent of Generative Artificial Intelligence (GAI) systems, enterprises are adopting the GAI systems to support execution of various tasks/processes. For example, a GAI system may support communications and interactions, and processes in software systems to support decision-making within the enterprises. Multiple applications within a corporate network environment may use and interact with Large Language Models (LLMs) of the GAI systems to provide input and/or data for the execution of a wide variety of tasks, such as, human computer interactions (i.e., questioning/querying and answering), automating process execution, process planning, generating step-by-step procedures for the process execution, performing data analysis, and/or the like. The LLMs operate by processing inputs to generate coherent, and contextually appropriate responses.

The enterprises using the LLMs may require that applications that they employ using the LLMs are performing ethically, accurately, and fairly, and responses generated by the applications are of high quality without inconsistencies. However, due to automated and "black box" nature of the LLMs, monitoring and controlling Responsible Artificial Intelligence (RAI) metrics of robustness, accountability, privacy, fairness, soundness, and transparency pose a significant challenge to operations of the LLMs. Therefore, complexity of the LLMs makes it difficult to guarantee that the responses meet high standards of performance and fairness. Another challenge lies in an operational oversight required for managing and optimizing the LLMs. The enterprises, with a rapid evolution of use cases and applications of the LLMs, require subject matter experts or skilled professionals to constantly monitor performance of the LLMs. The subject matter experts or the skilled professionals ensure that the LLMs operate correctly, adhere to ethical standards, and produce accurate responses. Further, the subject matter experts or the skilled professionals are responsible for addressing any issues that arise, adapting the LLMs to new use cases, and maintaining overall quality and reliability of the LLMs. The need for subject matter experts or the skilled professional may be resource-intensive and complex, particularly as the new use cases emerge.

Various methods/approaches are available to oversee and assess the LLMs. The available methods are inadequate as they rely on simple statistical measures or existing models (such as foundation models or benchmark models). The available methods fail to address complex needs for ensuring that the LLMs perform accurately and ethically, including evaluating ethical impact, contextual understanding, adaptability to diverse use cases, and overall robustness of the LLMs. The statistical measures include metrics such as accuracy or precision, which may not capture a full complexity of the performance of the LLMs. For example, the accuracy and precision may overlook other important aspects like ethical considerations, contextual understanding, and an ability to handle nuanced language. Additionally, use of the foundation models (such as GPT-3, BERT) or the benchmark models (e.g., SQuAD, GLUE, or the like) may not fully address the sophisticated needs of the LLMs. The foundation models may not address specific needs like nuanced ethical assessments or contextual adaptability. Further, the benchmark models are useful for core performance metrics but often fail to cover all real-world scenarios or evolving applications. The limitations of the available methods, as discussed above, result in gaps in evaluating how well the LLMs perform ethically and accurately and increase operational costs due to need for supplementary measures and/or more comprehensive evaluation techniques.

Moreover, data chunking is a critical process in managing large volumes of text for the LLMs. The data chunking involves breaking down of documents or datasets associated with prompts and responses into smaller, manageable pieces or chunks to facilitate more efficient processing and analysis by the LLMs. Proper chunking is essential for ensuring that the LLMs may generate coherent and accurate responses based on information provided to the LLMs. However, improper data chunking presents another significant challenge. One major issue with the improper data chunking is that poorly aligned chunks may lead to incomplete or fragmented responses. For example, if a chunk ends with a partial statement and a subsequent chunk starts with a related but an incomplete term, the LLMs may struggle to understand and respond accurately. The issue associated with the improper data chunking arises because the LLMs lack full context needed to generate a meaningful and coherent response. By way of an example, if a document is chunked such that one chunk ends with "The capital of France is" and a next chunk starts with "Paris", a query about the capital of France may not return a correct answer.

Further, random or poorly structured chunking may result in irrelevant or misleading results or responses. When documents related to prompts or responses are chunked arbitrarily, the prompts/queries may retrieve disjointed or unrelated segments of information. The randomness may diminish usefulness of the responses generated by the LLMs, as the LLMs may produce incomplete or contextually inappropriate responses. By way of another example, if a document about cooking recipes is chunked randomly, a query about a specific recipe may return a chunk that only includes half the recipe or a part of another recipe, which may be irrelevant and unhelpful.

Further, the challenges faced by the LLMs include:

Biases: One of the primary challenges with the LLMs is their potential to generate biased outputs which may arise from training data of the LLMs. The potential to generate the biased outputs may reflect existing societal biases or fail to represent diverse dialects, languages, and cultural contexts adequately. Consequently, the LLMs may produce discriminatory or biased responses if the prompts that perpetuate biases are encountered.

Fairness: Ensuring fairness in the LLMs is another significant challenge. The LLMs may inadvertently favor certain topics, languages, or types of language use, leading to discriminatory outcomes.

Toxicity: The LLMs may also struggle with filtering out toxic, offensive, or harmful content, which involves generation of inappropriate responses or failing to moderate harmful language effectively.

Human safety: Safety of users is a critical concern in LLM operations. The LLMs may provide incorrect or harmful information or misinterpret user inputs, potentially causing harm.

Security: Security is another major challenge, as the LLMs may be susceptible to manipulation by malicious users or inadvertently reveal sensitive information.

Privacy: Protecting user privacy is yet another challenge in the LLMs. The LLMs may generate outputs that may violate privacy or be trained on sensitive data.

Robustness: One of the challenges in the LLMs is poor performance or vulnerability when noisy data or adversarial inputs are faced.

Soundness: Ensuring the soundness of the LLMs is a challenge. The LLMs may fail to follow linguistic rules or provide fundamentally flawed answers, resulting in generation of nonsensical or inconsistent responses.

Transparency: In the LLMs, transparency is a challenge due to complexity and opaque decision-making processes of the LLMs. An intricate neural architectures and pattern-based learning from diverse data of the LLMs make it difficult to explain how specific outputs are generated. This lack of clarity affects user trust and increases a risk of misuse.

Explainability: Explainability remains a challenge due to the inherent complexity and size of the LLMs, which function as "black boxes". Understanding how the LLMs make decisions may be difficult, making it challenging to interpret the outputs generated by the LLMs.

Further, there may be additional security challenges associated with adversarial prompting of the LLMs. The additional security challenges may include prompt injection, jail breaking, prompt poisoning, and a dual attack including the prompt injection and the prompt leakage. The prompt injection may involve an attack performed to reveal information that is not meant to revealed in the prompts and/or the responses (e.g., personally identifiable information (PII), sensitive information, and/or the like). The jail breaking may involve any illegal behavior of the LLMs or any attempt to bypass security measures that surround the LLMs to generate the responses. Thereby, the generated responses may violate its intended purpose or safety guidelines. The prompt poisoning may involve any attack performed by a third party/hacker to exploit customized prompts intended for the LLMs. The customized prompts may include prompts that circumvent guard rails to enable the LLMs to generate the response. The dual attack may involve altering the prompts with malicious intents, or including partial or complete details on the prompts, which may lead to unintended consequences or display of data including confidential or proprietary data.

There may be individual RAI metrics available to measure the prompt injection, the prompt leakage, and the prompt toxicity. However, these individual RAI metrics have limited focus on some of rudimentary operations of the LLMs without involving any extensive text processing mechanisms. In addition, the RAI metrics may exist as separate entities. Therefore, the available RAI metrics may drive up operating costs and do not accurately capture the accuracy required in the prompts and the responses.

Implementations of the present disclosure provides a framework for evaluating integration of RAI Operations (RAIOPS) and LLM Operations (LLMOPS). The framework may provide different metrics, including linguistic, lexical, semantic, and numerical measures, to assess accuracy, relevance, and security. The framework may also employ techniques such as, dependency parsing, coreference resolution, and random bootstrapping for robust evaluation and bias detection. The framework may also include visual tools for analyzing data chunking errors and dimensionality reduction to improve prompt and response analysis. Overall, the framework may enhance effectiveness, scalability, and efficiency of LLM applications, addressing gaps in soundness, security, and robustness.

The framework may also measure relevance between the prompts and the responses, identity security loopholes in the prompts and may have built in features to view pertinent words that have contributed towards the responses. In addition, the framework may also suggest guidelines for generation of the prompts, which may result in generation of the results that are measurable.

The framework may also address challenges related to continuous integration, continuous development (CICD) and continuous testing, tracking and continuous monitoring (CTCM) prompt and response relevance and tracking inconsistencies, prompt-response relevance and inconsistency monitoring, which may be the LLMOPS focusing on RAIOPS parameters, soundness scores via semantic and numerical similarity determination between prompt and response, or response and ground truth, prompt and data versioning and associating data used for the prompt via versioning, ensuring data privacy when invoking LLMs, detecting drift in the LLMs, and transparency, interpretability or explainability of the LLMs.

FIG. 1 illustrates an example architecture of an integration system 100, in accordance with implementation of the present disclosure. The integration system 100 includes one or more processor(s) 102, a memory 104, and GAI system(s) 106. The processor(s) 102 may include, for example, microprocessors, microcomputers, microcontrollers, digital signal processors, central processing units, state machines, logic circuits, and/or any devices that manipulate data or signals based on operational instructions. The memory 104 may be a non-volatile memory or a volatile memory. Examples of the non-volatile memory may include, but are not limited to, a flash memory, a Read Only Memory (ROM), a Programmable ROM (PROM), Erasable PROM (EPROM), and Electrically EPROM (EEPROM) memory. Examples of the volatile memory may include, but are not limited, a Dynamic Random Access Memory (DRAM), and a Static Random-Access Memory (SRAM).

The memory 104 may be communicatively coupled to the processor(s) 102, and stores a plurality of instructions, which upon execution by the processor(s) 102, cause the processor(s) 102 to perform various operations described in the present disclosure. The memory 104 includes a GAI integration engine 108. The plurality of instructions stored in the memory 104 may define operations of the GAI integration engine. The GAI integration engine 108 includes an application manager 110, a storage manager 112, a controller 114, and a prompt manager 116. In some implementations, and as described in further detail herein, the application manager 110 enables an application of an enterprise to interact with the GAI system(s) 106 through the controller 114 and the prompt manager 116. In some examples, the storage manager 112 stores various types of data that an application may access from the application manager 110. The data may include prompts and responses generated using LLMs of the GAI system 106.

Further, the storage manager 112 includes a save data module 122, an index data module 124, and a vectorized data module 126. In some examples, the save data module 122 includes an object store (e.g., to store data objects, binary large objects (BLOBs)) and an internal datastore. In general, the save data module 122 represents storage of data that may be accessed by an application in the application manager 110 for execution of enterprise operations. In some examples, the index data module 124 includes a save/update index and a search/retrieve index. The save/update index may be used to index data that is stored in the storage tier for search and/or retrieval using the search/retrieve index. In some examples, the vectorized data module 126 includes a save/update vector database (DB) sub-module and a search/retrieve sub-module. In some examples, vectors may be provided for the data stored in the storage manager 112, each vector being a n-dimensional representation of respective data (also referred to as an embedding). The vectors may be used for search (e.g., semantic search) and retrieval of the data. For example, vectors may be compared (e.g., using dot product) to determine similarity therebetween.

The controller 114 includes a mandatory controls module 128, a context generation module 130, and an operations control module 132. In some examples, the mandatory controls module 128 represents modules that are determined to provide mandatory functionality for interactions with third-party GAI systems. Example mandatory control modules are described in further detail herein. In some examples, the context generation module 130 includes functionality for semantic search, similarity search, index search and context generation. For example, the context generation module 130 may generate a context for an enterprise and/or an enterprise operation (e.g., based on the data stored in the storage manager 112), and the context may be used to provide enterprise-specific and/or operation-specific responses from LLM(s) 134 of the GAI system(s) 106. In some examples, the operations control module 132 provides operations functionality, such as audit controls and logging.

The prompt manager 116 includes a prompt generation module 136 and a cognitive interaction module 138. In some examples, the prompt manager 116 includes prompt templates, prompt assessment, prompt registration, and prompt reusability. In general, the prompt generation module 136 enables a prompt to be generated using a prompt template that is specific to the LLM 134 that is to be queried. The prompt may be assessed (e.g., for quality, accuracy) before being used to query the LLM 134 and may be registered and stored for reuse (e.g., avoid consumption of resources in recreating the prompt for subsequent queries). In some examples, the cognitive interaction module 138 provides for content processing, such as text processing (e.g., sentiment analysis, NLP, translation), optical character recognition (OCR), image processing, audio/video processing (e.g., speech-to-text, speech simulation, audio simulation), and other data processing discussed herein.

The prompt manager 116 may provide guidelines for generating the prompts for the LLM(s) 134.

In some examples, the prompt manager 116 may provide the guidelines for generating instructional prompts. The instructional prompts may include direct instructions to include keywords in responses. For example, an instructional prompt may be "What specific toxins are present in the cells of phytoplankton that could potentially leak into water?".

In some other examples, the prompt manager 116 may provide the guidelines for generating contextual prompts. The contextual prompts may use keywords in context that makes it necessary for the keywords to appear in responses. For example, a contextual prompt may be "Can you explain how "harmful pathogens" infiltrate the "water distribution system" through "specific routes"?".

In some other examples, the prompt manager 116 may provide the guidelines for generating reiteration-based prompts. The reiteration-based prompts may involve emphasizing importance of specific keywords by repeating the specific keywords in questions and signaling to include the specific keywords in the responses. For example, the reiteration-based prompt may be "Can you explain some of the distributing routes, and specifically those distribution routes through which pathogens can infiltrate the water distribution system?".

In some other examples, the prompt manager 116 may provide the guidelines for generating entity-based prompts. The entity-based prompts may include entities (e.g., to include specific entities in the prompt). For example, "Provide detailed information about waterborne pathogens such as viruses, bacteria, cyanobacteria, diatoms, and vectors, focusing particularly on the harmful conditions they cause in human health and aquatic ecosystems".

In some other examples, the prompt manager 116 may provide the guidelines for generation of the prompts by experimenting with different prompt lengths. The prompts with a large size (e.g., long prompts) may provide more context which are more aligned responses, but over long prompts may be complex and confusing. On the other hand, the prompts with a small size (e.g., small prompts) are less specific but may be easy to process.

In some other examples, the prompt manager 116 may provide the guidelines for generation of the prompts using follow-up questions. The follow-up questions may involve posing queries that naturally incorporate keywords from an initial question. For example, a follow-up question may be, "What actions would you suggest to prevent harmful pathogens from infiltrating the water distribution system?".

In some other examples, the prompt manager 116 may provide the guidelines for generation of the prompts that are comparative. The comparative prompts encourage the LLM(s) 134 to compare different concepts, ensuring that relevant keywords are included in the responses. For example, a comparative prompt may be, "How does the impact of cyanobacteria on aquatic ecosystems compare to that of diatoms?". Additionally, the prompt manager 116 may provide guidelines for creating cause-and-effect prompts, which requires the LLM(s) 134 to explain relationships between keywords, ensuring their inclusion in the responses. For example, a cause-and-effect prompt may be, "What are the effects of toxins from phytoplankton leaking into water on human health, and how do they occur?".

In some other examples, the prompt manager 116 may provide the guidelines for creating a hypothetical scenario in the prompts. The hypothetical scenario may enable the LLM(s) 134 to use specific keywords in the responses. For example, the prompt including the hypothetical scenario may be "Imagine a scenario where a city's water distribution system has been infiltrated by harmful pathogens. How would this occur, and what would be the consequences?"

In some other examples, the prompt manager 116 may provide the guidelines for generating problem-solution prompts. The problem-solution prompts present a problem involving certain keywords and ask for suggested solutions. For example, a problem-solution prompt may be, "If a water distribution system is infiltrated by harmful pathogens, what would be an effective solution to mitigate this issue?".

In some other examples, the prompt manager 116 may provide the guidelines for generating the prompts that instruct the LLM(s) 134 to use hypothesis testing which involves asking the LLM(s) 134 to confirm or refute statements involving specific keywords. For instance, a hypothesis-testing prompt may be, "Phytoplankton toxins are the primary source of water pollution. Do you agree or disagree? Explain your answer".

In some other examples, the prompt manager 116 may provide the guidelines for generating the prompts that instruct the LLM(s) 134 to request clarification, which involves prompting the LLM(s) 134 to explain statements that include specific keywords. For example, a clarification request may be, "Experts state that toxins from phytoplankton can contaminate water sources. Can you clarify what this means?".

In some other examples, the prompt manager 116 may provide the guidelines for generating the prompts that instruct the LLM(s) 134 to provide examples which involves prompting the LLM(s) 134 to present examples or case studies involving certain keywords. For example, a request for examples may be, "Can you give some examples of how waterborne pathogens like viruses and bacteria can infiltrate a city's water distribution system?".

In some other examples, the prompt manager 116 may provide the guidelines for generating the prompts that instruct the LLM(s) 134 to prioritize keywords which explicitly directs the LLM(s) 134 to focus on specific keywords in its response. For example, a keyword prioritization prompt may be, "In discussing the contamination of water sources, prioritize the role of harmful pathogens and phytoplankton toxins in your response".

In some other examples, the prompt manager 116 may provide the guidelines for generating the prompts that instruct Additionally, the guidelines may instruct the LLM(s) 134 to synthesize information which involves combining multiple keywords into a cohesive overview. For example, a request for synthesis may be, "Can you synthesize information on waterborne pathogens, the impact of phytoplankton toxins, and their infiltration into the water distribution system?".

In some other examples, the prompt manager 116 may provide the guidelines for generating the prompts that instruct the LLM(s) 134 to evaluate a situation or critique scenarios involving specific keywords. For example, a request for evaluation may be, "How would you evaluate the risk to human health posed by the infiltration of harmful pathogens into a city's water distribution system?".

In some other examples, the prompt manager 116 may provide the guidelines for generating the prompts that instruct the LLM(s) 134 to make predictions, which may involve prompting the LLM(s) 134 to forecast outcomes based on certain keywords or concepts. For example, a request for prediction may be, "What do you predict would happen if toxins from phytoplankton were to leak into a city's water supply?".

In general, the GAI system(s) 106 (e.g., third-party GAI systems) may be accessed using a GAI integration platform of the present disclosure. The GAI system(s) 106 includes GAI interface(s) 140 for interacting with respective LLM(s) 134. For example, a GAI interface 140 may include an Application Programming Interface (API) that is used to interact with an LLM 134. The LLM(s) 134 may provide various GAI services including, but not limited to, text generation, embedding generation, image generation, audio generation, video generation, and the like.

Figure 2:
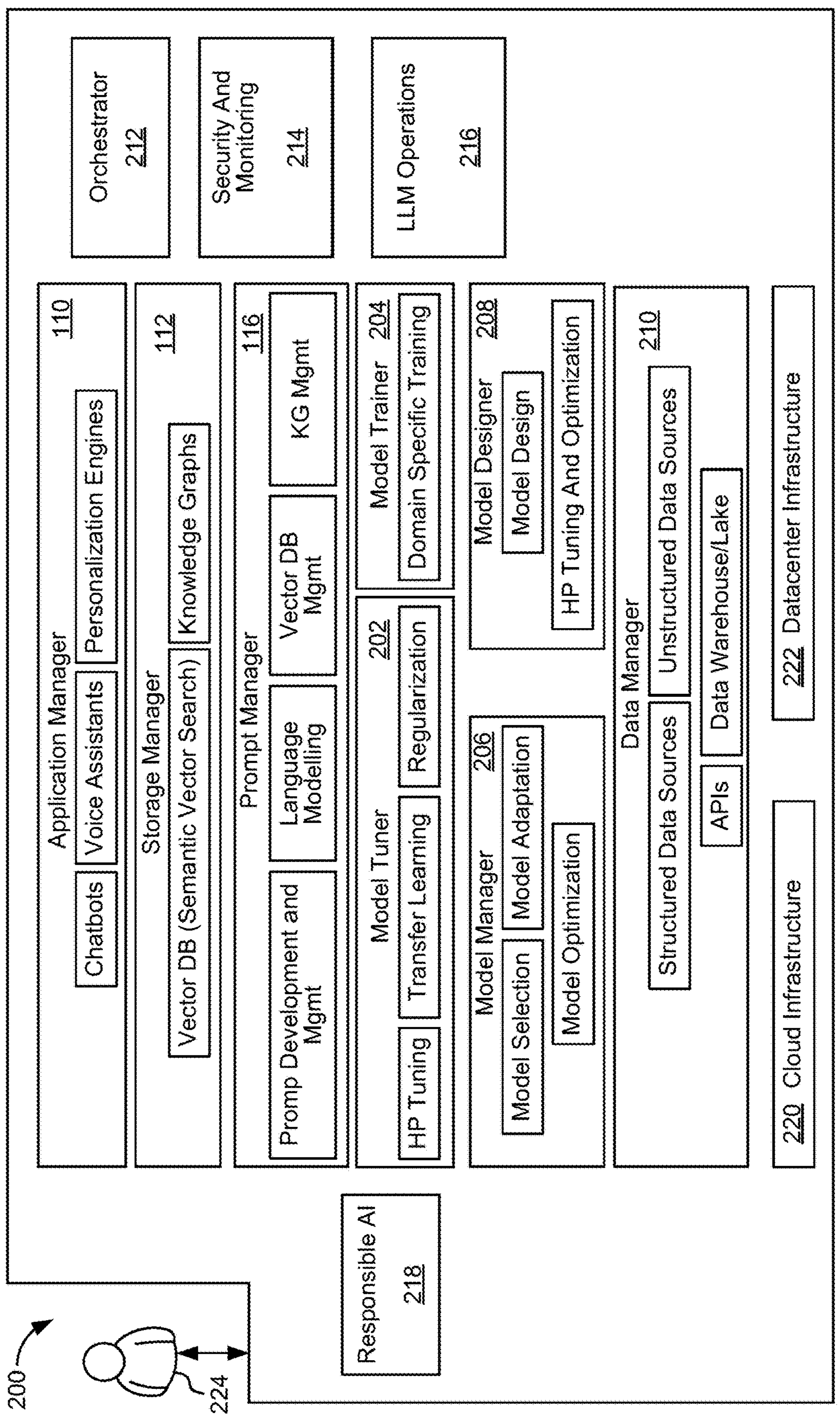
FIG. 2 illustrates an example architecture including a GAI integration platform of the present disclosure.

FIG. 2 illustrates an example architecture 200 including the GAI integration engine 108 of the present disclosure. FIG. 2 is explained in conjunction with FIG. 1. In general, the example architecture 200 of FIG. 2 is representative of a multi-layered, end-to-end framework of the GAI integration engine 108. In FIG. 2, the example architecture 200 includes the application manager 110, the storage manager 112, the prompt manager 116, a model tuner 202, a model trainer 204, a model manager 206, a model designer 208, a data manager 210, an orchestrator 212, a security and monitoring component 214, an LLM operations component 216, a responsible AI component 218, a cloud infrastructure component 220, and a datacenter infrastructure component 222.

The storage manager 112 includes a vector database (DB) (e.g., to support semantic vector search) and one or more Knowledge Graphs (KGs). In some examples, a vector may be described as an n-dimensional, numerical representation of information (e.g., n=1536). In some examples, a KG may be described as a representation of real-world entities and their relationships in a database and used to capture the context of any conversation and identify similar relations. In some examples, the storage manager 112 may be described as a context setting layer that hosts an organizational knowledge as a searchable interface. For example, prompts to the LLM 134 are augmented with domain data and/or organizational data through the storage manager 112. In some examples, context may be provided for prompts in the form of few-shot examples to provide a few-shot prompt. In some examples, providing the context with the prompt may be referred to as few-shot learning. In NLP, few-shot learning (also referred to as in-context learning and/or few-shot prompting) is a prompting technique that enables the LLM 134 to process examples before attempting a task (e.g., generating text responsive to a prompt). The few-shot examples are input to the LLM 134 with a prompt to prime the LLM 134 to provide context for queries submitted to the LLM 134. For example, few-shot examples may inform the LLM 134 as to what the response to the prompt may look like. In some examples, few-shot examples may be determined from the vector database, which stores information as multidimensional vectors (also referred to as embeddings). In some examples, few-shot examples may be provided based on data stored in a knowledge graph.

The prompt manager 116 includes prompt development and management, language modelling, vector DB management, and knowledge graph management. The prompt manager 116 provide prompts that represent appropriate queries in an appropriate sequence to the LLM 134. The prompt manager 116 connects with the vector DB and the knowledge graphs of the storage manager 112 to provide, for example, domain-based context and other details that may be provided to the LLM 134 to enable the LLM 134 correctly interpret and answer the prompt. For example, the prompt manager 116 may enable provisioning of a prompt based on a sentiment and/or an emotional state of a user that provides input to the application. In this example, the user input may be processed to determine sentiment and/or emotional state and a prompt may be provided based thereon. The sentiment and/or emotional state may be determined only based on an explicit consent received from the user. As another example, the prompt manager 116 may enable provisioning of a prompt based on enterprise data, such that the LLM 134 response is specific to a context of the enterprise data.

The model tuner 202 includes hyperparameter (HP) tuning, transfer learning, and regularization. In some examples, the LLM 134 may be fine-tuned for one or more specific tasks. In some examples, fine-tuning may be described as a process, in which task-specific training data may be used to fine-tune the LLM 134 (e.g., a pre-trained foundational LLM) and/or a custom LLM to ensure that the LLM(s) 134 may generate specific formatted responses. Fine-tuning enables the LLMs 134 to answer in a specific format and structure that may be suitable for organizational needs of an enterprise.

The model trainer 204 includes domain-specific training capabilities. For example, some LLMs 134 may be customized and fine-tuned to focus on specific domains. This customization allows the LLMs 134 to generate responses and formats tailored to particular fields or subjects. The model manager 206 includes model selection, model adaptation, and model optimization. In some examples, the model manager 206 enables access to the LLMs 134 that are pre-trained and offered as managed services by multiple third-parties (vendors) (e.g., OpenAI, SambaNova, ScaleAI). Such LLMs may be described as off-the-shelf LLMs 134 that are accessed as a service (e.g., through respective APIs).

The model designer 208 includes model design and hyperparameters (HP) tuning and optimization. In some examples, customized models are typically available as public models and may be downloaded and customized (e.g., in terms of training, re-training, fine-tuning, etc.). The customized models may be deployed with a cloud account and owned and managed by a project team (e.g., of a respective enterprise). The data manager 210 enables access to structured data sources, unstructured data sources, Application Programming Interfaces (APIs), and data warehouses and/or data lakes. In some examples, building an application that leverages the LLM 134 and that is powered by knowledge and context of an enterprise may require access to a knowledge base of the enterprise. The data manager 210 enables such data access for the application. Typically, the enterprise data resides on a central data platform and/or a central data warehouse.

The orchestrator 212 includes workflow management, deployment and scaling, and API management. In some examples, the orchestrator 212 connects services with knowledge and datasets to orchestrate end-to-end flow of application interactions with the LLMs 134. As a non-limiting example, Apache Airflow may be used to provide the orchestrator 212. The orchestrator 212 undertakes various tasks including generating a response for each prompt of a plurality of prompts by utilizing the LLM 134. The generation of response process begins upon receiving data associated with each prompt, ensuring that each response is appropriately tailored to the corresponding prompt. Following response generation, the orchestrator 212 is responsible for storing both the data associated with each prompt and the corresponding response in at least one memory 104. This storage creates a clear association between the prompts and their respective responses which facilitates efficient data management and retrieval. Additionally, the orchestrator 212 generates evaluation metrics based on user-specified criteria by analysing data from a subset of prompts or their responses to evaluate the responses against various aspects. The evaluation metrics provide a means to assess the quality and relevance of the responses produced by the LLM 134. The orchestrator 212 generates KG visualizations or numerical scores based on the evaluation metrics. The KG visualizations or a numerical score may be used to display performance of the LLM 134. Such KG visualizations and the numerical scores enable users to determine whether the LLM 134 requires further optimization or tuning to improve their performance. This is further explained in detail in conjunction with FIG. 3.

By way of an example, the chatbots, voice assistant, personalization engines, or the like may be used to render performance of the LLM 134 to a user 224. Further, based on the performance, the user 224 may determine whether the LLM 134 requires further optimization or tuning to improve their performance. The application manager 110 may serve as an interface for the user to interact with and evaluate the performance of the LLMs 134. Through the application manager 110, the user 224 may initiate and manage various application workflows, including providing an input to the LLMs 134 and analysing the responses. By leveraging features such as detailed performance metrics and response evaluations, the user 224 may effectively assess how well the LLM 134 is meeting their needs. If the performance of the LLM 134 is not meeting the desired standards of accuracy, relevance, or contextual appropriateness, the user 224 may determine whether optimization or tuning is necessary. The optimisation and tuning may involve adjusting hyperparameters, refining training data, or integrating additional domain-specific knowledge.

The security and monitoring component 214 includes enterprise security, data and model privacy, threat management, and monitoring. In some examples, the security and monitoring component 214 addresses threats and security concerns regarding the applications and their use of the LLMs 134, and how the LLMs 134 themselves are storing and using the data.

The LLM operations component 216 includes model management, prompt management, fine-tuning and customization, and monitoring. In some examples, the LLM operations component 216 addresses considerations and capabilities needed to operationalize LLM projects including the applications, the data, and the LLMs 134.

The responsible AI component 218 addresses potential shortcomings of the LLMs 134. For example, and as introduced above, the LLMs 134 are generative AI models that generate text or other content that is subject to drawbacks (e.g., bias, factual inaccuracies). The responsible AI component 218 focuses on what and how to evaluate the content generated to ensure it is acceptable (e.g., factually, socially) for use in applications.

In some examples, the cloud infrastructure component 220 aligns with the data manager 210. Typically, enterprises use cloud-based data storage to store their data. Example cloud infrastructures include, without limitation, Microsoft Azure, Amazon Web Services (AWS), and Google Cloud Platform (GCP). In general, cloud infrastructures provide tools, services, and security to host applications in a cloud environment. In some examples, the datacenter infrastructure component 222 includes on-premises datacentres for hosting applications and/or LLMs in enterprise-specific datacentres.

Figure 3:
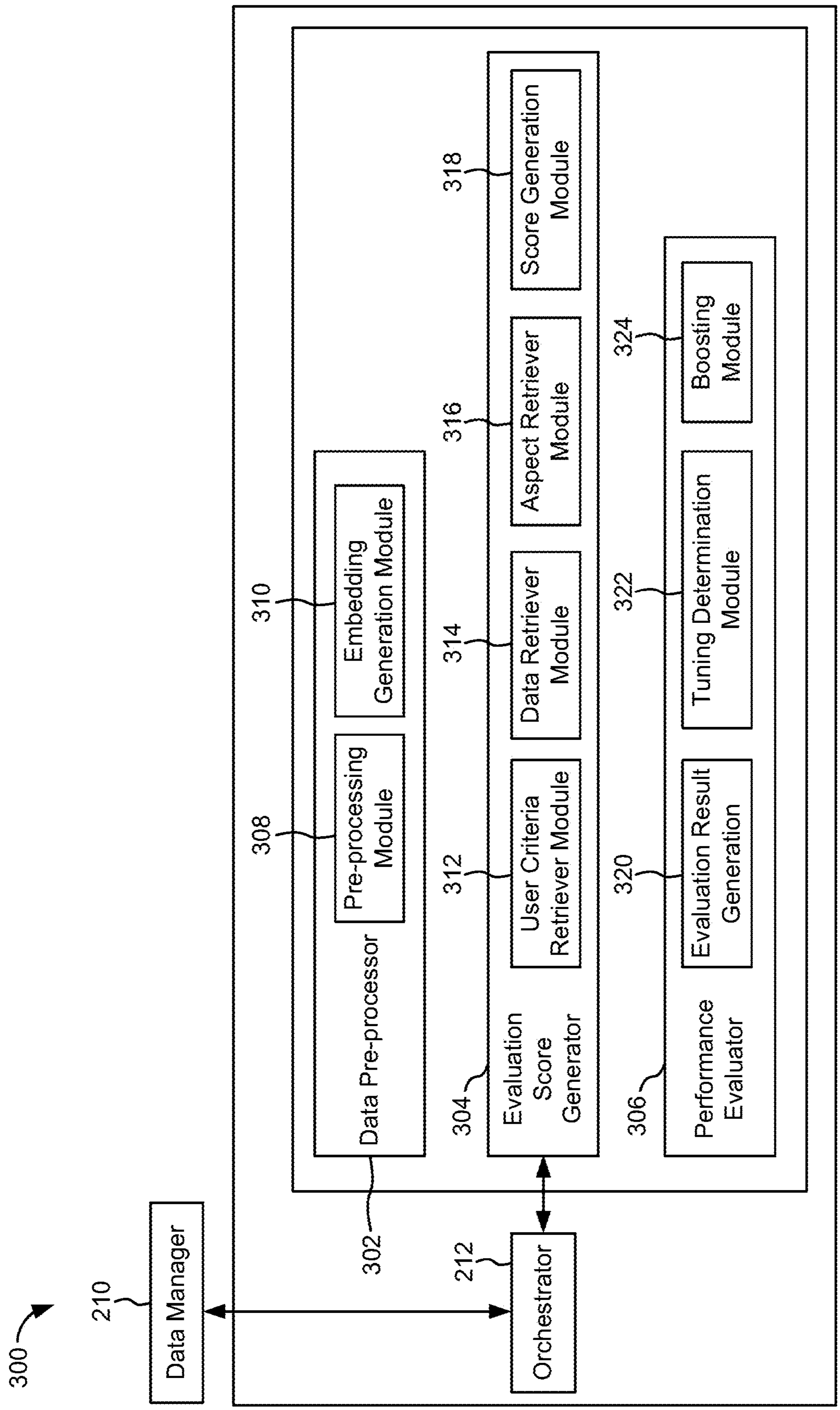
FIG. 3 illustrates an example conceptual architecture of a GAI integration engine for evaluating integration of Responsible Artificial Intelligence Operations (RAIOPS) and Large Language Model Operations (LLMOPS), in accordance with implementations of the present disclosure.

FIG. 3 illustrates an example conceptual architecture 300 of the GAI integration engine 108 for evaluating integration of RAI Operations (RAIOPS) and LLM Operations (LLMOPS), in accordance with implementations of the present disclosure. FIG. 3 is explained in conjunction with FIG. 2. As depicted in FIG. 3, the conceptual architecture 300 includes the data manager 210, the orchestrator 212, a performance evaluation engine that further includes a data pre-processor 302, an evaluation score generator 304, and a performance evaluator 306. When a new evaluation cycle begins, the orchestrator 212 requests data from the data manager 210 for generating and evaluating LLM performance. Further, the data manager 210 supplies the orchestrator 212 with the required data. The data may be then passed to the data pre-processor 302, where the data is prepared for analysis. The data may include an association of the data associated with each of the prompts and the data associated with the response respective to each of the prompts.

The data pre-processor 302 prepares the data for analysis by cleaning, transforming, and organizing the data to ensure high-quality input for evaluation tasks. The data pre-processor 302 ensures that the data used in evaluation tasks is of high quality and appropriately formatted. The data pre-processor 302 includes a pre-processing module 308, and an embedding generation module 310.

The pre-processing module 308 prepares the data for analysis by performing various techniques such as dimensionality reduction techniques, clustering techniques, and/or the like. The dimension reduction techniques may be applied on the data, which may simplify the high-dimensional data into a lower-dimensional form while preserving key features and structures. In some other examples, the pre-processing module 308 may use techniques such as Principal Component Analysis (PCA) and t-Distributed Stochastic Neighbor Embedding (t-SNE) to make the data more interpretable and easier to visualize, which enhances the transparency and understandability of the data. In some other examples, the pre-processing module 308 may use clustering methods, such as Latent Dirichlet Allocation (LDA), k-means clustering, Word2Vec, and/or the like, to group similar texts in the data based on semantic relationships. The grouping helps in identifying patterns and topics within the data, providing valuable insights into its thematic organization. The pre-processing module 308 may also evaluate readability, clarity, and accuracy of the texts in the data to ensure that responses in the data are not only understandable but also reliable. The pre-processing module 308 may also perform Lexical and structural analysis to examine vocabulary usage and language structure, including grammar and syntax. Following the Lexical and structural analyses, the pre-processing module 308 may perform syntactical and semantic analysis, which assess grammatical correctness and the ability of the LLMs 134 to identify and quantify semantic similarities between the texts in the data. The linguistic metrics also play a role, evaluating the complexity of the language and structural elements of sentences, such as conference resolution and dependency parsing.

The embedding generation module 310 may convert the data in the textual format into numerical representations, known as embeddings, which capture the semantic meaning of the text in the data. The embeddings may be used for generating knowledge graph visualizations that provide an overview of a knowledge structure encoded in the responses included in the data. The knowledge graph visualizations are used to identify inconsistencies and understanding the relationships between different pieces of information in the data. The embedding generation module 310 may also generate numerical metrics by comparing embeddings of the responses against a baseline, which is useful for detecting drift and assessing response accuracy.

In some implementations, the pre-processing module 308 may also support A/B testing, allowing for the comparison of different versions of the responses included in the data to evaluate performance variations. The A/B testing may address robustness of RAIOPS and include feature ablation and content moderation guidelines to evaluate robustness of Responsible AI (RAI) parameter, thereby ensuring compliance with standards. The A/B testing may include establishing a connection to the LLM 134, which may generate responses based on test inputs. The generated responses may then be rigorously scrutinized for inaccuracies, inconsistencies, and any harmful or inappropriate content. Therefore, the A/B testing may ensure fulfillment of quality and safety requirements.

The feature ablation may include techniques such as random deletion, swapping, insertion of words, removing adverbs, replacing alphabets with numerical values, removing stop words, adjective synonym and antonym swapping, swapping cohyponyms, adding context tags (such as [START] or [END]), data perturbations, changing tense and voice, introducing misleading information, toxicity, and bias to the data, adding contractions, abbreviations, and slangs, dyslexic word swapping, and/or changing text cases. Effectiveness of the above-mentioned techniques may be calculated using an average drop in cosine similarity metric.

Furter, the content moderation may include creation and enforcement of prohibited, permitted, recommended sections, and categories evaluated in the responses. A prohibited section may list harmful behaviors that needs to be avoided by the LLM 134, such as promoting violence or hate speech. The permitted section may outline acceptable behaviors, such as discussing violence and hate in a historical or informative context. The recommended section may guide ideal behavior of the LLM 134, such as promoting peaceful conflict resolution and empathy. The responses obtained from the LLM may be checked for coverage of categories like violence and hate, sexual content and profanity, criminal activities, guns and illegal weapons, regulated substances, self-harm, financial sensitive data, medical and health information, personal and confidential information, misinformation and fake news, gambling and betting, cybersecurity and hacking, political bias, toxic behavior, prejudice, discrimination, disinformation, narratives and disinformation such as narrative wedging, narrative manipulation, narrative persuasion, narrative seeding, and narrative reiteration, religious content, deceptive behavior, and/or privacy invasion.

In addition, the pre-processing module 308 may also employ security related techniques such as masking, encryption, and anonymization to protect sensitive information in the data and maintain confidentiality of the data. Therefore, the pre-processing module 308 may enhance quality and effectiveness of the data used in evaluation of the LLMOPs.

Therefore, by performing the various techniques such as, the dimensionality reduction techniques, the clustering techniques, the security related techniques, and/or the like, the pre-processing module 308 may efficiently prepare the data for insightful analysis. The embedding generation module 310 may also complement these functions by providing the numerical representations and visualizations of the data, which are essential for assessing and improving performance of the LLM 134, while ensuring data security and privacy. The orchestrator 212 may oversee the execution of the evaluation workflow. The orchestrator 212 may ensure that the prepared data (e.g., pre-processed data) is fed into the evaluation score generator 304. Pre-processing of the data/generation of the prepared data is described in detail in conjunction with FIG. 4.

The evaluation score generator 304 includes a user criteria retriever module 312, a data retriever module 314, an aspect retriever module 316, and a score generation module 318. The user criteria retriever module 312 may collect and manage user-specified criteria for evaluating the performance of the LLM 134. The user criteria retriever module 312 may also allow the user to set various evaluation parameters such as frequency of metric generation, specific aspects to be measured, and any custom thresholds or benchmarks. The user-specified criteria include generating at least one evaluation metric at a preconfigured time interval and/or generating the at least one evaluation metric upon generating a preconfigured number of responses. By retrieving the user-defined criteria, the user criteria retriever module 312 ensures that the evaluation process aligns with user's expectations and requirements, providing a tailored assessment of performance of the LLM 134.

By way of an example, consider a scenario where a company using the LLM 134 for customer support may set user-specified criteria to evaluate the performance of the LLM 134 both periodically and based on interaction volume. For example, the user-specified criteria include generating evaluation metrics every 24 hours and also after every "100" responses. This means that daily, the evaluation metrics are assessed on daily basis like accuracy, relevance, and user satisfaction for all interactions within that day, while also performing a detailed evaluation once the LLM 134 has processed "100" queries.

The data retriever module 314 may access and organize the data required for evaluation. The data referred herein may be the pre-processed data by the data pre-processor 302. The data retriever module 314 retrieves the pre-processed data including both the data associated with the prompts and the responses generated by the LLM via the orchestrator 212. The data retriever module 314 ensures that the data is accurately sourced from the relevant databases or storage systems and is correctly linked with the associated prompts. It is essential for maintaining the integrity of the evaluation process, as it ensures that the evaluation metrics are based on comprehensive and accurate data sets.

The aspect retriever module 316 may identify and retrieve aspects or criteria that may be used to evaluate the performance of the LLM 134. The aspects may include relevance, inconsistency, security, drift detection, robustness, bias and fairness detection, accuracy and appropriateness of the response, transparency and explainability, hallucination detection, and/or language translation or caching sustainability. The aspects are further described in detail in conjunction with FIG. 5-FIG. 20. The aspect retriever module 316 may gather information on which aspects are to be measured based on the user-specified criteria and ensure that such aspects are properly integrated into the evaluation framework. By retrieving relevant evaluation aspects, the aspect retriever module 316 supports a thorough and multifaceted analysis of the LLM's performance.

The score generation module 318 may generate the evaluation metric for evaluating the response respective to each prompt for the retrieved aspects. The score generation module 318 may generate the evaluation metric based on the user-specified criteria, the data associated with a subset of the prompts, or the data associated with the response respective to the subset of the prompt. For example, consider a scenario where the score generation module 318 generates an evaluation metric for each of the aspects such as drift detection, relevance, and security. In such a scenario, the evaluation metric generated for the drift detection may identifies a content drift, a data drift, a temporal drift, a tone drift, an upstream drift, a domain drift, a covariate drift, a prior probability drift, a population drift, a feature drift, a sampling bias drift, a seasonal drift, a conceptual drift, an adversarial attack drift, an environmental drift, a response drift, a prompt drift, and/or embeddings drift. The evaluation metric generated for the relevance may evaluate the response for one or more of: misinformation, abuse, toxic content, bias, text inconsistencies, and/or relevancy. The evaluation metric generated for the security may evaluate the subset of the prompts for one or more of: a prompt injection attack, a prompt leakage attack, a prompt poisoning attack, and/or a prompt jailbreaking attempt.

The score generation module 318 may also calculate a numerical score or a knowledge graph visualization in accordance with the evaluation metric. The score generation module 318 may integrates the evaluation metrics generated for the aspects into the numerical score or the knowledge graph visualization that represents the overall effectiveness of the LLM 134.

Further, the performance evaluator 306 includes an evaluation result generation module 320, a tuning determination module 322, and a boosting module 324. The evaluation result generation module 320 may synthesize the outcomes of the evaluation process into meaningful results. For example, the evaluation result generation module 320 may processes the numerical scores and metrics generated by the evaluation score generator 304 to create detailed evaluation reports. The evaluation reports may include visualizations, trend analyses, and summaries of performance metrics. The evaluation result generation module 320 may provide a consolidated view of how the LLM 134 is performed across the various aspects, facilitating an understanding of its strengths and weaknesses.

The tuning determination module 322 may analyzes the evaluation results to decide whether the LLM 134 requires further optimization or tuning. Based on the numerical scores and issues (if identified), the tuning determination module 322 may determine if adjustments to the LLM 134 are necessary to improve its performance. The tuning determination module 322 may suggest specific tuning actions, such as retraining the LLM with additional data, adjusting hyperparameters, or modifying the LLM architecture. The tuning determination module 322 may ensure that the LLM 134 evolves to meet the desired performance standards and operational goals.

After generating evaluation results and determining if the LLM requires tuning, the orchestrator 212 communicates the information back to the data manager 210 if additional data or adjustments are needed for evaluating the performance of the LLM 134. Such an iterative process may ensure continuous improvement and refinement of the LLM 134.

The boosting module 324 may enhance the numerical score by applying additional techniques to improve the accuracy of the evaluation. For example, if a synonym match is found between the LLM response of the data and a ground-truth reference, the boosting module 324 may increase the numerical score to reflect this alignment. The boosting module 324 may utilize advanced models, such as BERT (Bidirectional Encoder Representations from Transformers), to detect semantic similarities and ensure that the evaluation is more precise. By incorporating boosting techniques, the boosting module 324 may help in refining the performance metrics and achieving a more accurate assessment of the LLM's capabilities.

For synonym-based boosting, the boosting module 324 may use word-to-word, n-gram, and sentence level comparisons facilitated by a multilingual model, such as a Hugging Face model, which supports various languages. The use of word-to-word, n-gram, and sentence level comparisons may enhance effectiveness of the boosting module 324. The boosting module 324 is designed based on a custom formula determined by a cosine similarity threshold value. Incorporation of methods such as addition, arithmetic mean, harmonic mean, and geometric mean may allow for a combination of different measures of similarity into a single numerical score. For example, the boosting module 324 may enhance the numerical score, when synonyms are identified. Otherwise, the boosting module 324 may reduce the numerical score by reducing lower similarity or distance metrics. To ensure consistency across different measures of similarity, which may have varying ranges, a normalization step may be applied at the end to adjust all scores to a same scale (e.g., from 0 to 1). To address challenges related to polysemy and homonymy, the boosting module 324 may use clustering and dimensionality reduction algorithms, including Density-Based Spatial Clustering of Applications with Noise (DBSCAN), Principal Component Analysis (PCA), and t-Distributed Stochastic Neighbor Embedding (t-SNE) to enhance the numerical score. The boosting module 324 may also incorporate random bootstrapping techniques and a statistical method used to estimate sampling distributions, standard errors, confidence intervals, and statistical significance and accordingly to enhance the numerical score. The random bootstrapping techniques may collectively refine the performance metrics, ensuring a more accurate and comprehensive assessment of the LLM's capabilities.

In some examples, the boosting module 324 may use the enhanced numerical score-based text processing methods, such as Natural Language Processing (NLP) methods. Using the text processing techniques, the boosting module 324 may compare textual qualities, assess similarities between the prompts and the responses, and identify inconsistencies through a multi-faceted approach. It should be noted that implementations of the present disclosure herein employ some of processing of the text processing methods rather than employing the text processing methods entirely. For example, the boosting module 324 may use distinct stages of processing and analysis to ensure a comprehensive understanding of the text in the data while capturing both obvious and subtle patterns and relationships within the data, which may otherwise be missed. Such a level of detailed analysis, tailored specifically to comparing the prompts or the ground truth with the responses of the LLM 134. Further, by leveraging prompt engineering techniques, the boosting module 324 may establish a meaningful connection between the prompts and the responses, or between responses and ground truth. Based on the comprehensive understanding of the text in the data and the established meaningful connection between the prompts and the responses, the boosting module 324 may calculate a safe score and use the safe score to determine whether the numerical score requires enhancement. The safe score may be inversely proportional to the numerical score.

In some examples, for more complex metrics, a baseline score has to be derived prior to establishing a threshold and tolerance level of the safe score. Unlike toxicity or bias, for scores such as readability or textual quality, it is not overtly apparent on to how to derive the SAFE score. Therefore, the boosting module 324 may employ the following methodology to derive the safe score for such cases with the complex metrics.

Calculate metrics: The boosting module 324 may compute metrics for the data, prompts, and the generated responses. Computing the metrics may include any relevant measures that are specific to the domain or application. In some examples, the metrics may be computed using available ground truth values.

Analyze results: The boosting module 324 may analyze central tendencies of the metrics derived from multiple runs (e.g., at least 5 runs to generate 5 different responses) to evaluate the average scores and the range of scores. This includes statistical measures such as mean, median, and standard deviation. At this stage, outliers, which are data points that significantly deviate from the rest of the values may be identified and removed to ensure they do not skew the analysis.

Set Baseline: Based on the analysis of the central tendencies, the boosting module 324 may set a baseline score for each metric. The baseline score/value may ideally incorporate ground truth scores, which may be used as a benchmark to measure the performance of future LLM model iterations or different models.

Statistical Analysis: The boosting module 324 may further employ a more in-depth statistical analysis of the metric scores to calculate measures of the central tendencies (mean or median) and measures of dispersion (range or standard deviation). In some examples, the boosting module 324 may consider ground truth values (if available) for the statistical analysis, which may, influence results of the statistical analysis.

Establish Baseline: The boosting module 324 may set up a baseline by considering the results of the statistical analysis and the ground truth values. The baseline is typically the average (mean) performance of the framework on each metric.

Calculate Safe Score: The boosting module 324 may further calculate the safe score to provide a range within which the performance of the LLM is considered acceptable. The range may be set within a certain percentage of the baseline. For instance, if the baseline is 80%, the safe score range may be established as being between a lower bound value of 75% and an upper bound value of 85%, depending on the tolerance for variation in performance. The levels described herein may be determined based on multiple trials to ensure that the lower bound and upper bound are acceptable for the specified use case.

The above-described methodology for calculating the safe score may provide a systematic way to assess the performance of the response obtained from the LLM. Further, it sets a benchmark for acceptable performance (based on the baseline) and establish a range within which performance is considered acceptable (safe score).

Therefore, the GAI integration engine 108 may employ the diverse set of evaluation metrics, including lexical, structural, syntactical, semantic, linguistic, clustering, dimensionality reduction, text quality, knowledge graph visualizations, and numerical metrics, to provide a thorough and multi-dimensional assessment of performance of the LLM. The GAI integration engine 108 may ensure a nuanced understanding of strengths and weaknesses of the LLM 134, allowing for targeted improvements. The GAI integration engine 108 facilitates a detailed analysis of capabilities of the LLM 134, leading to a more refined and effective LLM 134. Additionally, the evaluation metrics contribute significantly to enhancing textual quality of outputs generated by the LLM 134. By employing on aspects such as grammatical correctness, appropriate vocabulary usage, readability, clarity, and semantic accuracy, the GAI integration engine 108 may ensure that the responses generated by the LLM 134 are not only accurate but also user-friendly. The comprehensive evaluation of textual quality helps in generating outputs that are reliable and aligned with user expectations. The GAI integration engine 108 may also improve consistency of the responses through the use of linguistic and syntactical metrics that detect inconsistencies within the outputs. The knowledge graph visualizations may further assist in identifying inconsistencies in knowledge base.

The GAI integration engine 108 may also ensure that the LLM 134 delivers coherent and reliable responses across the different prompts and contexts, maintaining a high level of performance consistency. Moreover, the GAI integration engine 108 may enhance the semantic understanding of the LLM 134 by evaluating how well the LLM 134 maintains the semantic context of the prompts or the ground truth in its responses. The evaluation ensures that the outputs generated by the LLM 134 are contextually accurate and relevant, improving the alignment between prompts and responses and resulting in more appropriate outputs that better meet user needs. The GAI integration engine 108 may use knowledge graph visualizations and dimensionality reduction methods including Python Latent Dirichlet Allocation Visualization (pyLDAvis) for providing insights into the knowledge structure embedded in the responses of the LLM 134. Such methods reveal the relationships and dependencies among different pieces of information, and pyLDAvis may allow for interactive exploration of word clusters and their similarities, offering a deeper understanding of the model's knowledge organization. Further, the numerical metrics may be used to provide clear and quantifiable comparisons between the model's responses and the prompt or ground truth. This data-driven approach supports precise tracking of performance, enabling the identification of specific areas for improvement and ensuring that the model evolves to meet high performance standards. By incorporating these numerical comparisons, the system ensures that the LLM's capabilities are continuously refined and optimized.

Figure 4:
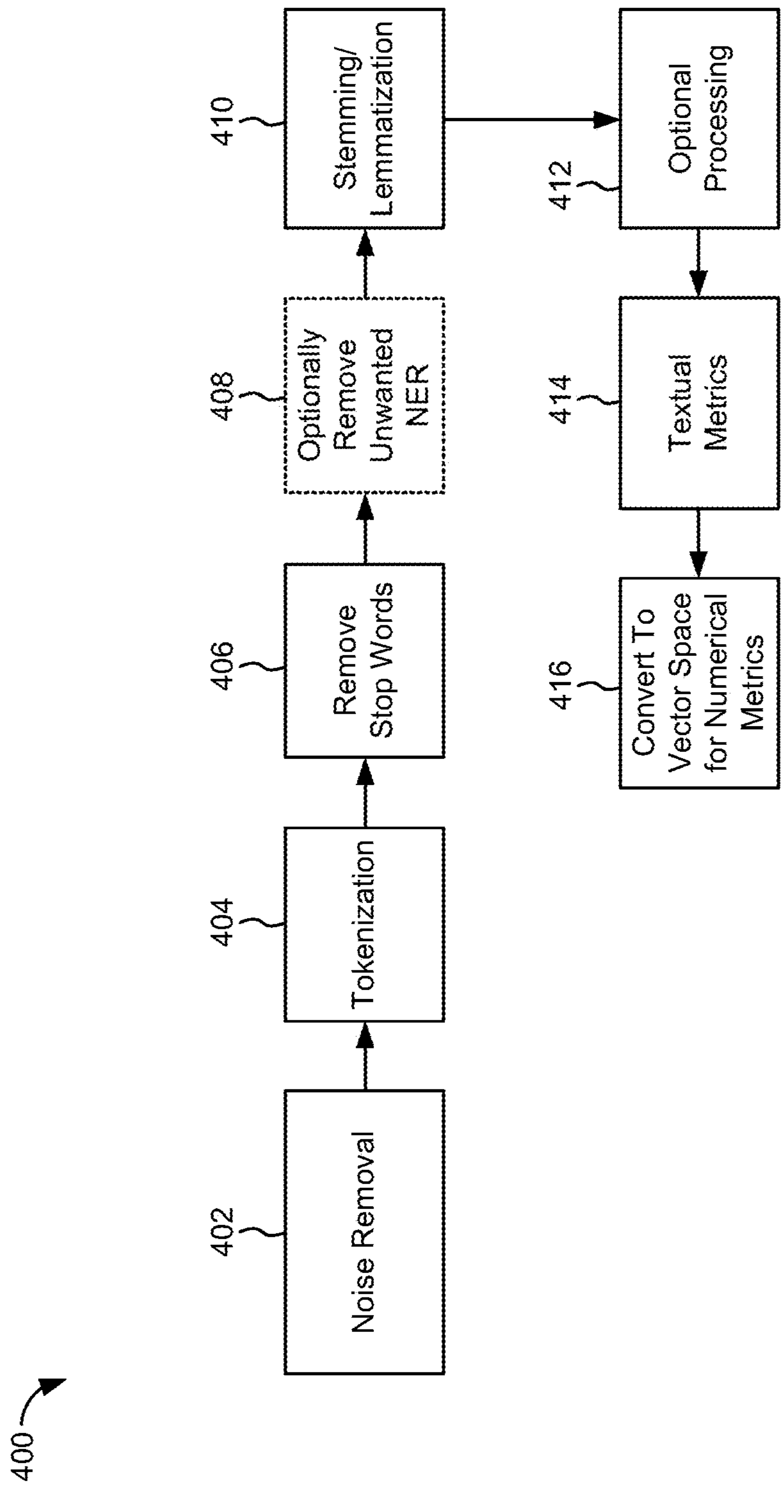
FIG. 4 illustrates an example process flow executed by the data pre-processor, in accordance with implementations described in this disclosure.

FIG. 4 illustrates an example process flow 400 executed by the data pre-processor 302, in accordance with implementations of the present disclosure.

The data pre-processor 302 may perform 402 noise removal and normalization operations on the data associated with the prompts and the responses. This step involves cleaning the data to eliminate any irrelevant or distracting elements. For example, emojis, and Uniform Resource Locators (URLs) (e.g., http tags) may be removed, and all text in the data may be converted to lowercase to maintain consistency. The normalization operations may include other text standardization processes such as correcting misspellings or expanding abbreviations to reduce the variability in text of the data that does not contribute to the core meaning, allowing for more accurate subsequent analysis.

Further, the data pre-processor 302 may perform 404 tokenization. The tokenization may include a process of breaking down the text of the data into individual units referred to as tokens, which may be words, phrases, or symbols. The tokenization may be performed for transforming the text in the data into a format that may be processed further. For example, the tokenization may split sentences in the text into words or phrases, which are then analyzed individually, enabling detailed examination of each component of the text.

Thereafter, the data pre-processor 302 may remove 406 stop words in the data. The stop words are common words such as "and," "the," and "is" that often do not contribute significant meaning to the text in context of text analysis. Removing the stop words helps to focus on more meaningful words that contribute to core content of the text, reducing the complexity of the data and improving the efficiency of analysis.

The data pre-processor 302 may further remove 408 unwanted Named Entity Recognition (NER). Removal 408 of the unwanted NER includes identifying and removing named entities that may not be relevant to specific analysis. In some examples, the entities may be excluded to prevent them from skewing results or to focus on other aspects of the text.

The data pre-processor 302 may perform 410 stemming and lemmatization. The stemming and lemmatization may be used to reduce words in the data to their root forms. The stemming may involve cutting off prefixes or suffixes from the words to achieve a base form. The lemmatization may involve reducing the words to their base or dictionary form. For example, "running" may be reduced to "run." This step helps in standardizing words so that different forms of a word are treated as the same entity, improving accuracy of text analysis.

The data pre-processor 302 may perform 412 an optional processing of the data after performing 410 stemming and lemmatization. The optional processing may involve advanced text representation techniques such as Yet Another Keyword Extractor (YAKE) N-gram, Bag of Words (BoW), and Term Frequency-Inverse Document Frequency (TF-IDF), which enhance the analysis of the text in the data. The YAKE may be used to identify significant n-grams, or combinations of words, within the text of the data to extract key phrases and highlight important contextual elements. Therefore, crucial terms that provide insight into the text's thematic structure may be uncovered. The BoW may be used to represent the text by converting the text into a collection of word frequencies, disregarding the order of words but focusing on their presence and frequency. Therefore, the text may be simplified into a format that may be easily analyzed for patterns in word usage. The TF-IDF may be used to assess significance of the word within the data relative to a broader corpus. The TF-IDF may be further used to calculate a term frequency (a frequency of a term in the data) and an inverse document frequency (the term's rarity across the multiple data), thereby highlighting terms that are crucial for understanding the content while minimizing influence of common words. Together, these methods enhance text analysis by providing varied perspectives on word significance and thematic relevance.

Further, the data pre-processor 302 may generate 414 textual metrics that involves evaluating various aspects of the text in the data such as readability, clarity, and accuracy. The data pre-processor 302 may use metrics like Flesch-Kincaid readability score or word frequency analysis to assess how easily the text may be read and understood. This step ensures that the text meets quality standards and is appropriate for its intended use. The data pre-processor 302 may further convert 416 the pre-processed text data into numerical vectors (in vector space) for numerical metrics using techniques such as word embeddings (e.g., Word2Vec, GloVe) or other vectorization methods. Such a conversion may allow for the application of numerical metrics and facilitate computational analysis, such as similarity comparisons or machine learning algorithms. The vector space representation may capture the semantic meaning of the text in a form that may be processed by various analytical tools and models.

FIGS. 5-20 depict exemplary illustrations of determining the various aspects of the LLM 134, in accordance with implementation of the present disclosure. The integration system 100 may determine the various aspects of the LLM 134 and calculate the evaluation metrics for the various aspects. The various aspects of the LLM 134 may refer to the various aspects associated with the prompts inputted to the LLM 134 and the responses generated using the respective prompts. The evaluation metrics may be calculated for evaluating integration of the RAIOPs with the LLMOPs.

For evaluating the various aspects, the data of the LLM 134 may be obtained. The data of the LLM 134 may include the prompt(s) inputted to the LLM 134 and result(s) generated for the LLM 134 corresponding to the prompt(s). The data may be pre-processed to convert the data into the vector embeddings. Implementations of the present disclosure are further described in conjunction with FIGS. 5-20 by considering the pre-processed data of the LLM 134 including the prompt and the respective result.

Figure 5:
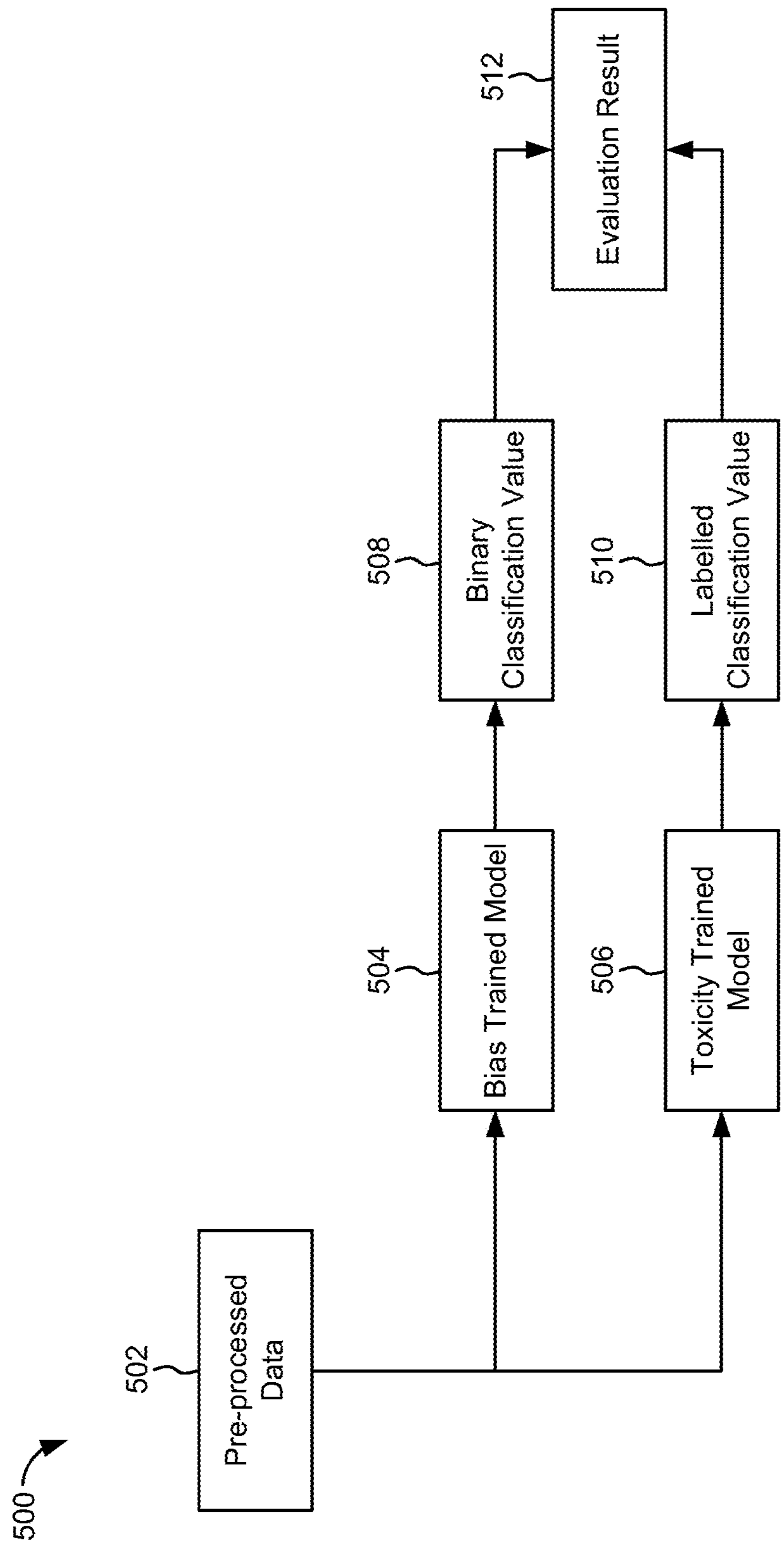
FIG. 5 illustrates an example process flow of evaluating biased element and toxicity in responses generated using an LLM, in accordance with implementations described in this disclosure.

FIG. 5 illustrates an example process flow 500 of evaluating biased element and toxicity in the responses generated using the LLM 134, in accordance with implementations of the present disclosure.

The integration system 100 may handle and prepare/pre-process the data 502 before it is analyzed for bias and toxicity. The data may include the prompts inputted to the LLM 134 and the responses generated using the respective prompts. The prepared/pre-processed data 502 may ensure that the data is in a suitable format for further analysis. During preprocessing, irrelevant information may be removed, text formats may be standardized, and the data may be organized to facilitate effective evaluation. The pre-processed data includes both the prompts and the responses generated by the LLM, which is refined and ready for the further analysis. The pre-processed data is essential for the subsequent steps as it ensures that the high-quality input is used for evaluation.

The integration system 100 includes one or more pre-trained models. For example, the system 500 includes one or more bias trained model(s) 504, and one or more toxicity trained model(s) 506. For bias detection, the integration system 100 inputs the prepared/pre-processed data 502 to the bias trained model 504. The bias trained model(s) 504 may have a binary classifier that derives the embeddings of the prepared data from models such as GloVe, BERT, or Universal Sentence Encoder and outputs a binary classification value 508. The embeddings may help in understanding and identifying biased elements in the responses of the data, by comparing the responses against known biased patterns. The binary classification value 508 may indicate presence or absence (e.g., "1" or "0") of the biased element in the responses. Therefore, the bias trained model(s) 504 may help in determining if the responses are free from prejudiced or discriminatory content based on the trained embeddings and criteria.

For toxicity detection, the integration system 100 inputs the prepared/pre-processed data 502 to the toxicity trained model 506. Examples of the toxicity trained model 506 may include Detoxify, Toxic BERT, RoBERTa, Emotion Model, and/or the like. The toxicity trained model 506 may be trained to classify the text of the data into various categories of toxicity, such as severe toxicity, obscene content, threats, insults, identity attacks, and/or the like. The toxicity trained model(s) 506 may provide a labeled classification 510 that identifies the nature and extent of harmful or toxic content in the responses. The labeled classification 510 may categorize the responses into various toxicity types. The toxicity types may include non-toxic, toxic, or specific types of toxicity like racism, sexism, offensive speech, and/or hate speech. The binary classification value 508 and the labeled classification 510 are processed/synthesized to generate an evaluation result 512. The evaluation result 512 may provide a comprehensive evaluation of the responses of the LLM concerning the biased element and toxicity. By integrating the binary classification and the labeled classification, detailed reports that highlight areas where the LLM may require improvement or adjustment may be generated.

Figure 6:
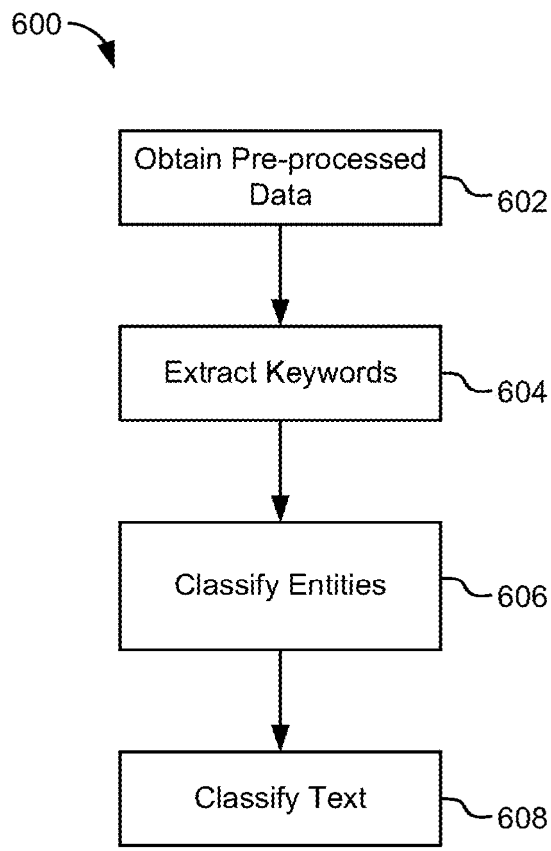
FIG. 6 illustrates an example process flow of evaluating relevancy in text data through a multi-faceted classification system, in accordance with implementations described in this disclosure.

FIG. 6 illustrates an example process 600 of determining the aspect like relevancy in the data of the LLM 134, in accordance with implementations of the present disclosure. The integration system 100 may determine the relevancy in the data of the LLM 134 by performing various methods such as text classification, keyword extraction, and entity recognition. Various advanced techniques may be employed to ensure accurate and relevant assessment of text responses generated by the LLM.

The integration system 100 obtains pre-processed data 602 for ensuring that the text of the data is in a format suitable for detailed analysis. The pre-processing step involves cleaning and formatting the text to remove any noise and make the data consistent for further evaluation.

Upon obtaining the pre-processed data, the integration system 100 extracts keywords from the data. For example, the integration system 100 may use a keyword extraction method like a Yet Another Keyword Extractor (YAKE) to extract the keywords 604 from the pre-processed data (e.g., text). YAKE may an unsupervised, automatic, and language-independent keyword extraction method, which may be used to identify key phrases based on statistical features within the data. YAKE method may be used to score the importance of each word or phrase and is instrumental in identifying the most significant terms that capture the essence of the text. The keywords 604 extracted from both the prompt and the response of the data may be used in measuring the relevance of the response to the prompt. If the response includes key phrases that match or relate to those in the prompt, it suggests that the response is likely relevant, thus enhancing the accuracy of the responses of the LLM.

The integration system 100 classifies entities 606 present in the data. The integration system 100 may use entity classification methods to identify and categorize named entities within the data. Using the predefined categories, the entities may be classified either in 18 or 66 categories, depending on the specificity of a model used for the classification of the entities. The classification of the entities may be used for text similarity detection, as the classification helps in identifying the texts that mention the same entities. If the entities in the response match or relate to those in the prompt, it implies that the response is relevant and accurate. This step improves the accuracy of the LLM by ensuring that the entities mentioned in the responses align with those in the prompts.

Further, the integration system 100 classifies the text 608 in the data. Classification of the text 608 may involve assigning predefined categories to the text based on its content. The integration system 100 may use text classification models such as, but not limited to, BERT, RoBERTa, DistilBERT, and/or BART, for classifying the text 608. The text classification models use unsupervised clustering methods to categorize the text into the topics or themes, which may be used for grouping of the text and metadata purposes. By ensuring that both the prompt and response fall into the same category, the relevance of the response may be determined. This is particularly useful in filtering tasks within Retrieval-Augmented Generation (RAG) models and for ensuring that the responses generated are not only grammatically correct but also on-topic.

Figure 7:
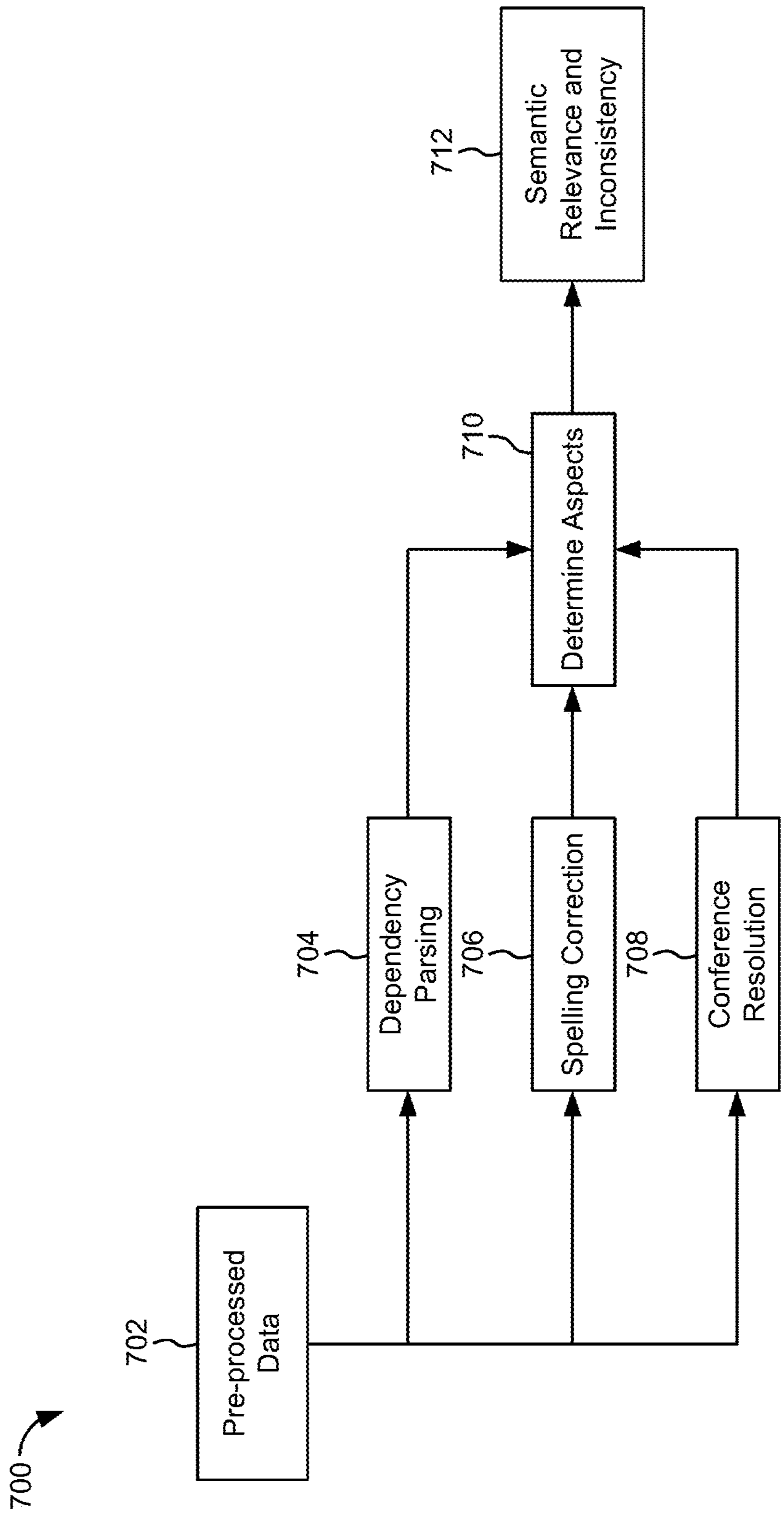
FIG. 7 illustrates an example process flow of determining soundness and robustness, in accordance with implementations described in this disclosure.

FIG. 7 illustrates an example process 700 of determining the aspects like the relevancy and inconsistency in the data of the LLM 134, in accordance with implementations of the present disclosure. FIG. 7 is explained in conjunction with FIGS. 1-6. The integration system 100 may integrate various advanced techniques to assess quality and accuracy of text responses, leveraging dependency parsing, spelling correction, and coreference resolution, from which the relevancy and inconsistency may be determined.

The integration system 100 obtains the pre-processed data 702. The integration system 100 utilizes a dependency parsing 704 to analyze the grammatical structure of sentences in the pre-processed data 702 (including the prompt and the response), determine relationships between words in a sentence, and representing the relationships as a tree structure. With the dependency parsing 704, the integration system 100 understands how different words interact and how the sentence is constructed. By comparing dependency tree structures of both the prompt and the response, the integration system 100 may detect grammatical consistency and logical coherence. If syntactic relationships in the response mirror those in the prompt, it indicates that the response is structurally similar and contextually appropriate. Further, the integration system 100 may apply graph-based dependency parsing on the tree, which representing the complex relationships as directed graphs. The directed graphs may reveal intricate dependency patterns and provide deeper insights into the sentence structure.

Further, the integration system 100 performs a spelling correction 706 for maintaining quality and readability of text. The integration system 100 may employ various tools such as Symspell, which uses distance and frequency-based algorithms, Norvig's probabilistic model, and context-aware correction methods for performing the spelling correction 706. The tools may be used to detect and rectify spelling errors, ensuring that the text is free from typographical mistakes. Accurate spelling is vital for clear communication and prevents misunderstandings that may arise from incorrect spellings. By employing the tools for the spelling correction 706, the integration system 100 ensures that the text is precise and high-quality, enhancing the overall performance and reliability of the LLM 134.

The integration system 100 performs a conference resolution 708 to address a task of identifying when different expressions in the text of the data refer to a same entity (referred to as coreferences). The conference resolution 708 may be used for understanding the continuity and context within a text. By linking pronouns and other referential expressions to their corresponding entities, the conference resolution 708 may ensure that the text maintains coherence and properly addresses the prompt. In some examples, the integration system 100 may also use semantic role-based modeling to analyze relationships between predicates (e.g., verbs) and their arguments (e.g., subjects, objects), further supporting context comprehension. By performing the conference resolution 708, coreferences may be identified and resolved, which may further help in determining if the response correctly refers to the same entities mentioned in the prompt, thus ensuring that the response is contextually relevant and accurate. Outputs of the dependency parsing 704, the spelling correction 706, and the conference resolution 708 may be utilized to determine aspects 710 such as semantic relevance and inconsistency 712 in data of the LLM.

Figure 8:
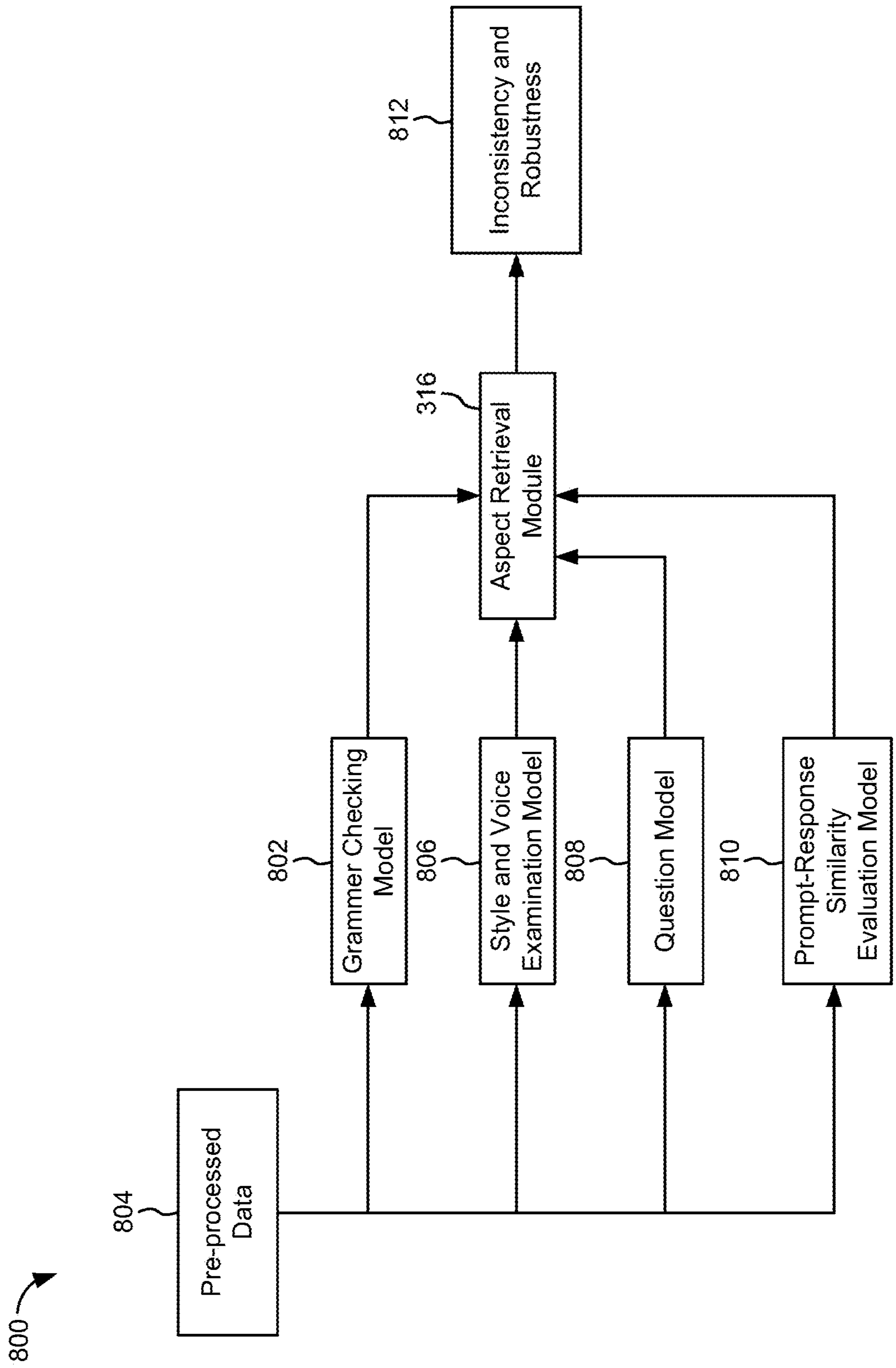
FIG. 8 illustrates an example process flow of assessing various aspects of text processing, in accordance with implementations described in this disclosure.

FIG. 8 illustrates a process 800 for determining the aspect like semantic inconsistency in the data of the LLM 134, in accordance with implementations of the present disclosure. FIG. 8 is explained in conjunction with FIGS. 1-7. The integration system 100 focuses on grammar, style, voice, and similarity between prompts and responses to ensure semantic relevance and consistency.

As depicted in FIG. 8, the integration system 100 uses a grammar checking model 802 to identify grammatical inconsistencies in the pre-processed data 804 of the LLM 134 and correct the identified grammatical inconsistencies to enhance text quality. To identify the grammatical inconsistencies, subject-verb agreement, tense usage, and overall sentence structure in the pre-processed data 804 may be validated. Further, integration system 100 uses a style and voice examination model 806 to distinguish between informal and formal language and between active and passive voices in the pre-processed data 804, which may tailor the text to different contexts, ensuring the responses of the LLM 134 are appropriate for the intended audience. Thereafter, the pre-processed data 804 may be classified into categories such as informal or formal, and active or passive to align with the desired communication style.

The integration system 100 also uses a question model 808 for generating and comparing questions based on the pre-processed data 804. The question model 808 may be used to further assess the similarity between generated questions and existing prompts to detect duplicates and ensure relevance. The question model 808 may be used to support development of question-answering by verifying if new questions are semantically equivalent to or entail original prompts. The integration system 100 further uses a prompt-response similarity evaluation model 810 that employs binary paraphrasing to determine if two sentences in the pre-processed data are paraphrases of each other. The determination may be used for understanding if different phrasings convey the same meaning. In some examples, textual entailment may also be used to evaluate whether the response logically follows from the prompt, ensuring consistency in the responses of the LLM 134. Additionally, a regressive semantic similarity metric may be used to measure a degree of similarity between the two texts in the pre-processed data 804 on a continuous scale, providing a nuanced comparison of semantic content. The grammar checking model 802, the style and voice examination model 806, the question model 808, and the prompt-response similarity evaluation model 810 may be pre-trained models. Outputs of the grammar checking model 802, the style and voice examination model 806, the question model 808, and the prompt-response similarity evaluation model 810 may be used by the aspect retriever module 316 for retrieving aspects like the inconsistency and robustness 812 of the LLM 134. Overall, the integration system 100 may provide a robust evaluation that ensures that the responses are grammatically correct, stylistically appropriate, contextually relevant, and semantically consistent with the given prompts.

Figure 9:
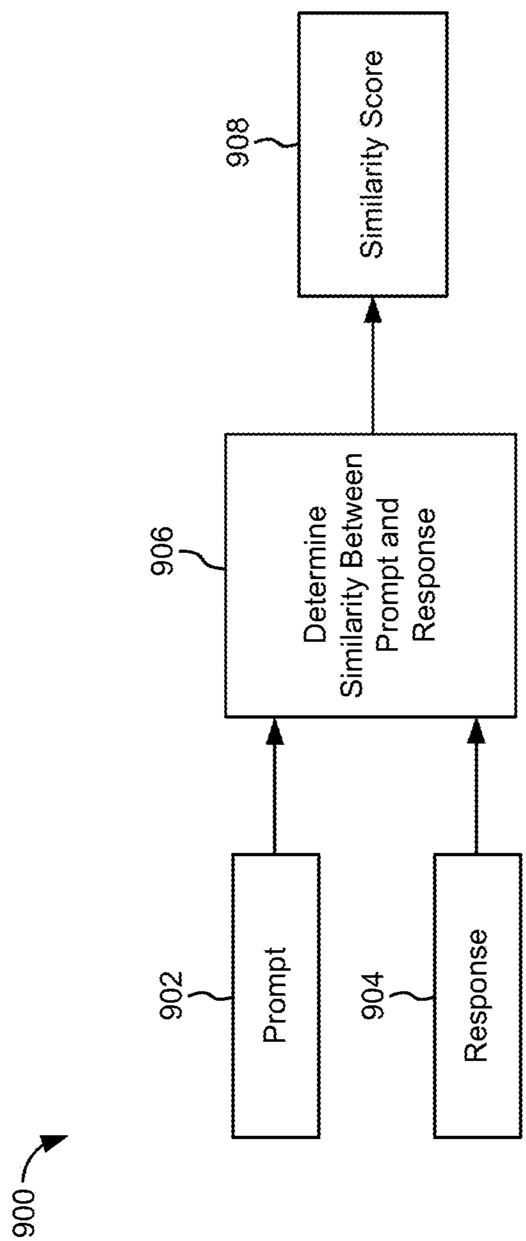
FIG. 9 illustrates an example process flow of evaluating similarity between prompts and responses using embedding techniques and statistical methods, in accordance with implementations described in this disclosure.

FIG. 9 illustrates a process 900 for evaluating similarity between prompts and responses using embedding techniques and statistical methods, in accordance with implementations of the present disclosure. FIG. 9 is explained in conjunction with FIGS. 1-8.

As illustrated in FIG. 9, the integration system 100 provides the prompt 902 and the response 904 in the data of the LLM 134 to an embedding model to determine similarity 906 between the prompt 902 and the response 904. The embedding model may be employed to achieve a nuanced understanding of textual relationships between the prompt 902 and the response 904. The integration system 100 leverages several types of embeddings to quantify the similarity 906 between prompt 902 and response 904. For example, Universal Sentence Encoder (USE) and BERT embeddings may be utilized to capture semantic essence of the text associated with the prompt 902 and the response 904. These embeddings translate sentences into high-dimensional vectors that represent their meanings. For both USE and BERT, the embeddings are further processed using average pooling and sum pooling techniques to derive sentence embeddings. The embeddings are processed using average pooling to compute a mean of word vectors in a sentence, while the embeddings are processed using sum pooling to aggregate word vectors without normalizing by the number of words. Both the methods (e.g., the average pooling and the sum pooling) provide different perspectives on sentence representation, which are crucial for assessing semantic similarity.

GloVe is another embedding method that may be used in the similarity determination. GloVe may be used to capture semantic and syntactic properties of words, offering insights into their contextual relationships. In an example, GloVe may be complemented by average pooling and sum pooling techniques to generate sentence embeddings from word embeddings. These approaches (i.e., pooling techniques and GloVe) may be used to understand overall meaning of sentences, enabling more effective similarity calculations. Further, a Cosine similarity method may be employed to measure the similarity between the vectors obtained from BERT and USE embeddings. With the Cosine similarity method, a cosine of the angle between two vectors of the prompt 902 and the response 904 may be calculated for providing a similarity score 908 that may range from "−1" to "1". A score of "1" indicates identical vectors, "0" suggests no shared attributes, and "−1" implies diametrically opposed vectors. This measure (the similarity score) is essential for determining how closely the prompt 902 and response 904 align in their semantic content.

To further refine the evaluation, bootstrap resampling (i.e., a statistical technique) may be used to estimate variability and confidence intervals of similarity scores. The bootstrap resampling may be used for resampling original data with replacement to create multiple bootstrap samples. By calculating a mean accuracy score for each sample, the bootstrap resampling provides an estimate of the variability and confidence intervals for the similarity scores. The bootstrap resampling may help in understanding precision and reliability of similarity metrics, ensuring that the evaluation is robust and statistically sound.

Therefore, the integration system 100 may combine advanced embedding techniques with statistical analysis to assess prompt-response similarity. By integrating USE and BERT embeddings with GloVe word embeddings, employing cosine similarity, and applying bootstrap resampling, the integration system 100 may offer a detailed and reliable measure of semantic relevance and consistency between the prompts and the responses. Such a multifaceted approach may ensure a thorough and accurate evaluation of the data of the LLM 134.

Figure 10:
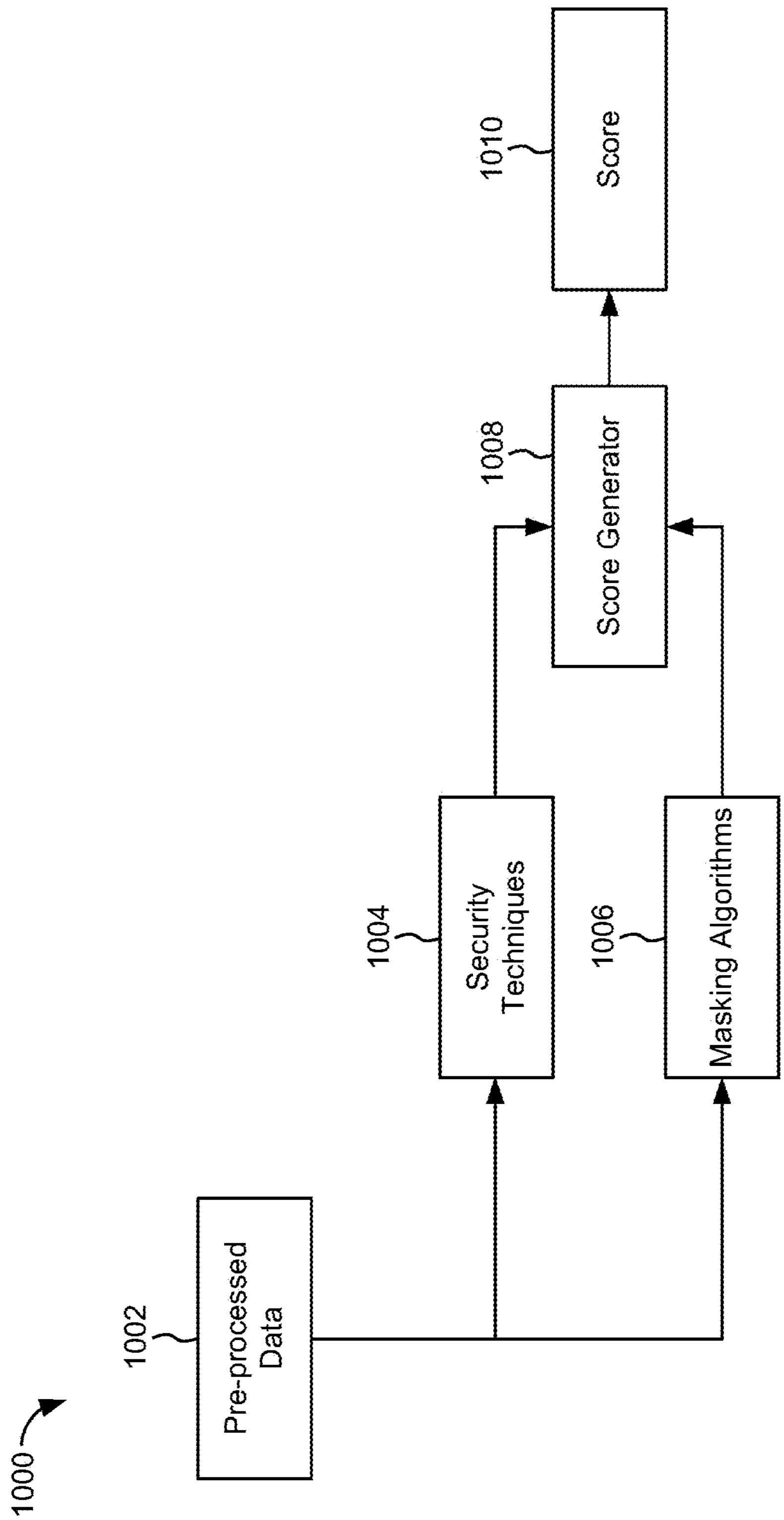
FIG. 10 illustrates an example process flow of enhancing data security, privacy, and human safety throughout data processing, in accordance with implementations described in this disclosure.

FIG. 10 illustrates an example process 1000 for enhancing data security, privacy, and human safety throughout the data processing, in accordance with implementations of the present disclosure. FIG. 10 is explained in conjunction with FIGS. 1-9.

The integration system 100 may integrates a series of techniques and processes to manage sensitive and personally identifiable information (PII) effectively. Initially, the pre-processed data 1002 of the LLM 134 may be received. The pre-processed data 1002 may be subjected to a variety of security techniques 1004 to safeguard against potential threats. Key among these techniques are sophisticated security measures, including prompt injection detection, and the use of Named Entity Recognition (NER) models such as dslim/bert-base-NER, flair, spaCy, and Presidio. The NER models may be employed for identifying sensitive information embedded in text, while additional tools like PDF PII detection are employed to uncover sensitive data within documents. The integration system 100 utilizes several security techniques to protect data, each serving a distinct purpose.

Further, masking algorithms 1006 may be used to create data representations that are structurally similar to the original but do not expose sensitive information. The masking algorithms 1006 may be used to minimize the risk of data exposure during business operations and testing. Data encryption is another critical technique that transforms sensitive data into an encoded format, making it accessible only to those with the appropriate decryption keys. Further, a data tokenization technique may be used to replace sensitive data with unique tokens, preserving essential information while keeping the actual data secure in a separate location. Furthermore, a data generalization may be used that substitutes specific details with broader categories, such as replacing exact ages with age ranges, to further protect privacy.

In addition to the methods explained above, data anonymization may be used to remove personally identifiable information from the pre-processed data 1002, ensuring that user related details may not be identified from the pre-processed data 1002. Further, a differential privacy technique may be employed by adding calculated noise to the data, which helps to preserve individual privacy while still allowing for statistical analysis. Further, data suppression may be used for removing sensitive information entirely from a dataset, reducing its granularity to enhance privacy. A data pseudonymization technique may be used to replace identifiable data fields with artificial identifiers, making the pre-processed data 1002 less sensitive and less likely to reveal personal information. Additionally, a data redaction technique may be used to obscure or black out sensitive portions of documents, especially when preparing them for public release or sharing with unauthorized individuals.

Once these security measures are applied, a score generator 1008 may be used to evaluate their effectiveness. The score generator 1008 assesses how well the above-mentioned techniques have safeguarded the pre-processed data 1002 from potential breaches or unauthorized access. The results of this evaluation are summarized by the score generator 1008 in a score 1010, which reflects the overall level of protection achieved by the integration system 100. Therefore, the integration system 100 may integrate a variety of advanced security techniques, including masking, encryption, tokenization, generalization, anonymization, differential privacy, suppression, pseudonymization, and redaction for securing the data of the LLM 134. By systematically applying these methods and generating security scores (generated by the score generator 1008), the integration system 100 ensures robust protection of sensitive information, thus mitigating risks associated with data breaches and unauthorized access.

Figure 11:
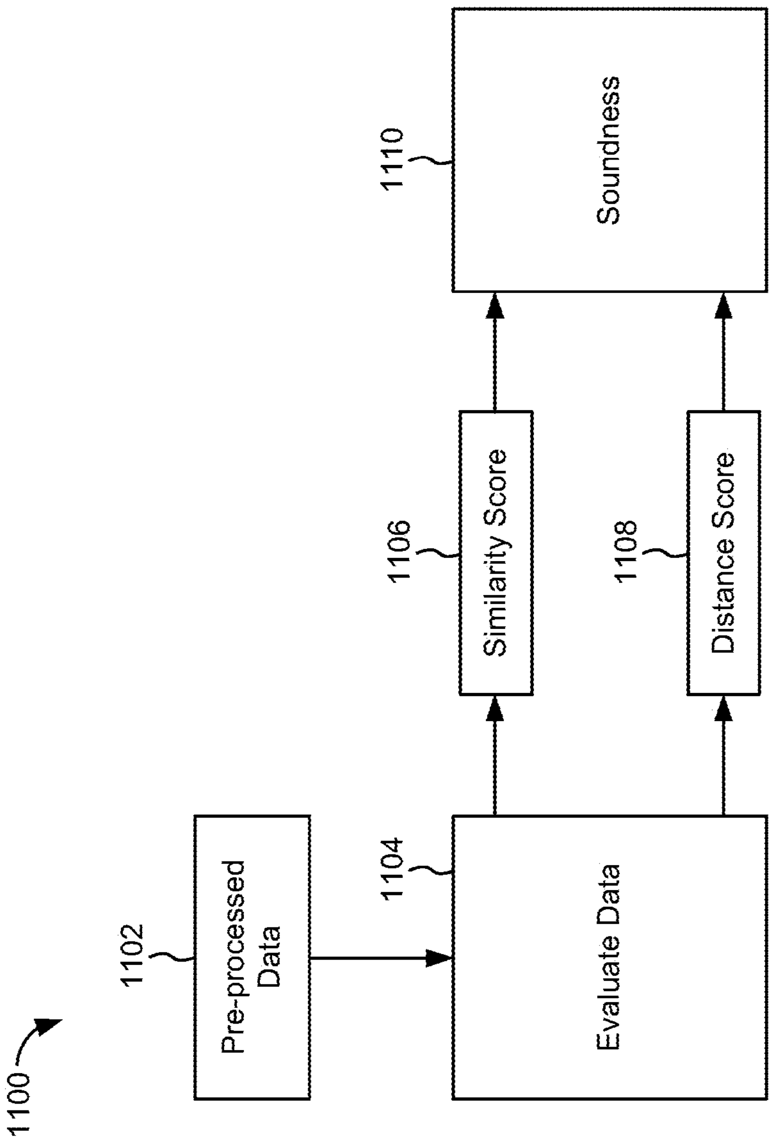
FIG. 11 illustrates an example process flow of evaluating soundness of text responses, in accordance with implementations described in this disclosure.

FIG. 11 illustrates a process 1100 for evaluating soundness of text responses, in accordance with implementations of the present disclosure. FIG. 11 is explained in conjunction with FIGS. 1-10.

Initially, the integration system 100 receives the pre-processed data 1102 of the LLM 134. Further, the data 1102 may be evaluated 1104 using a range of metrics to determine how well the response aligns with the expected output. The metrics include both a similarity score 1106 and a distance score 1108, which quantify accuracy and relevance of the response in relation to the given prompt in the pre-processed data 1102. Similarity, the scores 1106 and 1108 are generated to assess how closely the generated text matches the reference text. The scores 1106 and 1108 are derived from various techniques, such as Cosine similarity, which measures a cosine of angle between two vectors to determine their similarity. Similarly, Dice Coefficient and Jaccard Similarity may be used to evaluate similarity by comparing an overlap between sets of n-grams or tokens, providing insights into content similarity of the text. Further, Tversky Index that offers a more nuanced measure by allowing weighted comparisons of set attributes may be used. Further, in an example, n-gram overlap may be used to assess similarity based on shared contiguous sequences of items.

To further enhance the evaluation, distance metrics may be applied to quantify the differences between the texts in the pre-processed data 1102. The distance metrics include Hamming Distance which measures a number of differing positions between two strings, and Levenshtein Distance which counts a minimum number of single-character edits required to change one string into another. Further, Damerau-Levenshtein Distance and Indel Distance may be used. The Damerau-Levenshtein Distance includes transpositions of adjacent characters, and Indel Distance may measure a number of insertions or deletions needed for sequence alignment.

In addition to these standard metrics, the integration system 100 employs bootstrap resampling to assess variability and reliability of similarity and textual quality scores. The bootstrap resampling may be used for generating multiple samples from original data to estimate distribution and confidence intervals of metrics like ROUGE, BLEU, GLEU, and CHRF, which evaluate overlap and semantic similarity between the reference and generated responses. Meteor and Linguistic Evaluation Progression for Optimal Ranking (LEPOR) may further be used to refine the evaluations by accommodating flexible word orders and synonyms, thus offering a comprehensive measure of response quality. Readability metrics such as Flesch Reading Ease, Flesch-Kincaid Grade, Gunning Fog Index, Simple Measure of Gobbledygook (SMOG) Index, Automated Readability Index, and Coleman-Liau Index may be calculated to assess complexity of the generated text. These metrics provide insights into the ease of understanding and the grade level required for comprehension.

The integration system 100 also integrates custom synonym matching using BERT-based synonym matchers to boost raw scores and improve accuracy. The results from these evaluations are compiled into the similarity score 1106 and the distance score 1108, which collectively determine soundness 1110 of the response. The integration system 100 may ensure that the text not only closely resembles the reference but also adheres to high standards of readability and relevance.

In short, the integration system 100 represents a robust system for evaluating text responses, employing a variety of similarity and distance metrics, readability assessments, and advanced statistical techniques. This framework ensures thorough and reliable evaluation of text quality, accuracy, and relevance.

Figure 12:
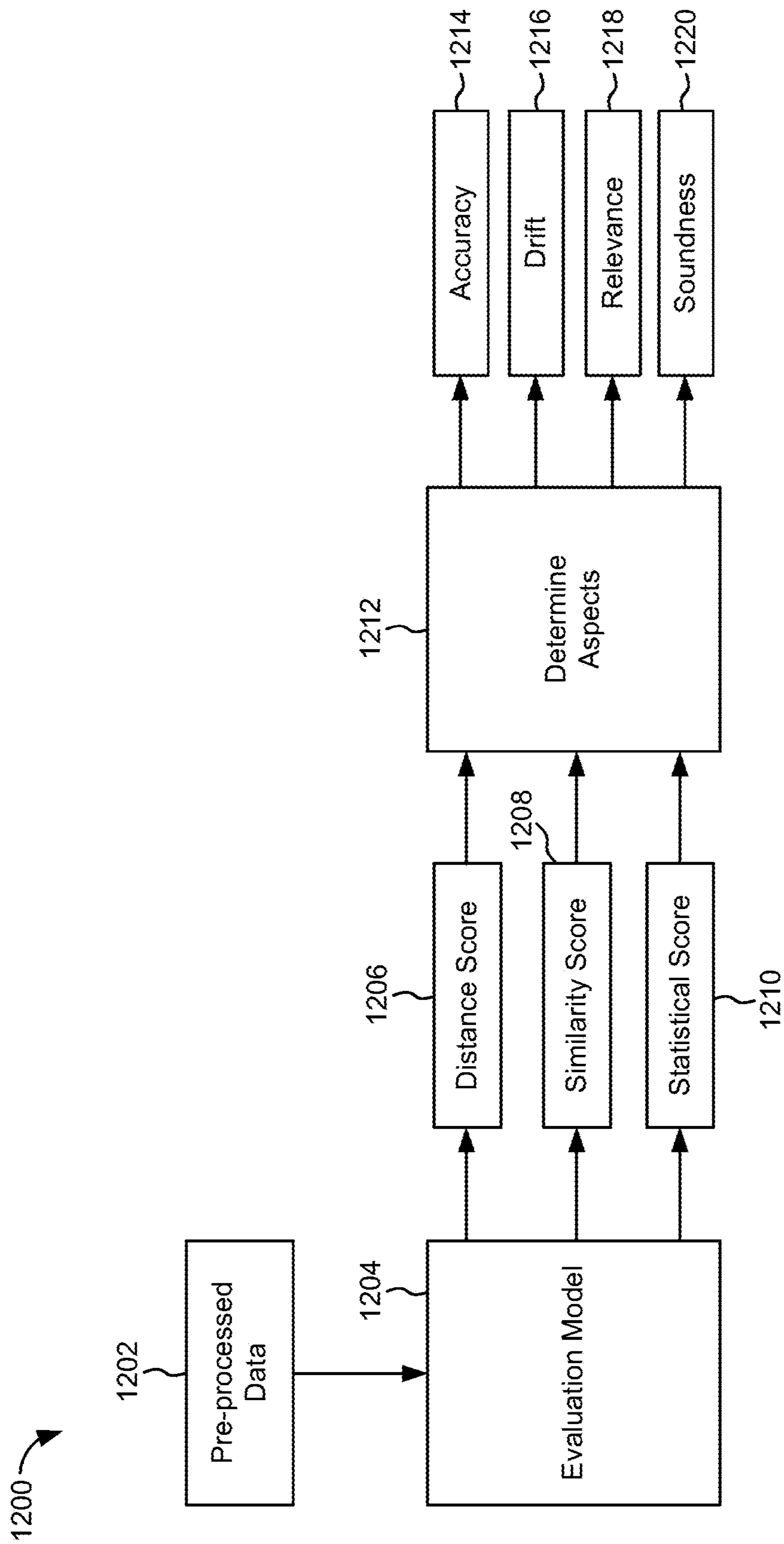
FIG. 12 illustrates an example process flow of evaluating responses using a set of similarity and distance metrics, in accordance with implementations described in this disclosure.

FIG. 12 illustrates an example process 1200 for evaluating responses using a set of similarity and distance metrics, in accordance with implementations of the present disclosure. FIG. 12 is explained in conjunction with FIGS. 1-11. The integration system 100 considers aspects such as accuracy, drift, relevance, and soundness for evaluation. The integration system 100 may provide a multi-faceted approach that may ensure a thorough assessment of responses by leveraging a variety of quantitative measures and statistical tests.

Initially, the pre-processed data 1202 of the LLM 134 may be received. Further, the pre-processed data 1202 may be evaluated using an evaluation model 1204. Further, a distance score 1206, a similarity score 1208, and a statistical score 1210 may be generated based on the evaluation of the pre-processed data 1202. The scores 1206, 1208, 1210 provide numerical values that quantify how closely generated responses align with expected or reference texts, how much they diverge, and the statistical significance of these comparisons. The integration system 100 incorporates an array of similarity and semantic metrics to thoroughly analyze text.

In one example, Mahalanobis Distance may be used to assess how far a point is from the data 1202, considering variance of the pre-processed data 1202. This assessment is particularly useful for comparing the responses in the pre-processed data to the ground truth data. In one example, Kolmogorov-Smirnov Test (Bonferroni-corrected) may be utilized to compare two probability distributions and is helpful in evaluating how responses align with expected distributions. In an example, Wasserstein Distance or Earth Mover's Distance may be used to calculate minimum effort required to transform one distribution into another, making it suitable for measuring response quality relative to the correct answers. Further, Jensen-Shannon Divergence and Kullback-Leibler Divergence may be used to measure similarity and divergence between two probability distributions, respectively, aiding in the assessment of response distribution relative to the reference. Furter, a Maximum Mean Discrepancy (MMD) technique may be employed using both Euclidean Distance by Dimension and Gaussian Kernel to test if two samples come from the same distribution. The Euclidean Distance may be used to measure a straight-line distance between vectors, which is useful in comparing responses and ground truth in vector space. Metrics such as Jaccard Distance, Manhattan Distance, Minkowski Distance, Canberra Distance, Bray-Curtis Distance, Hellinger Distance, Chebyshev Distance, and Hamming Distance offer varied approaches may be determined to measure dissimilarity between text sets and are useful in different scenarios depending on data characteristics.

Page-Hinkley Test and Kolmogorov-Smirnov Windowing may be used for change-point detection and identifying shifts in data trends over time. These methods (the Page-Hinkley Test and Kolmogorov-Smirnov Windowing) are essential for detecting drifts in performance of the LLM and ensuring consistent response quality. The integration system 100 uses Paraphrasing techniques with models such as bert-base-cased-finetuned-mrpc may be used to verify semantic consistency between original and paraphrased texts. This ensures that responses retain the intended meaning, regardless of rewording. Frequency Distribution and N-gram Overlap metrics may be employed to analyze the lexical characteristics of the text. By examining the occurrence of common and rare words and the overlap of contiguous word sequences, the integration system 100 may assess coherence, focus, and similarity between prompts and responses.

Overlap Coefficient (an overlap metric) may be employed to measure proportion of shared elements between sets, offering insight into the similarity of responses. General Statistics such as word count, sentence length, and character count are basic but essential metrics that provide information about the verbosity and complexity of text responses. Z-scores for these metrics standardize the measurements, allowing for comparison against expected norms and detecting outliers or shifts in text complexity. The integration system 100 may integrate various similarity, distance, and statistical metrics to determine aspects 1212 such as the accuracy 1214, the drift 1216, the relevance 1218, and the soundness 1220 of the responses in the pre-processed data 1202.

Figure 13:
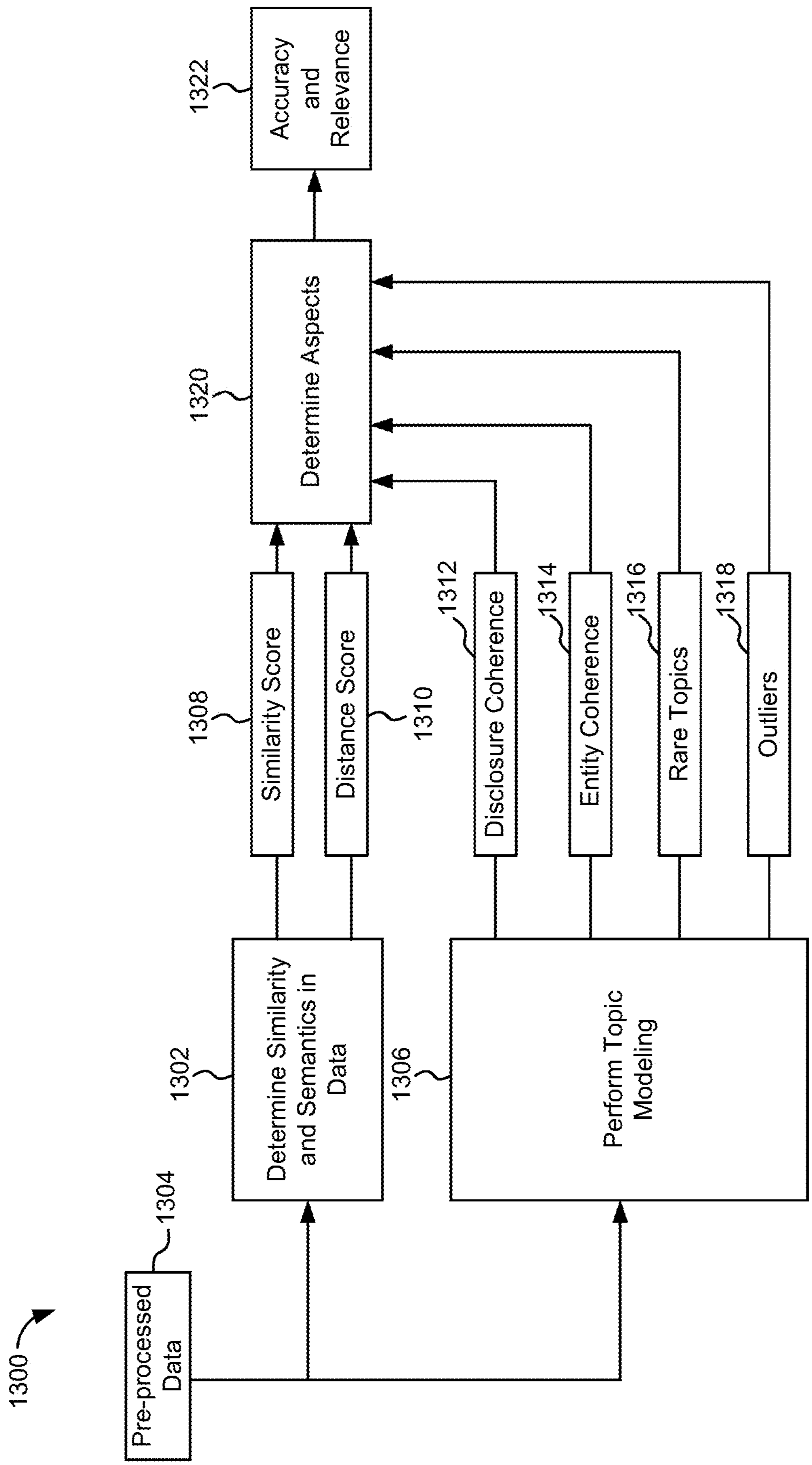
FIG. 13 illustrates an example process flow of evaluating responses through a detailed analysis of similarity and distance metrics, in accordance with implementations described in this disclosure.

FIG. 13 illustrates an example process 1300 for evaluating responses through a detailed analysis of similarity and distance metrics, in accordance with implementations of the present disclosure. FIG. 13 is explained in conjunction with FIGS. 1-12. The process 1300 may be executed using the integration system 100. The process 1300 may evaluate accuracy and relevance. The process 1300 integrates multiple layers of semantic, syntactic, and statistical measures to ensure the responses are precise, relevant, and contextually coherent.

The process 1300 includes determination 1302 of similarity and semantics within the pre-processed data 1304 of the LLM 134. The determination 1302 involves assessing how closely generated responses match expected or reference texts and how well they adhere to the semantic context of the prompts. Metrics such as Euclidean Distance, Cosine Similarity, Manhattan Distance, Chebyshev Distance, and Hamming Distance may be employed to quantify textual similarities and divergences. The above-mentioned distance metrics measure closeness of vectors representing different responses or prompts in a multi-dimensional space, providing a numerical value that reflects the degree of similarity or dissimilarity.

Additionally, discourse coherence may be evaluated through various linguistic metrics, including grammar score, pronoun usage, conjunction count, references count, and tense consistency. These metrics analyze grammatical correctness, syntactic cohesion, and contextual continuity of the text. The grammar score may be used assess overall grammatical accuracy, while pronoun usage may be used evaluate how well pronouns are used to maintain context. The conjunction count and references count gauge the complexity and integration of ideas, whereas the tense consistency may ensure temporal coherence.

The process 1300 further includes performing topic modeling 1306 to uncover underlying themes and structures in the pre-processed data 1304. Various algorithms, including Latent Dirichlet Allocation (LDA), Non-negative Matrix Factorization (NMF), Latent Semantic Analysis (LSA), Correlated Topic Modeling (CTM), and Hierarchical Dirichlet Process (HDP), may be used to extract topics from the responses and prompts. These algorithms reveal both common and rare topics, providing insights into the thematic relevance and identifying any outliers or anomalies. Further, visualization techniques such as word clouds and network graphs may be employed to represent the topics visually, facilitating the interpretation of the results.

An output including a similarity score 1308 and a distance score 1310 from similarity and semantics determination 1302, along with the output including disclosure coherence 1312, entity coherence 1314, rare topics 1316, and outliers 1318 from performed topic modeling 1306 are analyzed to determine 1320 various aspects of the responses such as accuracy and relevance 1322 in the pre-processed data 1304. An aspect like accuracy may be assessed by comparing the similarity scores 1308 and distance scores 1310 with expected results, while relevance is gauged based on the coherence of topics and the identification of rare or unexpected topics.

For a deeper semantic analysis, metrics related to Langchain evaluation may be used. These metrics include correctness, conciseness, relevance, coherence, harmfulness, maliciousness, helpfulness, controversiality, misogyny, criminality, and insensitivity. These measures provide a nuanced evaluation of the text, ensuring that responses are not only accurate and relevant but also ethically and contextually appropriate.

Further, outlier detection techniques such as t-SNE, Uniform Manifold Approximation and Projection (UMAP), Density-Based Spatial Clustering of Applications with Noise (DBSCAN), and Principal Component Analysis (PCA) may be utilized to identify unusual or anomalous responses. These techniques may reduce dimensionality and cluster similar data points, helping to spot deviations from expected patterns which may indicate prompt attacks or data anomalies.

The process 1300 incorporates interactive AI-driven visualization dashboards (not shown in FIG. 13) to provide dynamic insights into topic modeling and response evaluation. These dashboards facilitate the exploration of rare topics, entity coherence, and outlier detection, enhancing the understanding of the text's thematic structure and relevance.

Figure 14:
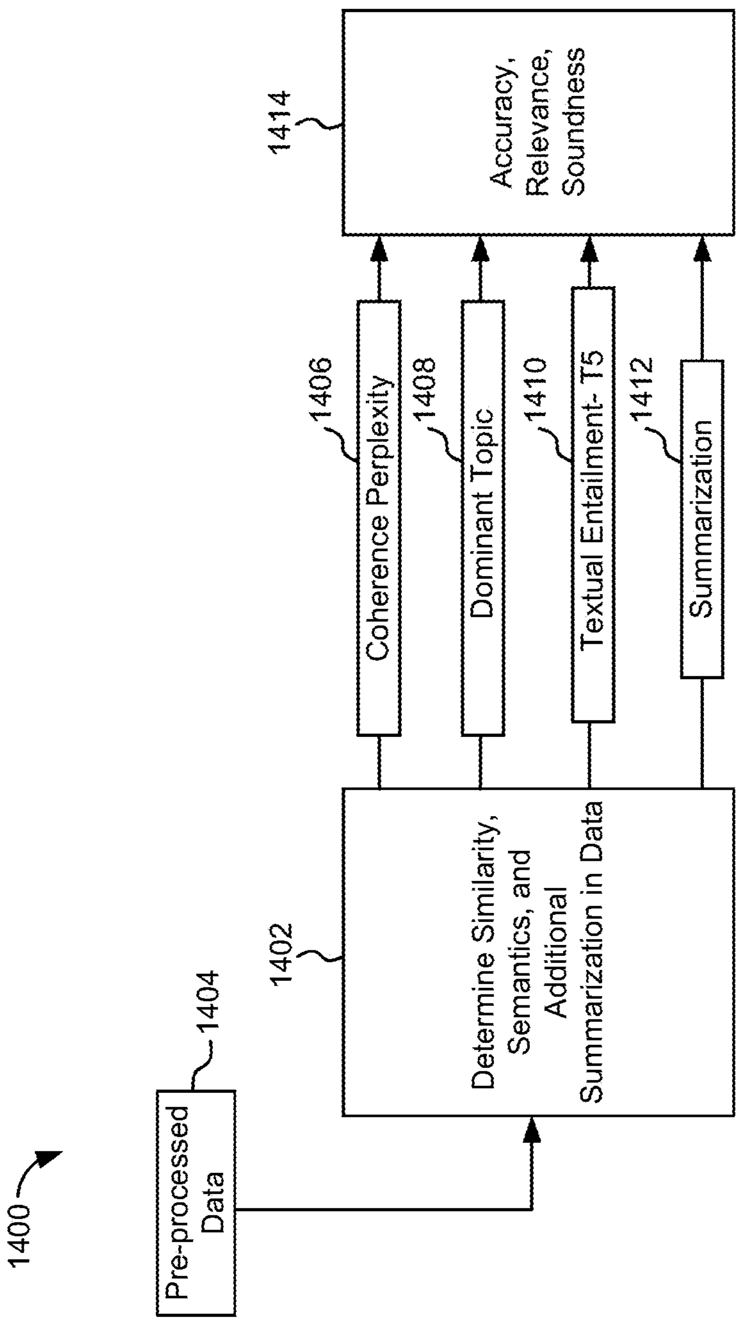
FIG. 14 illustrates an example process flow of evaluating responses through a detailed analysis of similarity and distance metrics, in accordance with implementations described in this disclosure.

FIG. 14 illustrates a process 1400 for evaluating responses through a detailed analysis of similarity and distance metrics, in accordance with implementations of the present disclosure. FIG. 14 is explained in conjunction with FIGS. 1-13. The process 1400 may be executed by the integration system 100, The process 1400 may include determination of aspects including accuracy, relevance, and soundness. The process 1400 may integrate various similarity, semantic, and summarization metrics to ensure comprehensive and accurate evaluation of the generated responses.

The process 1400 may include determining 1402 similarity semantics, and additional summarization in pre-processed data 1404. The determination 1402 of similarity and semantics involves analyzing how closely the responses match the intended meaning of the prompts. Metrics used in this step includes coherence, perplexity, and dominant topics. The coherence may be determined to measure a degree of semantic similarity between words and sentences in the text associated with the pre-processed data 1404 of the LLM 134. High coherence indicates that the response logically follows from the prompt, ensuring relevance and maintaining a meaningful connection between ideas presented. Perplexity may quantify how well the LLM 134 predicts the next word in a sequence. Lower perplexity scores may reflect higher predictability and relevance of the responses, indicating that the responses are more probable given the prompt.

The process 1400 further includes determining various coherence perplexity-based aspects 1406 including accuracy, relevance, and soundness based on outputs of coherence, perplexity, dominant topics, and summarization. The accuracy may be evaluated by comparing similarity and coherence of the response with the expected answers. The comparison ensures that the response is factually correct and aligns with the intended meaning of the prompt. The relevance may be assessed based on how well the response matches the themes and topics of the prompt, as well as how effectively it summarizes key points. The soundness may be determined by checking the logical consistency and completeness of the response. The soundness determination includes verifying that all critical points are covered, and that the response does not contain errors or misleading information.

The process 1400 further includes determining/extracting dominant topics 1408. The dominant topics 1408 may be extracted to identify the main themes or topics present in the response of the pre-processed data 1404. The domain topics extraction involves determining a percentage contribution of each topic and keywords associated with the topic. By analyzing dominant topics, the evaluation may assess whether the response accurately reflects primary themes of the prompt.

The process 1400 further includes analyzing textual entailment 1410. In an example, textual entailment 1410 may be analyzed using a T5 model to determine if the response logically follows from the prompt. In another example, classification labels, entailment and not entailment, may be used to assess whether the response is a valid inference from the given prompt, ensuring logical coherence and relevance.

Following the initial semantic analysis, the process 1400 incorporates additional metrics specific to summarization tasks 1412 to evaluate completeness and conciseness of the responses. Further, completeness may be determined to assess whether all key points and ideas from the original text are covered in the summary, ensuring that no critical information is omitted, maintaining the integrity of the original content. The conciseness may be used to measure how succinctly the summary conveys the main ideas. The summary is considered concise if it presents all essential points in as few words as possible, avoiding unnecessary verbosity while retaining core information. Further, the compression ratio may be determined to evaluate reduction in text length achieved through summarization. A higher compression ratio indicates a more significant reduction in size, though excessive compression may lead to loss of important details.

Further, precision, recall, and F1-measure are used to quantify the accuracy and relevance of the summarization. The precision may be used to measure proportion of relevant information in the summary compared to the reference summary, while recall assesses how much of the reference summary is covered. The F1-measure provides a balanced evaluation by combining precision and recall into a single metric. Length-based precision, recall, and F1-score and content-based precision, recall, and F1 score further refine the evaluation. The length-based metrics corresponding to the length-based precision may assess the structural aspects of the summary, while content-based metrics may assess the relevance and accuracy of the information presented. The coherence perplexity 1406, extraction of dominant topics 1408, analysis of textual entailment-T5 1410, and summarization tasks 1412 may be used to determined accuracy, relevance, and soundness 1414.

In some examples, a coverage score may be determined. In conjunction with the above-mentioned metrics, the coverage score provides an additional layer of evaluation quantifying how well the summary represents the original text corresponding to the response. The coverage score is a measure of how well the summary represents the original text and may measure a coverage ratio of extractive and abstractive summarization. The coverage score includes determining common elements between the original and summarized content, relying on the presence of identical keywords or phrases. The determination of coverage score includes extracting sets of words or keywords from both the original and summarized content, computing intersection between the original and summarized content, and determining the coverage score as a ratio of intersecting elements to the total elements in the original text.

In addition to the coverage score, various operations may be performed further to analyze a relationship between the original text and the summary. The operations may include checking if a keyword set from the original text is a superset or subset of keywords from the summarized content, and calculating union, intersection, difference, and symmetric difference of two sets (e.g., a set extracted from the original text and a set extracted from the summarized content). The operations provide additional insight into effectiveness of the summary. Further, similarity metrics such as Jaccard Index, Sørensen Dice Coefficient, Overlap Coefficient, and Tversky Index may be employed. The similarity metrics offer more nuanced evaluations of quality of the summarized content.

While these methods (above-mentioned metrics and techniques) are well-suited for extractive summarization, the methods may be adapted for abstractive summarization with some limitations. The abstractive summarization often generates new phrases or sentences that may not align with keywords of the original text. Abstraction is intrinsic nature of GAI models. This nature may be controlled via prompting techniques to guide the GAI models to be extractive rather than abstractive to certain extent. Further, to address the limitation, semantic matching techniques, such as the techniques that use bert-base-nli-mean-tokens model, may be employed to compare synonyms and assess semantic similarity, ensuring a more accurate evaluation of abstractive summaries. A combination of guided prompts to generate similar keywords, extractive summarization coverage metrics and semantic coverage methodology may be apt for measuring content coverage between the original text and the generated summary from LLMs.

Figure 15:
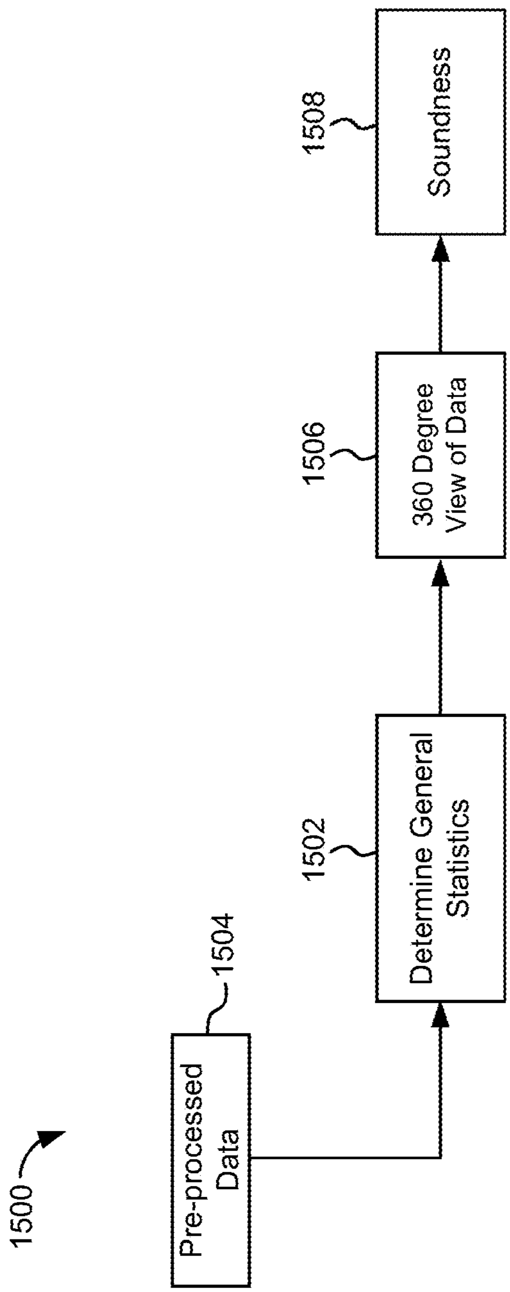
FIG. 15 illustrates an example process flow of evaluating soundness and quality of responses, in accordance with implementations described in this disclosure.

FIG. 15 illustrates a process 1500 for evaluating soundness and quality of responses, in accordance with implementations of the present disclosure. FIG. 15 is explained in conjunction with FIGS. 1-14. The process 1500 may be executed using the integration system 100. The soundness of the responses may be evaluated through a comprehensive analysis of general statistics, including a 360-degree view of the prompt and response. The process 1500 integrates various metrics to assess accuracy, relevance, and overall quality of the data by leveraging detailed statistical and linguistic measures.

The process 1500 includes determining 1502 general statistics based on the pre-processed data 1504. The determination 1502 may include gathering essential textual metrics to provide a baseline understanding of structure and content of the response. The textual metrics include word count, character count, average word length, stop word count, and punctuation count. The textual metrics help in evaluating a length and potential verbosity of the text, offering insights into its conciseness and complexity. The analysis based on the of the text based on the textual metrics covers lexical diversity and lexical density. The lexical diversity may be used to measure richness of the vocabulary by calculating the ratio of unique words to the total number of words, while the lexical density may be used to assess the proportion of lexical items (e.g., nouns, verbs, adjectives, adverbs) relative to the total word count.

The process 1500 further includes providing a 360-degree view of text 1506 (within the pre-processed data 1504), including a comprehensive assessment of the text by evaluating various aspects such as readability, sentiment, and/or part-of-speech distribution. The evaluation encompasses part of speech (POS) tag counts for different grammatical categories (e.g., nouns, verbs, adjectives) and named entity counts, which help in understanding the grammatical structure and thematic content of the response. Sentiment analysis is performed to determine the overall emotional tone of the text, whether positive, negative, or neutral. This helps in understanding the emotional context and the potential impact of the response.

The process 1500 further includes calculating detailed statistical measures to further evaluate the quality and soundness of the text. The calculation includes calculating Term Frequency (TF), Term Frequency-Inverse Document Frequency (TF-IDF) metrics, and a co-occurrence metric, which assess importance of words within the response relative to their frequency in the document and across multiple documents. The TF-IDF metrics with high scores indicate terms that are significant in both the prompt and response, reflecting relevance and thematic alignment. N-grams may be used to identify common word sequences and their frequency, providing insights into the contextual relevance of the response. The presence of high-frequency n-grams between the prompt and response indicates higher relevance. The co-occurrence metric may represent how often words appear together in the response. Analyzing the word co-occurrence helps in understanding the semantic similarity between the prompt and the response, as related words tend to co-occur frequently. Further, negative words analysis may be performed for detecting negative words and their synonyms using the WordNet lexical database. By analyzing negative words, the process 1500 may identify potential issues or negative sentiments within the response.

In addition, the process 1500 implements various linguistic and statistical techniques to detect bias and toxicity in the text. The linguistic and statistical techniques include a dependency parsing technique. The dependency parsing technique may be employed to analyze the grammatical structure of sentences, to elucidate relationships between words including subject-object relationships and modifiers (adjectives or adverbs) that may indicate bias (e.g., a positive or a negative bias). Further, the linguistic and statistical techniques may include a conference resolution technique that identifies all expressions referring to a same entity in the text. The conference resolution aids in contextual understanding and connection of indirect references to their original subjects, which helps in detecting bias and toxicity. The linguistic and statistical techniques may also include POS tagging and NER to extract key elements such as adjectives, verbs, and nouns. Adjectives may reveal sentiments and biases, verbs may indicate harmful actions, and nouns help to identify subjects under discussion.

Further, a sentiment analysis may be performed to evaluate the text by identifying and quantifying opinions the text and providing a polarity score to gauge a level of bias or toxicity. The sentiment analysis aids to understand conversational context. Further, topic modeling may be used to uncover abstract "topics" within document collection, revealing trends and patterns that may indicate bias or toxicity. A co-occurrence matrix may be used to display frequency of word pairs appearing together, which may suggest biased or toxic patterns in word usage. A Pointwise Mutual Information (PMI) measures may be employed to determine association between word pairs, identifying potential biases if certain words are frequently associated in a suggestive manner. A TF-IDF may be applied to measure importance of words that are unusually frequent in specific documents or sets, highlighting on potentially biased or toxic content. The linguistic and statistical techniques may further include N-grams and keyword extraction techniques. N-grams may be used to reveal trends and patterns in discussions, while keyword extraction may be used to compare response keywords to the ground truth, detecting bias or toxicity by identifying predefined toxic or inappropriate terms. The linguistic and statistical techniques, while not directly identifying bias or toxicity, contribute to a comprehensive analysis. The linguistic and statistical techniques work by dissecting sentences and data. Analyzation of the text using the linguistic and statistical techniques described above helps to reveal underlying patterns and contributors to bias or toxicity. The patterns and contributors may be identified once detected by methods such as outlier detection.

Further, readability and comprehensibility may be assessed and accordingly readability scores may be calculated. The readability scores such as Flesch Reading Ease and Gunning Fog Index may be used to measure how easy it is to read and understand the text. The readability scores may be calculated based on factors like sentence length, word count, and syllable count. The analysis also considers stop word count and POS tag counts to gauge the comprehensibility and overall readability of the text. Also, the distribution of various parts of speech (e.g., nouns, verbs, adjectives) may be examined to understand the text's grammatical complexity and content. Further, metrics such as noun count, verb count, adjective count, adverb count, and others may be used to evaluate syntactic structure of the response. The high counts of specific parts of speech may indicate verbosity or focus, while low counts may suggest brevity or a different textual emphasis.

The process 1500 further includes determining the aspect like the soundness 1508. The general statistics, readability scores, and detailed metrics derived from the 360-degree view of the data may be used to determine the overall soundness 1508 of the response. This comprehensive evaluation may ensure that the response is not only accurate and relevant but also well-structured, contextually appropriate, and readable. The process 1500 provides a detailed, multi-dimensional understanding of the text, enhancing the accuracy of text comparison and evaluation by considering not only the raw content but also the structure, tone, and complexity of the text.

Figure 16:
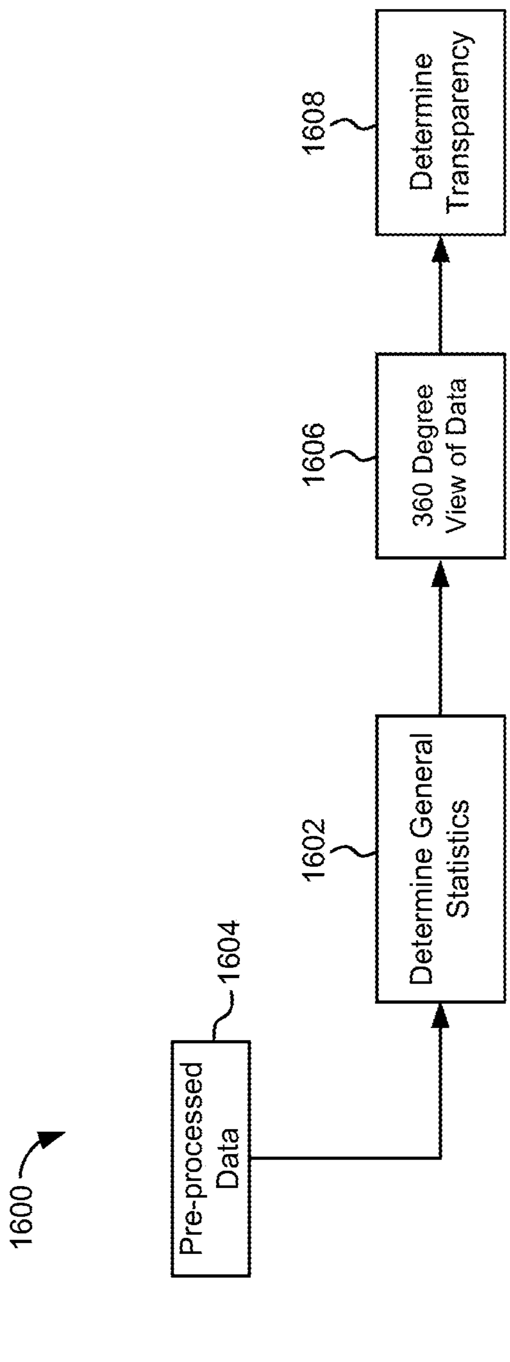
FIG. 16 illustrates an example process flow of evaluating transparency of responses, in accordance with implementations described in this disclosure.

FIG. 16 illustrates a process 1600 for evaluating transparency of responses, in accordance with implementations of the present disclosure. FIG. 16 is explained in conjunction with FIGS. 1-15. The process 1600 is executed using the integration system 100. The transparency of responses may be evaluated through detailed general statistics, transparency analysis, and other quantitative measures to assess the verbosity, brevity, and overall soundness of textual responses. The process 1600 may provide a holistic view of the responses by integrating various statistical metrics and linguistic analyses.

The process 1600 includes determining 1602 general statistics based on the pre-processed data 1604 of the LLM 134. The determination 1602 of general statistics includes metrics determination such as word count, sentence length, character count, and their associated Z-scores. The Z-scores for word count, sentence length, and character count quantify how each response deviates from the mean, highlighting unusually long or short responses. The general statistics also encompass descriptive statistics such as mean, median, standard deviation, variance, range, skewness, kurtosis, minimum, maximum, first percentile, and $99^{th}$ percentile. The metrics offer insights into distribution and variability of response lengths, helping to identify patterns and anomalies.

The process 1600 includes determining transparency 1608 through analysis of the 360-degree view of the data 1606, integrating transparency measures to assess the distribution and complexity of responses. Detailed statistics are used to show how metrics like word count and sentence length vary across a dataset (e.g., the pre-processed data 1604). For example, a high standard deviation in word count may indicate significant variability in response length, while positive skewness may suggest that most responses are shorter, with a few extending significantly beyond the norm. These measures help in pinpointing any shifts in response complexity or verbosity.

The process 1600 also includes evaluation of grammatical correctness and discourse coherence through various metrics. The evaluation includes determining grammar score, which assesses overall grammatical accuracy of the responses. Pronoun count, conjunction count, references count, and tenses count provide insights into the structure and coherence of responses. A high number of pronouns or references may indicate complex, interconnected responses, while a lower count may suggest simpler text. Analyzing tenses helps in determination of temporal focus of responses, and conjunction count indicates the complexity of sentence structures.

Metrics such as word count, sentence length, and character count quantify the verbosity or brevity of the responses. A detailed examination of these metrics may reveal if the responses generated by the LLM are excessively verbose or overly terse. For example, an unusually high word count may suggest verbosity, while a low count may indicate brevity. The Z-scores further refine this analysis by highlighting responses that deviate significantly from the average.

Further, the process 1600 includes determination of shift in complexity and identification of outliers. Sudden changes in word count, sentence length, or character count may signal shifts in the complexity or detail of responses. The shift may be indicative of adjustments in response strategies of the LLM or potential issues with question understanding. The outliers may be identified by examining extreme values in the pre-processed data 1604, such as very long or short responses relative to a norm.

The detailed statistical measures provide a thorough overview of response characteristics. For example, a high range or skewness may indicate variability in response lengths, while kurtosis reveals the presence of outliers or extreme values.

The comprehensive analysis of the above explained metrics enables fine-tuning of the LLM to balance verbosity and brevity. By understanding the distribution and characteristics of the responses, developers may adjust the LLM to produce responses that are appropriately detailed and concise, enhancing the overall quality and user-friendliness of the LLM.

Figure 17:
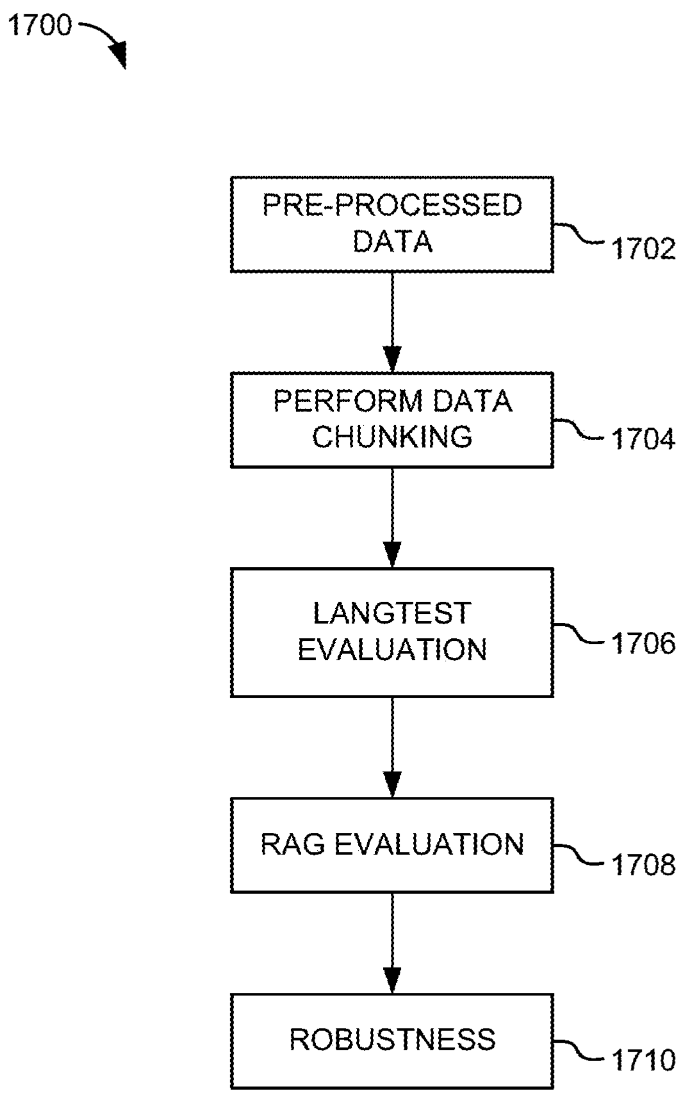
FIG. 17 illustrates an example process flow of assessing the performance of the LLMs, in accordance with implementations described in this disclosure.

FIG. 17 illustrates a process 1700 for assessing the performance of the LLMs, in accordance with implementations of the present disclosure. FIG. 17 is explained in conjunction with FIGS. 1-16. The process 1700 may be executed using the integration system 100. The process 1700 ensures a thorough analysis of the responses of the LLM and ability of the LLM to handle various types of data perturbations effectively.

The process 1700 includes receiving pre-processed data 1702. Further, the process 1700 includes performing data chunking 1704 on the pre-processed data 1702 to break down documents associated with the pre-processed data 1702 into manageable segments. The data chunking 1704 enables processing and analyzation of the pre-processed data 1702 more effectively. Various chunking methods may be employed to achieve optimal results. The data chunking 1704 may include, but are not limited to, spaCy and Natural Language Toolkit (NLTK), recursive chunking, clustering adjacent sentences, and John Snow Spark NLP sentence detector with customized chunking code.

The spaCy and NLTK involves natural language processing (NLP) libraries that may be used for chunking by segmenting text based on linguistic features and sentence boundaries. A recursive chunking method may be used that involves breaking text into chunks recursively, often based on syntactic or semantic rules. Further, clustering may be performed on adjacent sentences. The clustering of adjacent sentences includes clustering sentences together based on their contextual similarity to maintain coherence across different chunks. Further, John Snow Spark NLP sentence detector with customized chunking code method may be used. The John Snow Spark NLP sentence detector with customized chunking code method may use Spark NLP's sentence detection capabilities in combination with customized code to tailor the chunking process to specific needs.

To detect and inspect errors in the data chunking 1704, visualization techniques such as histograms and word clouds may be employed. Histograms with bins may reveal distribution of chunk lengths or other metrics, highlighting anomalies or patterns that may indicate chunking issues. Word clouds may provide a visual representation of frequently occurring words or phrases, aiding in the identification of common themes and potential errors.

The process 1700 further includes Langtest evaluation 1706, which may be used to evaluate the robustness and accuracy of the LLM 134 against various perturbations. The Langtest evaluation 1706 involves a suite of tests (a collection of various individual tests or evaluation methods). The suite of tests may include add_typo (introduces typographical errors to assess how well the LLM handles misspellings), dyslexia_word_swap (tests ability of the LLM to cope with common dyslexic errors), add_ocr_typo (simulates errors introduced by Optical Character Recognition (OCR) systems), add_context (evaluates how the LLM manages additional contextual information), add_contraction (assesses the LLM handling of contracted forms (e.g., "don't" instead of "do not")), add_punctuation (tests the response of the LLM to added punctuation), american_to_british and british_to_american (evaluates how well the LLM adapts to different english variants), Lowercase, strip_punctuation, titlecase, uppercase, number_to_word (converts numerical values to words to evaluate handling of numerical expressions by the LLM), add_abbreviation, add_speech_to_text_typo, add_slang, multiple_perturbations (combines various perturbations to evaluate overall robustness of the LLM), and/or adjective_synonym_swap and adjective_antonym_swap (assesses ability of the LLM to understand and generate responses with synonyms and antonyms). Lowercase, strip_punctuation, titlecase, and uppercase assess handling of various text case transformations and punctuation removal. Add_abbreviation, add_speech_to_text_typo, and add_slang test ability of the LLM to manage abbreviations, speech-to-text errors, and slang terms.

The process 1700 includes RAG evaluation 1708 for evaluating the RAG model using metrics such as LlamaIndex and the Langtest. The metrics used for evaluation of the RAG model may include hit rate and Mean Reciprocal Rank (MRR). The hit rate measures proportion of queries where correct answer appears within top-k retrieved documents. A higher hit rate indicates that the retriever is more effective at locating relevant documents. The MRR is a statistical measure that evaluates ability of the LLM to rank relevant documents. For each query, the MRR calculates reciprocal rank score of a first correct answer, and an average of the reciprocal rank score across queries provides an overall performance metric. Higher MRR values indicate better performance of the LLM.

Based on the analysis explained above, robustness 1710 of the LLM may be determined. The robustness 1710 is assessment of ability of the LLM to handle diverse data types and perturbations. This involves evaluating how well the LLM maintains performance when faced with incomplete or irrelevant information in chunks, and when confronted with various types of data perturbations introduced by Langtest.

Figure 18:
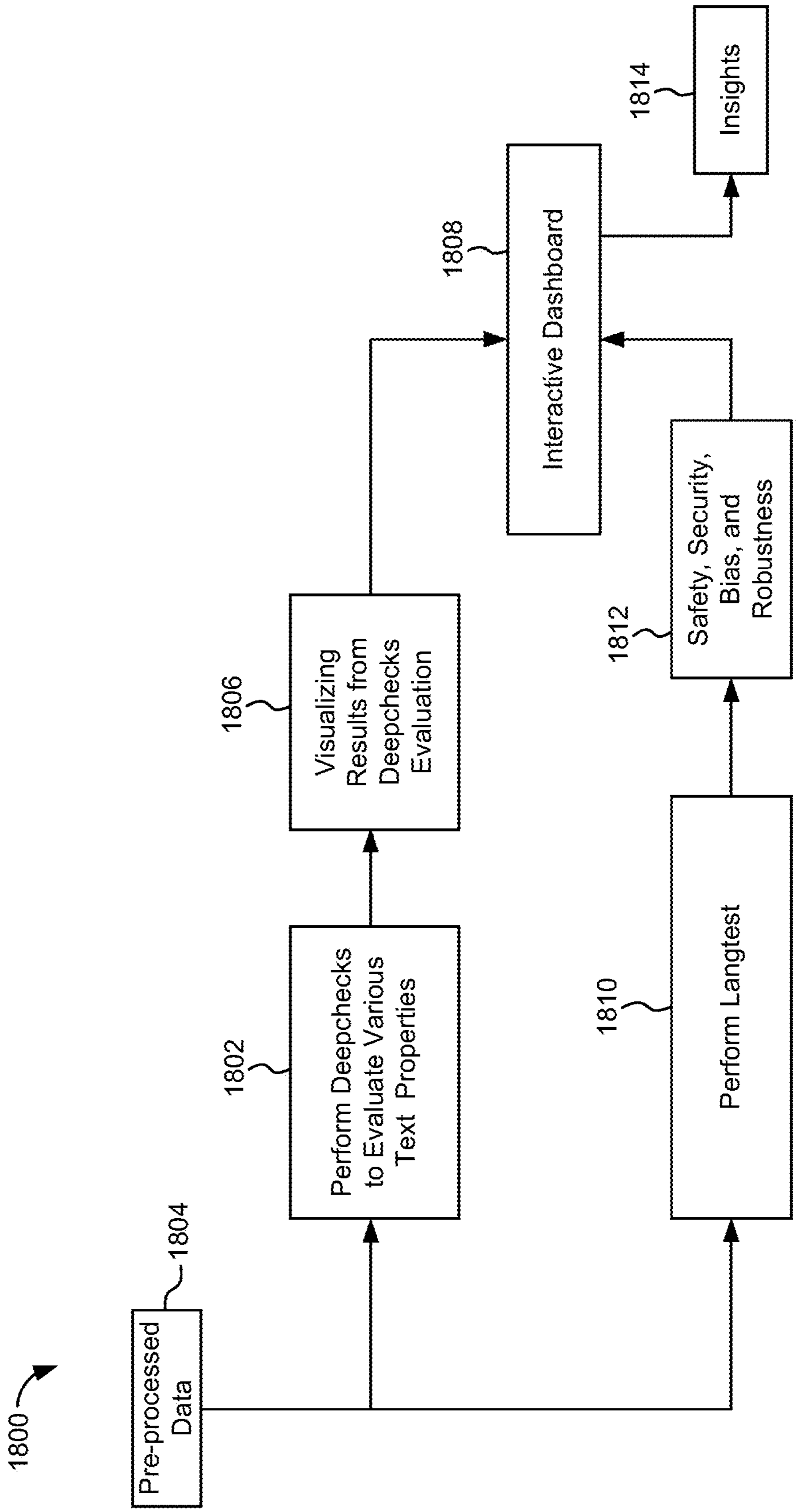
FIG. 18 illustrates an example process flow of assessing responses of LLMs integrating deepchecks and Langtest metrics within an interactive dashboard, in accordance with implementations described in this disclosure.

FIG. 18 illustrates a process 1800 for assessing responses of LLMs integrating deepchecks and Langtest metrics within an interactive dashboard, in accordance with implementations of the present disclosure. The process 1800 may be executed using the integration system 100. FIG. 18 is explained in conjunction with FIGS. 1-17. The process 1800 provides an in-depth analysis of text data, ensuring a thorough examination of textual properties, safety, security, bias, and robustness.

The process 1800 includes performing deepchecks 1802 to evaluate various textual properties in the pre-processed data 1804 of the LLM 134. To evaluate the textual properties, various metrics may be determined. The metrics may include, but are not limited to, text length, average word length, maximum word length, special characters, punctuation, language detection via the langdetect library, sentiment, subjectivity, toxicity, fluency, formality, lexical density, noun count, reading ease, average words per sentence, URL count, email address count, syllables count, reading time, sentence count, and average syllable length. Also, in some examples, embeddings drift detection may be performed. The embeddings drift detection includes monitoring for changes in vector space embeddings over time, which may signal shifts in data distribution or behavior of the LLM. Further, extraction and frequency analysis of n-grams may be performed to identify redundant words and optimize prompt size. Additionally, detection of duplicate samples may be performed to prevent overemphasis on repetitive data and to identify potential issues in data pipeline.

Further, the process 1800 includes visualizing 1806 results from the deepchecks evaluation using an interactive dashboard 1808 (for example, powered by D3.js). The interactive dashboard 1808 may provide a visual representation of the data, enabling users to explore and interpret findings effectively. Visualization tools such as histograms, word clouds, and interactive charts help users identify patterns, detect anomalies, and assess quality of the text data.

The process 1800 further includes performing 1810 Langtest to determine safety, security, bias, and robustness 1812 in the pre-processed data 1804. The Langtest may be performed to evaluate adherence of the LLM to ethical and operational standards. The ethical and operational standards may include safety and security. The Langtest may ensure that the responses of the LLM do not contain harmful or sensitive content. The ethical and operational standards may include bias detection. The Langtest evaluates social biases, stereotypes, and fairness, including Wino Bias in coreference resolution, social bias tests, and stereotype tests. The ethical and operational standards may include robustness The Langtest may assess performance of the LLM under a wide range of inputs and edge cases. The ethical and operational standards may include accuracy and factuality. Tests such as the factuality test and accuracy scores test measure how well the LLM generates accurate and factual information.

The interactive dashboard facilitates a detailed analysis of results from both deepchecks and Langtest. Users may interact with various visualizations to explore the data comprehensively. This feature enables users to drill down into specific areas of interest, identify patterns, and address potential issues in the text data.

The process 1800 provides valuable insights 1814 into performance of the LLM. By integrating metrics related to textual properties, safety, bias, and robustness, users gain a holistic view of behavior of the LLM. The insights 1814 help in understanding strengths and weaknesses of the LLM, guiding improvements and optimizations. The process 1800 supports continuous monitoring and feedback, fostering ongoing enhancements in performance of the LLM and ensuring alignment with ethical standards.

Figure 19:
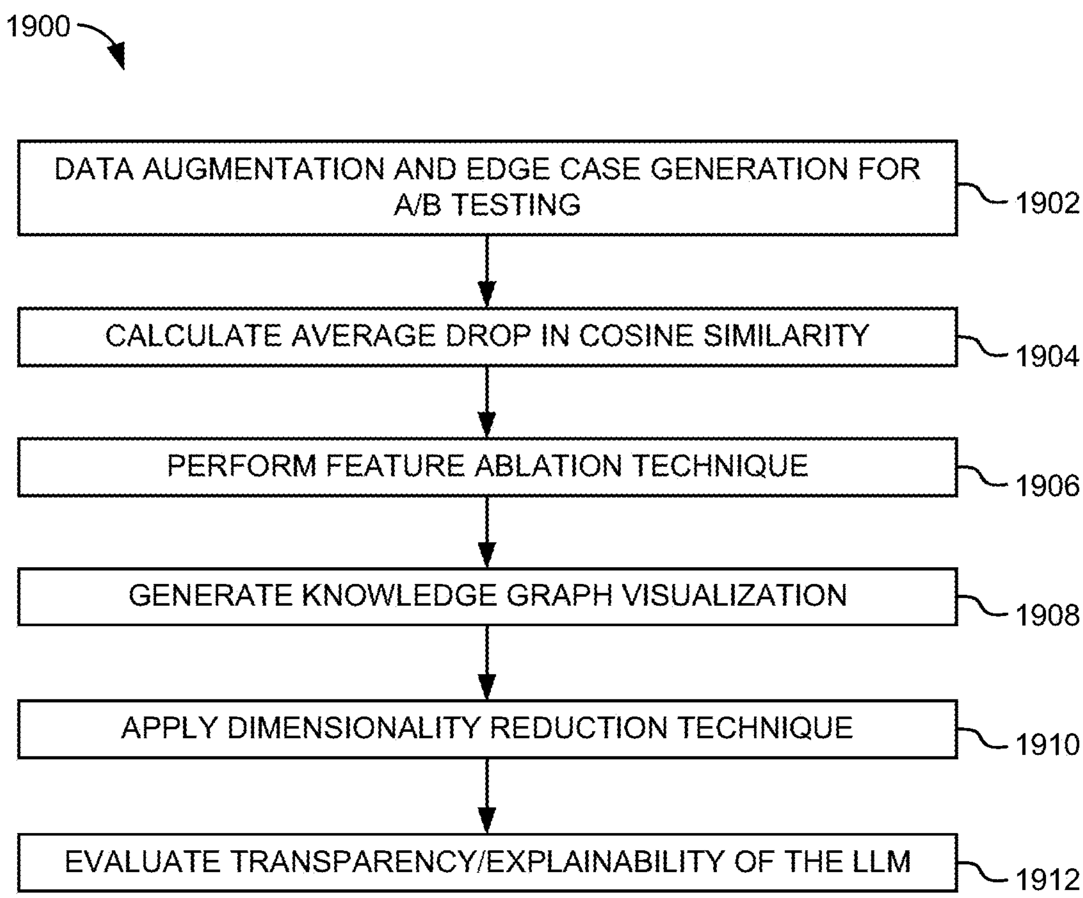
FIG. 19 illustrates an example process flow of assessing transparency and explainability of LLM, in accordance with implementations described in this disclosure.

FIG. 19 illustrates a process 1900 for assessing transparency and explainability of LLM, in accordance with implementations of the present disclosure. FIG. 19 is explained in conjunction with FIGS. 1-18. The process 1900 may be executed by the integration system 100. The process 1900 incorporate data augmentation, edge case generation, feature ablation, knowledge graph visualization, and dimensionality reduction to enhance understanding, robustness, and accountability of the LLM.

The process 1900 includes data augmentation and edge case generation 1902 to test robustness of the LLM. The data augmentation and edge case generation 1902 includes creating variations of pre-processed data to assess how the LLM performs under different conditions. Techniques for data augmentation include random deletion or word swapping (removing or swapping random words to evaluate model sensitivity to specific words), random insertion of words (adding words to test ability of the LLM to handle additional or extraneous information), removing adverbs and stop words (assessing reliance of the LLM on lexical components to understand their impact on performance), replacing alphabets with numerical values (testing how the LLM deals with different types of data representation), adjective synonym and antonym swaps (evaluating how well the LLM handles changes in word meanings and opposites), swapping cohyponyms (substituting words that belong to the same category (e.g., swapping "orange" with "apple") to examine understanding the LLM of related terms), adding contextual tags (inserting tags such as [START] or [END] to analyze sensitivity of the LLM to contextual cues), and inserting misleading sentences and prompt-based edge cases (introducing misleading or harmful content, including violence, hate speech, and misinformation, to ensure the LLM handles such scenarios appropriately).

The process 1900 includes calculating 1904 average drop in cosine similarity. For each data augmentation technique, an average drop in cosine similarity between original and altered text embeddings may be calculated. This metric quantifies impact of each perturbation on the responses of the LLM, providing insights into which features are crucial for maintaining performance and understanding how different changes affect behavior of the LLM. Further, process 1900 includes performing 1906 feature ablation technique. The feature ablation technique is employed to systematically understand the importance of various features within model's input. the feature ablation technique includes random deletion of words (removing random words to assess their importance), random swapping and insertion of words (altering the order or adding new words to test their effect on the responses of the LLM), removing adverbs and stop words (evaluating the impact of these words on performance of the LLM), replacing alphabets with numbers and adjective synonym/antonym swaps (testing ability of the LLM to handle different forms and meanings of words), swapping cohyponyms and adding contextual tags (checking how substitutions and additional tags influence output of the LLM), inserting misleading information and changing voice/tense (assessing how these modifications impact performance and reliability of the LLM). By analyzing the average drop in cosine similarity resulting from these extirpations, the process 1900 helps identify critical features and understand their role in the output of the LLM.

The process 1900 further includes generating 1908 knowledge graph visualization to enhance transparency and interpretability of the LLM responses. The generation of knowledge graph visualization includes two types of parsing graphs including dependency parsing graph and constituency parsing graph, to provide a comprehensive view of structure and relationships of text. The dependency parsing graph may be visualized using Graphviz, which represents grammatical relationships between words in a sentence. Nodes of the dependency parsing graph denote words, while edges illustrate grammatical dependencies, enhancing understanding of sentence structure and relationships. The constituency parsing graph may also be visualized with Graphviz, which depicts hierarchical structure of a sentence by breaking the sentence into constituents. The constituency parsing graph shows how phrases are organized and nested within each other, aiding in comprehension of sentence structure and meaning.

The process 1900 further includes applying 1910 dimensionality reduction techniques to analyze and visualize high-dimensional data. The dimensionality reduction techniques include Truncated Singular Value Decomposition (SVD) which helps visualize clusters of prompts and responses based on similarity in context. The dimensionality reduction techniques include dictionary learning that decomposes prompt-response pairs into components, revealing patterns and trends. The dimensionality reduction techniques include Latent Dirichlet Allocation that shows topic distributions for prompts and responses, highlighting major themes. The dimensionality reduction techniques include Non-negative Matrix Factorization: Identifies important components in the data. The dimensionality reduction techniques include Sparse Principal Component Analysis (PCA) and Incremental PCA that reveal principal components and their variance explanations, highlighting significant data features. The dimensionality reduction techniques include Kernel PCA that transform data to make the data more interpretable and separable, aiding in analysis.

The process 1900 further includes evaluating 1912 transparency and explainability of the LLM based on feature ablation, dimensionality reduction, and knowledge graph visualization. The evaluation ensures that decisions of the LLM are understandable, interpretable, and aligned with ethical standards.

Figure 20:
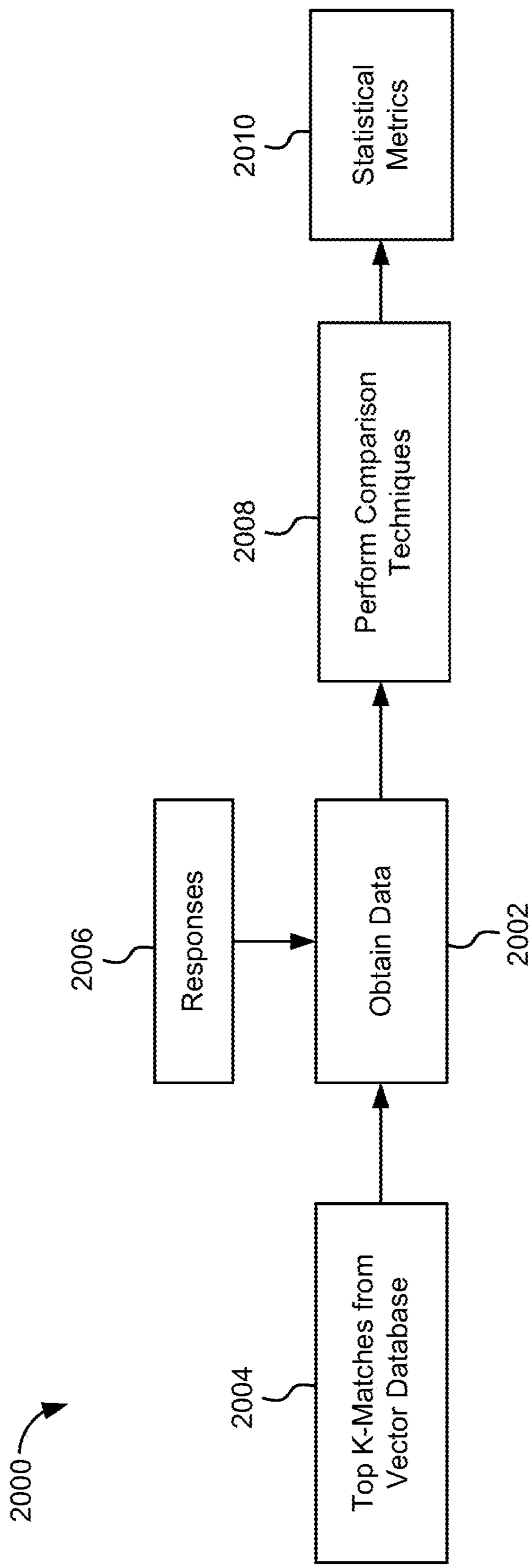
FIG. 20 illustrates an example process flow of hallucination mitigation in responses generated by the LLM, in accordance with implementations described in this disclosure.

FIG. 20 illustrates a process 2000 for hallucination mitigation in responses generated by the LLM, in accordance with implementations of the present disclosure. FIG. 20 is explained in conjunction with FIGS. 1-19. The process 2000 may be executed using the integration system 100. The process 2000 may include integrating multiple advanced techniques to assess and enhance the accuracy and reliability of responses.

The process 2000 includes obtaining data 2002 which includes extracting top-k matches (top-k results) 2004 from the vector database alongside the responses 2006 generated by the LLM. The process 2000 further includes performing comparison techniques 2008 to assess alignment between the generated responses and the top-k results. For example, spaCy document comparison may be performed. The spaCy document comparison involves comparing semantic similarity using spaCy's advanced NLP tools. The spaCy document comparison includes methods such as universal sentence encoder cosine similarity and fuzzy matching techniques—fuzz.ratio, fuzz.partial_ratio, and fuzz.token_sort_ratio—to evaluate how closely the generated responses align with the top-k values from the vector database. In another example, BERT Embeddings technique may be performed to measure semantic similarity between the generated responses and the top-k results, offering a deep understanding of the contextual relevance. In yet another example, TF-IDF technique is used to evaluate importance of words in the context of the document and corpus. By comparing the TF-IDF scores of words in the generated responses with those in the top-k results, insights into the relevance of the terms used may be provided.

Further, in an example, topic comparison may be used to assess how well the topics covered in the generated responses align with those in the top-k results. Metrics for topic comparison include topic diversity (the ratio of unique words to total words in a document's main topic, indicating vocabulary range), word intrusion (whether a specific 'intruder' word is present in the document's main topic), topic intrusion (whether a specific 'intruder' topic is part of the document's topics), coherence (measures how semantically similar the top words in a topic are between the response and the prompt), and perplexity (assesses how well the LLM predicts the sample, with lower values indicating better performance).

In another example, WordNet comparison may be performed using WordNet's lexical database. The WordNet comparison identifies synonyms, antonyms, hypernyms, and hyponyms, which helps in evaluating the similarity of word meanings between the generated responses and the top-k results. In an example, sequence matching may be performed. Sequence matching technique compares similarity between sequences of words or characters to identify how closely the ordering of words in the generated responses matches with the top-k results.

For each of the comparison methods, the process 2000 includes calculating statistical metrics 2010 to provide a comprehensive view of similarity scores. The statistical metrics include average, median, mode, range, variance, standard Deviation, 25th Percentile, and 75th Percentile. These statistics offer insights into the distribution and variability of the similarity scores, helping to gauge the overall performance and reliability of the generated responses.

Figure 21:
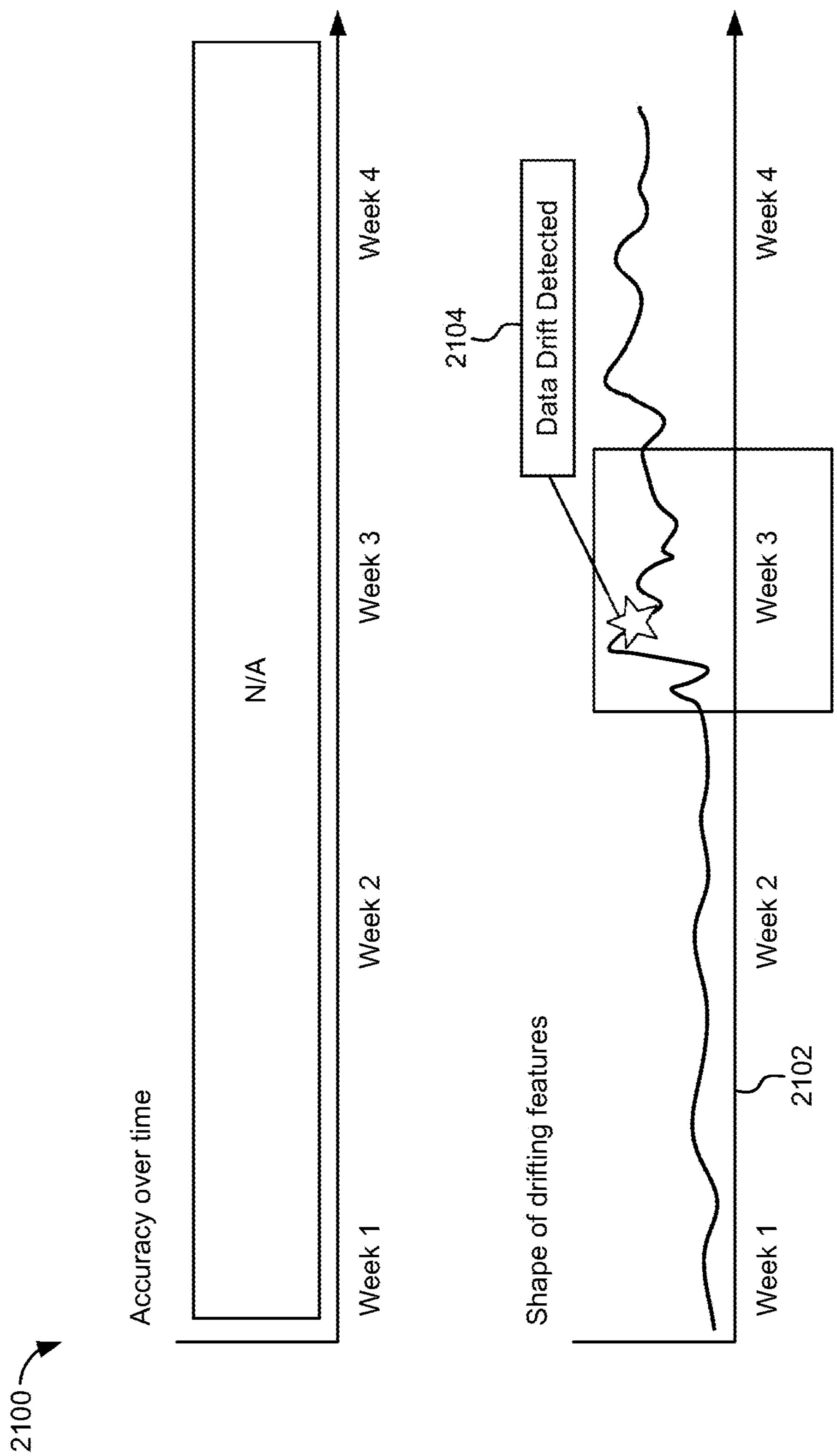
FIG. 21 illustrates a graph representing drift detection across a timeline, in accordance with implementations described in this disclosure.

FIG. 21 illustrates a graph 2100 representing drift detection across a timeline, in accordance with implementations of the present disclosure. FIG. 21 is explained in conjunction with FIGS. 1-20. A drift refers to gradual changes in the statistical properties of input data over time, which may affect accuracy and reliability of predictive LLM. The graph 2100 underscores necessity of continuous monitoring to ensure that the LLM remains effective and responsive to evolving data conditions.

A horizontal axis 2102 of the graph 2100 indicates the timeline including weeks (e.g., from week 1 to week 4). The graph 2100 shows detection of data drift 2104 in week 4. The data drift 2104 refers to changes in the statistical properties of input data over time. This phenomenon occurs when the distribution or characteristics of the data that the LLM is trained on shift from those of the data it is currently processing. For example, if the LLM is initially trained on data related to medical insurance claims but, over time, starts receiving queries about home insurance without any adjustments to the LLM, the performance of the LLM may degrade. This degrading happens because the statistical properties of new data (home insurance) differ from those of the original training data (medical insurance). The LLM, having been optimized for one type of data, may not handle the new, distinct data effectively, leading to reduced accuracy and reliability. The data drift 2104 highlights importance of regularly updating and validating the LLM to ensure they remain effective as the nature of the data evolves.

The Page-Hinkley Test, Adaptive Windowing, and Kolmogorov-Smirnov Windowing are statistical methods used for detecting changes or "drift" in data distributions over time. Page-Hinkley Test is a statistical technique designed to monitor changes in the average value of a process. Such a test may work by accumulating the sum of observed data values over time and comparing this sum to a predefined threshold. When the accumulated sum exceeds this threshold, it signals that a significant change, or drift, has occurred in the data. Therefore, each of the statistical method described above may be effective in identifying abrupt shifts in data patterns, making it useful for monitoring real-time processes where changes in mean values need to be detected promptly. Adaptive Windowing is a dynamic technique that adjusts the size of the data window used for drift detection based on the variability and dynamics of the data. In a non-stationary environment, where data distributions change over time, this method adapts by increasing or decreasing the window size. Due to which, it may better capture gradual or rapid changes in the data, ensuring that drift detection remains accurate even as the characteristics of the data evolve. Kolmogorov-Smirnov Windowing utilizes the Kolmogorov-Smirnov (KS) test, a nonparametric statistical test that compares the cumulative distribution functions (CDFs) of two datasets/data of the LLM 134. Further such tests assess whether two datasets come from the same distribution by evaluating the maximum difference between their CDFs. In drift detection, Kolmogorov-Smirnov Windowing compares the distribution of data within a specified window to a reference distribution. A significant difference between the distributions indicates that a drift has occurred. This approach is useful for detecting shifts in the data distribution that may not be apparent through mean or variance changes alone. These techniques each offer unique strengths in identifying different types of data drift, enabling more robust monitoring and adaptation to evolving data environments.

Figure 22:
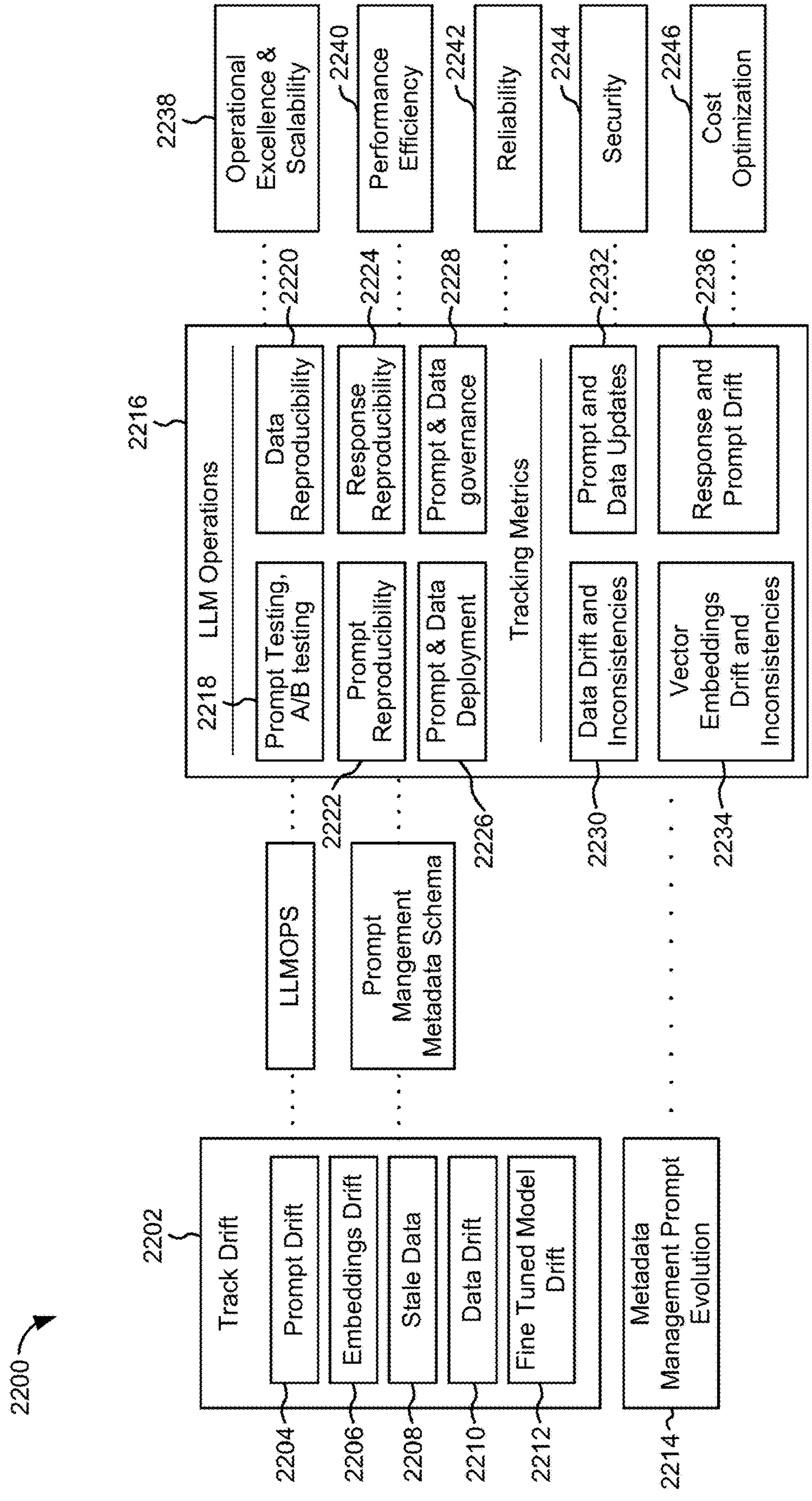
FIG. 22 illustrates an integrated LLMOPS framework for managing drifts, in accordance with implementations described in this disclosure.

FIG. 22 illustrates an integrated LLMOPS framework 2200 for managing drifts, metadata, prompt evolution, and operational efficiency in LLMs, in accordance with implementations of the present disclosure. FIG. 22 is explained in conjunction with FIGS. 1-21.

The integrated LLMOPS framework 2200 includes tracking drift 2202 in various components, such as prompts, responses, data, embeddings, and model issues. The drift may occur due to several factors, including prompt drift 2204 due to prompt decay, where the effectiveness of prompts diminishes over time, and embeddings drift 2206 which refers to changes in the underlying data that cause inconsistencies between prompts and responses. Stale data 2208 and data drift 2210 contribute to this issue by altering relevance of the information used. Additionally, the prompt drift 2204 may result in inconsistencies and decay in prompt-response interactions, while fine-tuned model drift 2212 refers to changes in behavior of the LLM after fine-tuning. Tracking these issues is crucial for maintaining the quality and consistency of outputs of the LLM.

The integrated LLMOPS framework 2200 may include metadata management and prompt evolution 2214. This includes prompt template management, which involves creating and maintaining standardized templates for prompt formulation. Effective prompt tweaking and CI/CD deployment are essential for iterative improvements and continuous integration and deployment of updated prompts. Versioning and metadata management ensure that changes are tracked, and prompts have evolved systematically to adapt to new requirements and data.

The integrated LLMOPS framework 2200 emphasizes the importance of prompt and data reproducibility 2216. To ensure that results are consistent across different environments, the integrated LLMOPS framework 2200 includes tracking registries (not shown in FIG. 22), deployment pipelines (not shown in FIG. 22), and orchestration platforms (not shown in FIG. 22). These tools facilitate reproducible results by managing prompts, responses, data, and embeddings through coordinated tracking and monitoring mechanisms.

To evaluate prompt effectiveness and performance of the LLM, the integrated LLMOPS framework 2200 includes various LLM operations including prompt testing and A/B testing 2218. This involves comparing different versions of prompts and responses to identify the most effective configurations. Further, the LLM operations include data reproducibility 2220, prompt reproducibility 2222, response reproducibility 2224, prompt and data deployment 2226, and prompt and data governance 2228 which are important operations, as they ensure that results remain consistent when prompts and data are deployed or updated.

To address issues related to drifts, the integrated LLMOPS framework 2200 includes various tracking metrics. The tracking metrics may be crucial for maintaining quality and consistency of outputs of the LLM. The integrated LLMOPS framework 2200 may monitor data drift and inconsistencies 2230, ensuring shifts in data characteristics and inconsistencies are addressed. The integrated LLMOPS framework 2200 may also manage prompt and data updates 2232, keeping prompts and data relevant and accurate. The integrated LLMOPS framework 2200 may track vector embeddings drift and inconsistencies 2234 to maintain alignment between prompts and responses. Additionally, the integrated LLMOPS framework 2200 may observe response and prompt drift 2236 to ensure that variations in prompt effectiveness and response consistency are managed.

Further, operational excellence and scalability 2238 are achieved through scalable management of prompts, data, and vector embeddings. The integrated LLMOPS framework 2200 handles thousands of prompts, data updates, and embeddings drift simultaneously. It includes tools for monitoring drift metrics, prompt and data versioning, and replicating results across various platforms. This ensures that efficient management of changes and maintenance of performance across different environments.

The integrated LLMOPS framework 2200 addresses performance efficiency 2240 by monitoring and mitigating prompt quality debt which involves tracking model decay, drift statistics, and conducting perturbation tests to identify issues. Monitoring NLP scores, outliers, and semantic metrics helps in detecting quality issues early. Technical debt mitigation is handled through roll-back procedures and addressing training-serving skew to ensure consistent responses and reliability 2242. Responsible AI metrics and short-term versus long-term goals are considered to balance immediate fixes with sustainable improvements.

The integrated LLMOPS framework 2200 includes security 2244 aspects including audit, compliance, and governance to ensure that prompts and data adhere to regulatory standards. Post-monitoring metrics are used to maintain transparency and traceability. This includes logging, ensuring that the integrated LLMOPS framework is traceable and transparent, and implementing risk remediation strategies to address potential issues proactively.

The integrated LLMOPS framework 2200 emphasizes cost optimization 2246 through automated, centralized, and reproducible processes. By automating tracking, testing, and remediation, the integrated LLMOPS framework 2200 reduces deployment times and operational costs. Prompt caching, prompt testing, and reuse of components contribute to cost savings and operational efficiency.

Figure 23:
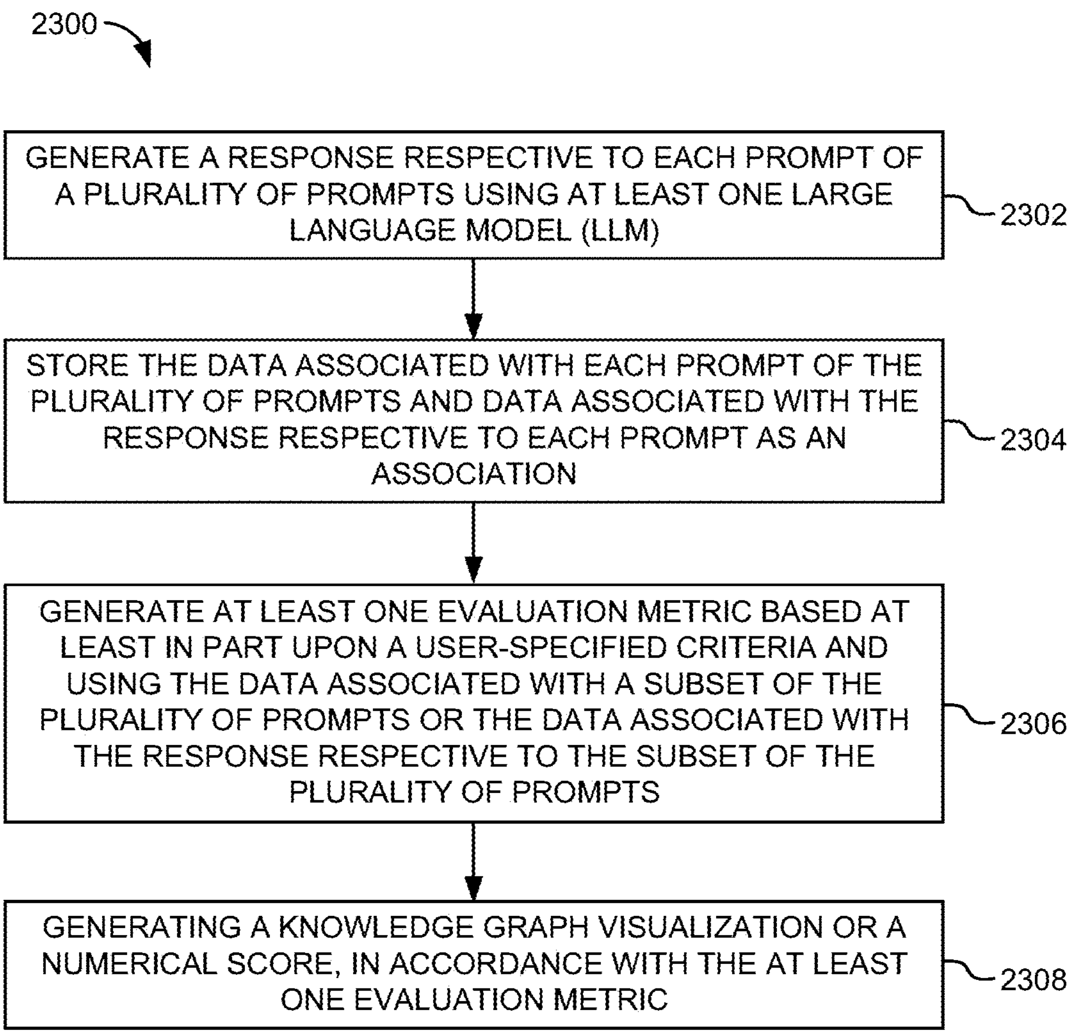
FIG. 23 is a flow diagram that presents an example method for evaluating integration of RAIOPS and LLMOPS, in accordance with implementations of the present disclosure.

FIG. 23 is a flow diagram that presents an example method 2300 for evaluating integration of RAIOPS and LLMOPS, in accordance with implementations of the present disclosure. In some implementations, the method 2300 may be executed by the processor 102 of the integration system 100. FIG. 23 is explained in conjunction with FIGS. 1-20.

At step 2302, a response respective to each prompt of the plurality of prompts may be generated using at least one LLM 134, in response to receiving data associated with each prompt of a plurality of prompts. At step 2304, the data associated with each prompt of the plurality of prompts and data associated with the response respective to each prompt may be stored in memory 104 as an association. In some implementations, dimensionality reduction techniques or clustering techniques may be performed on the data associated with the subset of the plurality of prompts and/or the data associated with the response respective to the subset of the plurality of prompts.

At step 2306, at least one evaluation metric may be generated for evaluating the response respective to each prompt of the plurality of prompts for at least one aspect of a plurality of aspects. The plurality of aspects includes relevance, inconsistency, security, drift detection, robustness, bias and fairness detection, accuracy and appropriateness of the response, transparency and explainability, hallucination detection, and/or language translation or caching sustainability. The at least one evaluation metric may be generated based at least in part upon a user-specified criteria and using the data associated with a subset of the plurality of prompts or the data associated with the response respective to the subset of the plurality of prompts. The user-specified criteria may include generating the at least one evaluation metric at a preconfigured time interval and/or generating the at least one evaluation metric upon generating a preconfigured number of responses.

The at least one evaluation metric generated for drift detection identifies a content drift, a data drift, a temporal drift, a tone drift, an upstream drift, a domain drift, a covariate drift, a prior probability drift, a population drift, a feature drift, a sampling bias drift, a seasonal drift, a conceptual drift, an adversarial attach drift, an environmental drift, a response drift, a prompt drift, and/or embeddings drift. The at least one evaluation metric generated for relevance evaluates the response for at least one of misinformation, abuse, toxic content, bias, text inconsistencies, and/or relevancy. The at least one evaluation metric generated for security evaluates the subset of the plurality of prompts for a prompt injection attack, a prompt leakage attack, a prompt poisoning attack, and/or a prompt jailbreaking attempt.

The content drift refers to a shift in subject matter or topics that the LLM 134 is asked to handle over time. As focus of queries or tasks changes, the LLM 134 may encounter new topics or subject areas that are not part of its original training data. This shift may lead to performance degradation if the LLM 134 has not been trained on these new topics or if it lacks sufficient exposure to them. The inability to effectively address emerging or evolving topics underscores the importance of continuously updating and retraining the LLM 134 to maintain their relevance and accuracy.

The data drift involves alterations in the statistical properties of input data over time. When the LLM 134 is trained on a specific type of data, any subsequent introduction of different or new data may adversely affect its performance. For example, if the LLM 134 is initially trained on data reflecting certain patterns or distributions, a significant change in these patterns may lead to decreased accuracy and reliability in predictions. Monitoring and addressing data drift is crucial for ensuring that the LLM 134 continues to perform well as the nature of the input data evolves.

The temporal drift occurs when the performance of the LLM 134 deteriorates over time due to shifts in the data distribution. The temporal may be influenced by various events or changes that affect the type and nature of queries or data inputs. For instance, promotional discounts or changes in service rates from an internet provider may alter types of queries the LLM 134 receives. Such shifts in the underlying data may impact performance of the LLM 134, making it necessary to track and adapt to these changes to preserve effectiveness and accuracy of the LLM 134 over time.

The tone drift refers to shift in the tone or style of input data over time. When the LLM 134 is trained or operates with data that has a specific tone, such as formal or professional language, it may struggle to perform accurately if exposed to input data with a different tone, such as casual or colloquial language. This misalignment may lead to inaccuracies or misunderstandings in the responses. For instance, the LLM 134 is trained predominantly on formal texts may not handle casual language effectively, impacting its ability to generate appropriate and contextually accurate responses.

The upstream drift involves changes in data sources that the LLM 134 relies on. When the LLM 134 depends on data from external sources, any alterations in how these sources collect or present data may affect the performance of the LLM 134. For example, if a data source modifies its data collection methodology or shifts its focus to different topics, the LLM 134 may encounter issues such as outdated or irrelevant information. The upstream drift may result in degraded performance and reduced reliability if the LLM 134 is not adjusted to accommodate these changes. It is essential to continuously monitor and adapt to upstream changes to maintain the accuracy and relevance of the responses of the LLM 134.

The prompt drift occurs when changes are made to the prompt over time, such as frequent updates or variations in wording. This may lead to unexpected responses as embeddings and the LLM adapt to these modifications. Prompts may inadvertently contain toxic language, or bias, or vary in synonyms and tone, which may affect how questions are interpreted. For example, different phrasings of a question, like "What is my account balance?" and "How much money do I have left?" may result in varying responses due to these shifts in context and wording.

The response drift involves changes in outputs of the LLM 134, including shifts in tone, verbosity, brevity, relevance, and politeness. Variations may also arise in use of language, such as ambiguity, idioms, metaphors, and cultural references. These changes may impact the consistency and appropriateness of responses, affecting the overall quality and reliability of the output of the LLM 134. The embeddings drift refers to evolution of word embeddings over time. Initially, specific words may be closely associated with certain meanings, but as language usage changes, these associations may shift. For instance, a word "virus" may have been primarily linked to "computer" in early embeddings but may become more commonly associated with "pathogen" as language and context evolve.

The domain drift occurs when the LLM 134 is fine-tuned for one domain, such as general English, is applied to a different domain, like legal documents. This mismatch may lead to performance degradation as the LLM 134 may not handle the specialized terminology or context of the new domain effectively. The domain drift may also result from changes to embeddings or prompts that do not align with the original domain's context.

The covariate drift refers to shifts in the relationships between input variables over time. This means that the way input features interact or relate to each other may change, impacting the predictions of the LLM 134. For instance, if the relationship between customer demographics and purchasing behavior evolves, the LLM 134 may struggle to maintain accuracy if it is trained on outdated relationships.

The prior probability drift involves changes in the underlying probabilities associated with different classes. For example, if the LLM 134 is trained with a class distribution where 70% of queries were about home insurance and 30% about boat insurance, but the actual distribution shifts, the LLM 134 may underperform. If the balance changes and more prompts are now about boat insurance, the LLM 134 may not handle this new distribution effectively.

The population drift occurs when the characteristics of the population interacting with the LLM 134 change over time. For instance, if the LLM 134 is initially focused on prompts related to claims and policy changes but is then faced with questions about policy features and pricing from potential customers, it may need adjustments to address these new requirements and align with the updated needs of the population.

The feature drift occurs when the features used by the LLM 134 change over time. For example, in a medical diagnosis the LLM 134, if new symptoms become relevant for diagnosing a disease or if previously relevant symptoms become outdated, the performance of the LLM may be adversely affected due to this shift in features.

The sampling bias drift happens when the method of sampling data changes, introducing a bias that is not present in the original training data. For instance, if an insurance company initially collects data from a broad range of car owners but later focuses exclusively on luxury car owners, this sampling bias may distort the predictions of the LLM 134 and lead to inaccuracies.

The seasonal drift refers to variations in data patterns associated with different seasons. For example, the LLM 134 associated with insurance may experience more queries related to accidents during the winter months due to increased road hazards. These seasonal changes may impact performance of the LLM 134 if it is not adjusted to account for such variations.

The conceptual drift occurs when the underlying concepts or relationships learned by the LLM 134 evolve over time. For example, if the LLM associated with insurance initially learns that younger drivers are more likely to make claims but, due to safer vehicles and stricter driving tests, this relationship changes, the LLM 134 may need updating to reflect the new trend and maintain accuracy. In an example, a plurality of selections may be generated to provide for optimization and/or tuning of the LLM. The plurality of selections may include, but are not limited to, hyperparameter tuning, training data, model architecture, regularization (to change dropout rates and weight decay), drift detection, bias and fairness, feedback integration, and the like.

At step 2308, a knowledge graph visualization or a numerical score may be generated, in accordance with the at least one evaluation metric. The knowledge graph visualization or the numerical score indicates performance of the LLM which may be utilized further by users to determine whether the LLM needs optimization or tuning. In some implementations, the numerical score may be boosted upon finding a synonym match in the response when compared with a respective ground-truth. The synonym match utilizes a Bidirectional Encoder Representations from Transformers (BERT) multilingual model.

By way of an example, consider a scenario where a company has utilized an LLM to automate responses for customer support queries. In such a case, performance of the LLM may be evaluated by the integration system 100 to ensure that the LLM provides accurate, relevant, and secure responses. The integration system 100 receives a batch of customer support queries. For example, prompts include "How do I reset my password?" and "Where can I find the latest product updates?". The LLM may process each prompt to generate a response. For example, for "How do I reset my password?", the LLM may generate "To reset your password, go to the 'Forgot Password' link on the login page and follow the instructions". The integration system 100 stores each prompt and its corresponding response in memory. This data is organized as associations (prompt-response), allowing for efficient retrieval and analysis later. Further, the integration system 100 applies dimensionality reduction techniques like PCA or t-SNE on the stored data to simplify and visualize complex relationships. Clustering techniques such as k-means may be used to group similar prompts and responses, helping to identify common themes or areas of concern. Further, user-specified criteria may be retrieved. For example, the user specified criteria may be generation of evaluation metrics every 500 responses or every 24 hours, whichever comes first. This user specified criteria ensures timely and relevant assessments. Further, evaluation metrics may be generated based on the user specified criteria for one or more aspects. For examples, aspects such as relevance, security, and drift are considered for evaluation. It may be checked if the response accurately addresses the prompt. For the prompt "How do I reset my password?", the system evaluates if the response is clear, actionable, and relevant. The integration system 100 checks if the prompt may potentially lead to a security issue, such as prompt injection attacks, which ensures that the response does not inadvertently expose sensitive information. The integration system 100 checks for drifts in the data, such as changes in response accuracy over time or shifts in the types of queries received. The integration system 100 generates evaluation metrics for these aspects. If the integration system 100 detects a change in the types of customer support queries over time (e.g., more queries about new features), the integration system 100 may evaluate if the responses of the LLM are still relevant and accurate. The integration system 100 may generate a knowledge graph visualization or a numerical score in accordance with the evaluation metrics. The integration system 100 creates the knowledge graph visualization to show how different responses are related to various prompts. The integration system 100 visualizes clusters of similar queries and responses, helping identify gaps or inconsistencies in the performance of the LLM. The numerical score is generated based on the evaluation metrics. For example, the integration system 100 calculates an accuracy score of 85% based on the relevance and correctness of responses.

Further, if a synonym match is found between the generated response and a ground-truth reference (e.g., "reset password" and/or "password reset"), the integration system 100 boosts the numerical score using a BERT multilingual model, which improves the score reflecting accurate semantic understanding. The company may use the knowledge graph visualization and the numerical score to determine whether the LLM needs optimization or tuning. For example, if the numerical score drops below a certain threshold or if drift detection reveals significant issues, the LLM may be retrained or adjusted.

Implementations of the present disclosure provide technical solutions to multiple technical problems that arise in the context of evaluation of the LLMs in post-production scenarios.

Implementations of the present disclosure ensure:

- Enhanced model reliability: By accurately detecting the drift in the LLMs, the proposed methodology may ensure that the LLMs maintain their performance over time, while providing reliable and consistent results despite evolving language patterns and usage.
- Improved model accuracy: The proposed methodology may enable early detection and correction of the drift, which may further prevent the degradation of accuracy of the LLMs, thereby ensuring that the responses of the LLMs remain relevant and useful.

Efficient Resource Utilization: By detecting and correcting the drift early, the proposed methodology may prevent unnecessary computations or data storage related to inaccurate results of the LLMs, thereby ensuring efficient resource utilization.

Ensure reliability: The proposed methodology enable the LLMs to perform and accurately over time, which may help in enhancing user experience.

Therefore, implementations of the present disclosure may improve performance and reliability of the LLMs by providing early detection and correction of the drift in the LLMs, while ensuring the LLMs continue to deliver accurate and relevant outputs/results. By improving the accuracy and reliability of the LLMs, the implementations of the present disclosure may enhance processing speed, reducing storage or bandwidth requirements by preventing unnecessary computations of data storage related to inaccurate results of the LLMs. Furthermore, the detection and correction of the drift may help in maintaining ethical and fairness standards of the LLMs, thereby enhancing their overall utility and applicability.

Implementations of the present disclosure further provide:

Enhanced user experience: Detailed explanations and visualization helps users understand performance of the LLM, which facilitates better decision-making and more effective use of the LLM.

Market demand alignment: By offering customizable solutions that cater to specific target audience needs, the disclosure ensures that the LLM remains relevant and valuable. It addresses current market demands and aligns with diverse business requirements, enhancing the LLM's applicability across various industries.

Scalability: The disclosure is designed to grow and adapt to increasing demand or changing market conditions. The scalability ensures that the LLM may handle a growing volume of data and user interactions without compromising performance.

Affordability: By utilizing open-source frameworks, the disclosure ensures that the LLM is accessible to a broad audience. This approach reduces costs and allows a wider range of users to benefit from the technology.

Quality: The disclosure ensures high quality through the use of scalable, durable, and reliable components. This commitment to quality helps in building customer trust and delivering dependable performance.

Compatibility: The disclosure employs generic Python libraries and containerization, enabling seamless integration with existing systems. The compatibility ensures that the LLM may work effectively within various technological environments.

Safety: The libraries and components used in the disclosure comply with industry safety standards, providing assurance that the LLM operates within established safety protocols.

Support and maintenance: The disclosure includes provisions for regular updates and maintenance based on client needs. This support enhances the LLM's value and ensures ongoing performance improvements.

Early detection of issues: The disclosure facilitates early identification of issues through regular monitoring and maintenance. This proactive approach helps prevent customer dissatisfaction and financial loss by addressing potential problems before they escalate.

Mitigating unintended consequences: By implementing practices such as impact assessments and user feedback mechanisms, the disclosure helps manage and mitigate unintended consequences of AI models, ensuring that they do not lead users to harmful content.

Ensuring fairness: The disclosure incorporates practices like bias audits and mitigation techniques to prevent discriminatory outcomes and ensure that the LLM operates fairly and equitably.

Transparency: Transparency in AI operations is a key feature of the disclosure, fostering trust among users and stakeholders by clearly communicating how the LLM functions and how it handles data.

Legal and regulatory compliance: The disclosure ensures adherence to regulations such as General Data Protection Regulation (GDPR) and CCPA, avoiding potential penalties and ensuring that the LLM operates within legal and regulatory frameworks.

Enhancing user experience: By regularly monitoring and fine-tuning the LLM, the disclosure improves the user experience, preventing issues such as irrelevant recommendations and maintaining high user satisfaction.

Future-Proofing: The disclosure includes measures to anticipate and mitigate risks, ensuring that the LLM may adapt to and manage future challenges.

Proactive measures: The disclosure emphasizes regular auditing, strong privacy measures, transparency, and user education to prevent issues and manage expectations effectively.

Reactive measures: It includes mechanisms for incident response, user feedback, updates, and policy enforcement to address and rectify issues promptly if they arise.

Bias Mitigation: The disclosure employs diverse and balanced data, bias correction techniques, and regular audits to address and reduce biases in the LLM's outputs.

Fairness Evaluation: It involves regular evaluation of fairness metrics and adjustments to ensure the LLM treats all topics, languages, and types of language use equitably.

Toxicity Management: Robust content moderation systems and toxicity detection models are integrated to prevent and address harmful or offensive content generated by the LLM.

Human Safety: The disclosure includes error-checking and safety measures to ensure that the LLM provides accurate and non-harmful information, safeguarding users from potential harm.

Security: Strong cybersecurity measures and input/output sanitization are implemented to protect the LLM from malicious manipulation and to ensure the privacy of sensitive information.

Privacy Protection: Differential privacy techniques, anonymization of training data, and transparency about data usage are utilized to protect user privacy and comply with data protection regulations.

Robustness: Adversarial training, stress testing, and fault tolerance mechanisms are applied to ensure the LLM performs reliably under various conditions and handles edge cases effectively.

Soundness: Rigorous post-processing and quality assurance steps are incorporated to ensure that the LLM's outputs are accurate, coherent, and reliable.

Transparency: Detailed documentation and visualization tools are provided to explain the LLM's training process, data sources, and decision-making logic, enhancing user understanding and trust.

Explainability: The disclosure addresses the inherent complexity of LLMs by incorporating explainability by design and utilizing AI techniques to improve interpretability.

The proposed methodology may use various evaluation metrics to provide a comprehensive assessment of the LLM's performance, capturing different aspects such as translation accuracy, content coverage, and semantic similarity. This approach helps in fine-tuning and optimizing the LLM for better overall performance.

Operational Excellence: Techniques like dimensionality reduction, caching, and data chunking are employed to enhance operational efficiency, improve throughput, and reduce latency.

Security Measures: Masking strategies and outlier detection are used to protect sensitive information and ensure that the LLM's outputs are secure and reliable.

Reliability: Metrics, testing procedures, and visualization techniques contribute to the LLM's reliability, ensuring consistent and accurate outputs.

Robustness and Sustainability: Data augmentation, soundness metrics, and efficient practices contribute to the LLM's robustness, sustainability, and cost-effectiveness.

Figure 24:
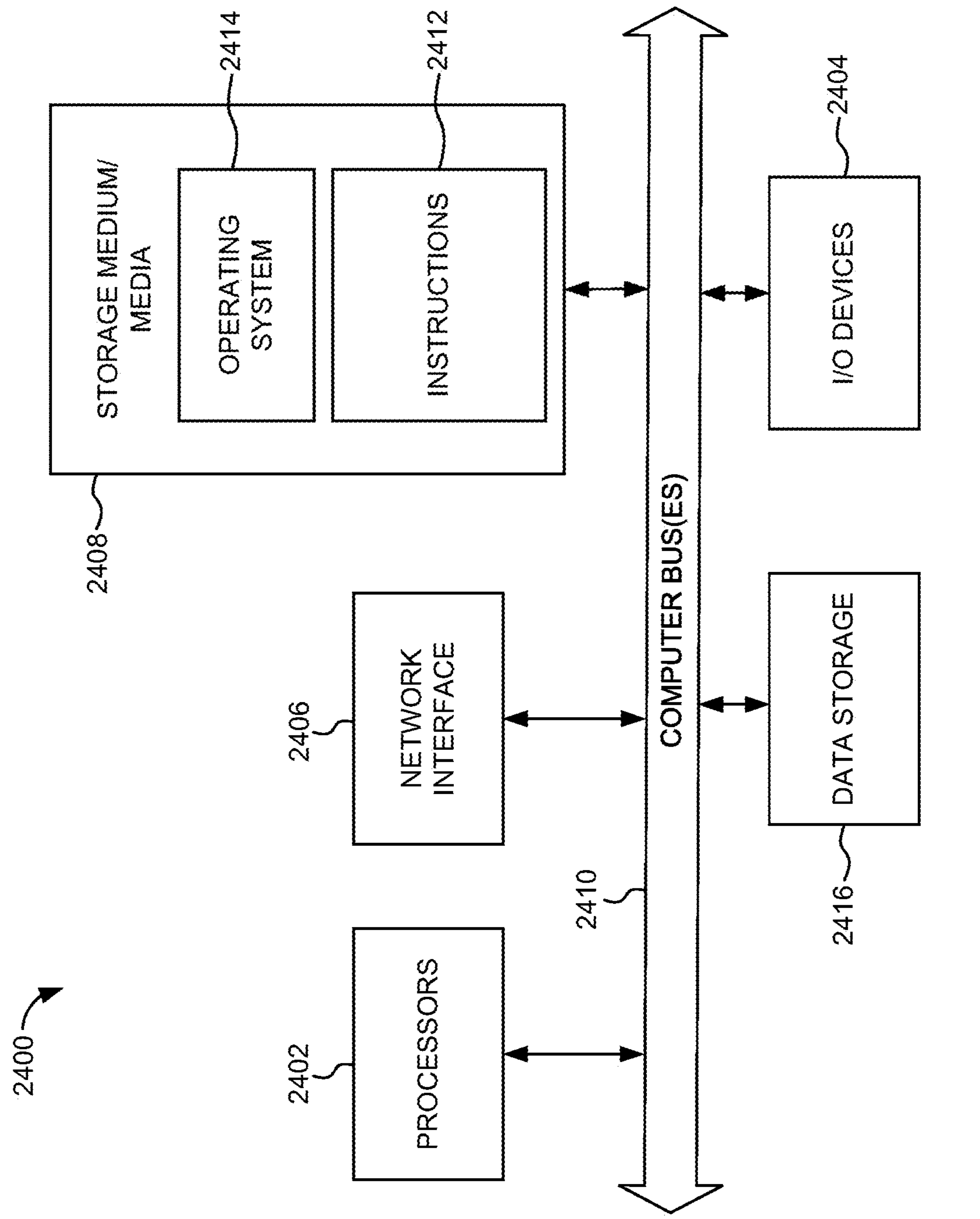
FIG. 24 illustrates a computer system that may be used to implement the integration system.

FIG. 24 illustrates a computer system 2400 that may be used to implement the integration system 100. More particularly, computing machines such as desktops, laptops, smartphones, tablets, and wearables which may be used for evaluating integration of RAIOPS and LLMOPS. The computer system 2400 may include additional components not shown and that some of the process components described may be removed and/or modified. In another example, a computer system 2400 may be deployed on external-cloud platforms such as cloud, internal corporate cloud computing clusters, organizational computing resources, and/or the like.

The computer system 2400 includes processor(s) 2402, such as a central processing unit, Application Specific Integrated Circuit (ASIC) or another type of processing circuit, input/output devices (I/O) 2404, such as a display, mouse, keyboard, etc., a network interface 2406, such as a Local Area Network (LAN), a wireless 802.11x, a 3G or 4G mobile network, a WAN, or a WiMax, and a computer-readable storage medium/media 2408. Each of these components may be operatively coupled to one or more computer bus(es) 2410. The computer-readable storage medium/media 2408 may be any suitable medium that participates in providing instructions to the processor(s) 2402 for execution. For example, the computer-readable storage medium/media 2408 may be non-transitory or non-volatile medium, such as a magnetic disk or solid-state non-volatile memory or volatile medium such as RAM. The instructions or modules stored on the computer-readable storage medium/media 2408 may include machine-readable instructions 2412 executed by the processor(s) 2402 that cause the processor(s) 2402 to perform the methods and functions of the integration system 100.

The integration system 100 may be implemented as software stored on a non-transitory processor-readable medium and executed by the processors 2402. For example, the computer-readable storage medium/media 2408 may store an operating system 2414, such as MAC OS, MS WINDOWS, UNIX, or LINUX, and code for the integration system 100. The operating system 2414 may be multi-user, multiprocessing, multitasking, multithreading, real-time, and the like. For example, during runtime, the operating system 2414 is running and the code for the integration system 100 is executed by the processor(s) 2402.

The computer system 2400 may include a data storage 2416, which may include non-volatile data storage. The data storage 2416 stores any data used or generated by the integration system 100.

The network interface 2406 connects the computer system 2400 to internal systems for example, via a LAN. Also, the network interface 2406 may connect the computer system 2400 to the Internet. For example, the computer system 2400 may connect to web browsers and other external applications and systems via the network interface 2406.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term computing system encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random-access memory or both. Elements of a computer may include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media (CRM) suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touchpad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network (LAN) and a wide area network (WAN), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for evaluating integration of Responsible Artificial Intelligence Operations (RAIOPS) and Large Language Model Operations (LLMOPS), comprising:

generating, by one or more processors, in response to receiving data associated with each prompt of a plurality of prompts, a response respective to each prompt of the plurality of prompts using at least one Large Language Model (LLM);

storing, by the one or more processors, in at least one memory, the data associated with each prompt of the plurality of prompts and data associated with the response respective to each prompt as an association;

generating, by the one or more processors, based at least in part upon a user-specified criteria and using the data associated with a subset of the plurality of prompts or the data associated with the response respective to the subset of the plurality of prompts, at least one evaluation metric for evaluating the response respective to each prompt of the plurality of prompts for at least one aspect of a plurality of aspects;

generating, by the one or more processors, in accordance with the at least one evaluation metric, a knowledge graph visualization or a numerical score to display performance of the LLM and determine whether the LLM needs optimization or tuning; and boosting, by the one or more processors, the numerical score upon finding a synonym match in the response when compared with a respective ground-truth, and wherein the synonym match utilizes a Bidirectional Encoder Representations from Transformers (BERT) multilingual model, wherein the boosting comprises:

calculating metrics specific to a domain or an application for the data associated with each prompt of the plurality of prompts and the data associated with the response respective to each prompt of the plurality of prompts, analyzing central tendencies of the metrics derived from multiple runs to generate different responses, setting a baseline score of each metric based on the analyzed central tendencies, and calculating a safe score based on the baseline score to determine the boosting of the numerical score.

2. The computer-implemented method of claim 1, wherein the user-specified criteria include generating the at least one evaluation metric at a preconfigured time interval and/or generating the at least one evaluation metric upon generating a preconfigured number of responses.

3. The computer-implemented method of claim 1, wherein the plurality of aspects includes relevance, inconsistency, security, drift detection, robustness, bias and fairness detection, accuracy and appropriateness of the response, transparency and explainability, hallucination detection, and/or language translation or caching sustainability.

4. The computer-implemented method of claim 1, further comprising prior to generating the at least one evaluation metric, performing, by the one or more processors, dimensionality reduction techniques or clustering techniques on the data associated with the subset of the plurality of prompts and/or the data associated with the response respective to the subset of the plurality of prompts.

5. The computer-implemented method of claim 1, wherein the at least one evaluation metric generated for drift detection identifies a content drift, a data drift, a temporal drift, a tone drift, an upstream drift, a domain drift, a covariate drift, a prior probability drift, a population drift, a feature drift, a sampling bias drift, a seasonal drift, a conceptual drift, an adversarial attach drift, an environmental drift, a response drift, a prompt drift, and/or embeddings drift.

6. The computer-implemented method of claim 1, wherein the at least one evaluation metric generated for relevance evaluates the response for at least one of misinformation, abuse, toxic content, bias, text inconsistencies, and/or relevancy.

7. The computer-implemented method of claim 1, wherein the at least one evaluation metric generated for security evaluates the subset of the plurality of prompts for a prompt injection attack, a prompt leakage attack, a prompt poisoning attack, and/or a prompt jailbreaking attempt.

8. The computer-implemented method of claim 1, further comprising generating, by the one or more processors, a plurality of selections to provide for optimization and/or tuning of the LLM.

9. The computer-implemented method of claim 1, further comprising mitigating hallucinations in the response respective to each prompt of the plurality of prompts generated by the LLM by:

retrieving, from a vector database, top-k matches corresponding to the response respective to each prompt of the plurality of prompts generated by the LLM, and comparing the response respective to each prompt of the plurality of prompts generated by the LLM with the top-k matches to assess alignment, wherein the comparison includes calculating one or more statistical metrics for generating similarity scores to mitigate the hallucinations in the response respective to each prompt of the plurality of prompts.

10. The computer-implemented method of claim 1, further comprising evaluating transparency of the response respective to each prompt of the plurality of prompts by:

determining general statistics based on pre-processed data of the LLM, and determining transparency through analysis of a 360-degree view of the data associated with each prompt of the plurality of prompts and the data associated with the response respective to each prompt of the plurality of prompts and integrating transparency measures to assess distribution and complexity of the response respective to each prompt of the plurality of prompts to evaluate the transparency of the response respective to each prompt of the plurality of prompts.

11. A system for evaluating integration of Responsible Artificial Intelligence Operations (RAIOPS) and Large Language Model Operations (LLMOPS), the system comprising:

at least one memory storing machine-executable instructions; and at least one processor communicatively coupled with the at least one memory, wherein the at least one processor executes the machine-executable instructions to perform operations comprising:

generating, in response to receiving data associated with each prompt of a plurality of prompts, a response respective to each prompt of the plurality of prompts using at least one large language model (LLM);

storing, in the at least one memory, the data associated with each prompt of the plurality of prompts and data associated with the response respective to each prompt as an association;

generating, based at least in part upon a user-specified criteria and using the data associated with a subset of the plurality of prompts or the data associated with the response respective to the subset of the plurality of prompts, at least one evaluation metric for evaluating the response respective to each prompt of the plurality of prompts for at least one aspect of a plurality of aspects; generating, in accordance with the at least one evaluation metric, a knowledge graph visualization or a numerical score to display how the LLM is performing and for a user to determine whether the LLM needs optimization or tuning; and boosting the numerical score upon finding a synonym match in the response when compared with a respective ground-truth, and wherein the synonym match utilizes a Bidirectional Encoder Representations from Transformers (BERT) multilingual model, wherein the boosting comprises:

calculating metrics specific to a domain or an application for the data associated with each prompt of the plurality of prompts and the data associated with the response respective to each prompt of the plurality of prompts, analyzing central tendencies of the metrics derived from multiple runs to generate different responses, setting a baseline score of each metric based on the analyzed central tendencies, and calculating a safe score based on the baseline score to determine the boosting of the numerical score.

12. The system of claim 11, wherein the user-specified criteria include generating the at least one evaluation metric at a preconfigured time interval and/or generating the at least one evaluation metric upon generating a preconfigured number of responses.

13. The system of claim 11, wherein the plurality of aspects includes relevance, inconsistency, security, drift detection, robustness, bias and fairness detection, accuracy and appropriateness of the response, transparency and explainability, hallucination detection, and/or language translation or caching sustainability.

14. The system of claim 11, wherein the operations further comprise prior to generating the at least one evaluation metric, performing dimensionality reduction techniques or clustering techniques on the data associated with the subset of the plurality of prompts and/or the data associated with the response respective to the subset of the plurality of prompts.

15. The system of claim 11, wherein the at least one evaluation metric generated for drift detection identifies a content drift, a data drift, a temporal drift, a tone drift, an upstream drift, a domain drift, a covariate drift, a prior probability drift, a population drift, a feature drift, a sampling bias drift, a seasonal drift, a conceptual drift, an adversarial attach drift, an environmental drift, a response drift, a prompt drift, and/or embeddings drift.

16. The system of claim 11, wherein the at least one evaluation metric generated for relevance evaluates the response for at least one of misinformation, abuse, toxic content, bias, text inconsistencies, and/or relevancy.

17. The system of claim 11, wherein the at least one evaluation metric generated for security evaluates the subset of the plurality of prompts for a prompt injection attack, a prompt leakage attack, a prompt poisoning attack, and/or a prompt jailbreaking attempt.

18. The system of claim 11, wherein the operations further comprise generating a plurality of selections to provide for optimization and/or tuning of the LLM.

19. The system of claim 11, wherein the operations further comprise mitigating hallucinations in the response respective to each prompt of the plurality of prompts generated by the LLM by:
- retrieving, from a vector database, top-k matches corresponding to the response respective to each prompt of the plurality of prompts generated by the LLM, and
- comparing the responses respective to each prompt of the plurality of prompts generated by the LLM with the top-k matches to assess alignment, wherein the comparison includes calculating one or more statistical metrics for generating similarity scores to mitigate the hallucinations in the response respective to each prompt of the plurality of prompts.

20. A non-transitory computer-readable media (CRM) comprising instructions stored thereon for evaluating integration of Responsible Artificial Intelligence Operations (RAIOPS) and Large Language Model Operations (LLMOPS), wherein the instructions, when executed by at least one processor of a computing device, cause the computing device to perform operations comprising:
- generating, in response to receiving data associated with each prompt of a plurality of prompts, a response respective to each prompt of the plurality of prompts using at least one large language model (LLM);
- storing, in at least one memory, the data associated with each prompt of the plurality of prompts and data associated with the response respective to each prompt as an association;
- generating, based at least in part upon a user-specified criteria and using the data associated with a subset of the plurality of prompts or the data associated with the response respective to the subset of the plurality of prompts, at least one evaluation metric for evaluating the response respective to each prompt of the plurality of prompts for at least one aspect of a plurality of aspects;
- generating, in accordance with the at least one evaluation metric, a knowledge graph visualization or a numerical score to display how the LLM is performing and for a user to determine whether the LLM needs optimization or tuning; and
- boosting the numerical score upon finding a synonym match in the response when compared with a respective ground-truth, and wherein the synonym match utilizes a Bidirectional Encoder Representations from Transformers (BERT) multilingual model,
  - wherein the boosting comprises:
    - calculating metrics specific to a domain or an application for the data associated with each prompt of the plurality of prompts and the data associated with the response respective to each prompt of the plurality of prompts,
    - analyzing central tendencies of the metrics derived from multiple runs to generate different responses,
    - setting a baseline score of each metric based on the analyzed central tendencies, and
    - calculating a safe score based on the baseline score to determine the boosting of the numerical score.

* * * * *